(12) United States Patent
Michalopulos et al.

(10) Patent No.: US 12,393,912 B2
(45) Date of Patent: Aug. 19, 2025

(54) SYSTEMS AND METHODS FOR DRILLING OPERATIONS

(71) Applicant: Helmerich & Payne Technologies, LLC, Tulsa, OK (US)

(72) Inventors: George Michalopulos, Tulsa, OK (US); Richard Kulavik, Frisco, TX (US); Jeshurun Micaiah Chisholm, Dallas, TX (US); Jason Truman Rice, Plano, TX (US)

(73) Assignee: Helmerich & Payne Technologies, LLC, Tulsa, OK (US)

( * ) Notice: Subject to any disclaimer, the term of this patent is extended or adjusted under 35 U.S.C. 154(b) by 0 days.

(21) Appl. No.: 18/477,323

(22) Filed: Sep. 28, 2023

(65) Prior Publication Data

US 2025/0111336 A1 Apr. 3, 2025

(51) Int. Cl.
*E21B 41/00* (2006.01)
*E21B 47/00* (2012.01)
(Continued)

(52) U.S. Cl.
CPC ........... *G06Q 10/103* (2013.01); *E21B 41/00* (2013.01); *E21B 47/00* (2013.01); *G06F 40/134* (2020.01);
(Continued)

(58) Field of Classification Search
CPC .............................. E21B 41/00; E21B 2200/00
See application file for complete search history.

(56) References Cited

U.S. PATENT DOCUMENTS 10,672,154 B2 * 6/2020 Gillen ...................... G06F 3/14
10,957,177 B2 * 3/2021 Michalopulos ......... G06T 17/00
(Continued)

OTHER PUBLICATIONS

Bill Hanson, "How Real-Time Drilling Data Analysis and Visualization Reduce Targeting Risks", Available Online at: https://web.archive.org/web/20221208173202/https://www.dgi.com/blog/real-time-drilling-data-analysis/, Apr. 30, 2020.
(Continued)

*Primary Examiner* — Kenneth L Thompson
(74) *Attorney, Agent, or Firm* — Kilpatrick Townsend & Stockton LLP

(57) ABSTRACT

In some implementations, a computing device may include one or more processors, a memory for storing instructions that when executed by the one or more processors perform operations may include: accessing a drill plan for a drilling operation; receiving a plurality of drilling parameters for the drilling operation; generating a report including: a graphical depiction of the drilling operation based on the plurality of drilling parameters for the drilling operation, the graphic depiction including an animated or video illustration of the drilling operation within a past predetermined time period; a plurality of metrics associated with the drilling operation as provided by the drill plan; and a summary of a planned activity for a drilling operation for a future predetermined time period. Also, the device may include saving the report on a sever connected to a network. Further, the device may include providing the report to at least one user. Similar systems and methods may be used to automatically generate and distribute or provide access to video reports of completion and/or production activities during a first time interval and planned completion and/or production activities during a future, second time interval.

33 Claims, 16 Drawing Sheets

(51) Int. Cl.
*G06F 40/134* (2020.01)
*G06Q 10/10* (2023.01)
*G06Q 50/02* (2012.01)
*G06T 11/20* (2006.01)
*G06T 13/20* (2011.01)
*G06T 15/00* (2011.01)

(52) U.S. Cl.
CPC ............ *G06Q 50/02* (2013.01); *G06T 11/206* (2013.01); *G06T 13/20* (2013.01); *G06T 15/00* (2013.01)

(56) References Cited

U.S. PATENT DOCUMENTS

| | | | | |
|---|---|---|---|---|
| 10,961,837 B2* | 3/2021 | Gillan | .................. | E21B 47/022 |
| 11,306,563 B2* | 4/2022 | Valleru | .................. | E21B 41/00 |
| 11,473,407 B2* | 10/2022 | Tang | .................... | G06F 40/205 |
| 11,578,583 B2* | 2/2023 | Samuel | .................. | E21B 44/02 |
| 11,636,352 B2* | 4/2023 | Moreno Sierra | ....... | E21B 47/06 706/11 |
| 2020/0248545 A1 | 8/2020 | Maus et al. | | |
| 2021/0115776 A1* | 4/2021 | Gundersen | .............. | E21B 41/00 |
| 2021/0374638 A1* | 12/2021 | Teh | .................... | G06Q 10/0639 |
| 2024/0183264 A1* | 6/2024 | Li | .......................... | E21B 44/00 |
| 2024/0200438 A1* | 6/2024 | Guo | ..................... | G08B 21/182 |
| 2024/0368978 A1* | 11/2024 | Johnson | .................. | E21B 44/00 |
| 2024/0426178 A1* | 12/2024 | Kabi | ..................... | E21B 41/00 |

OTHER PUBLICATIONS

Donatti, et al., "An Innovative Method to Process and Visualize Real-Time Data Generated in Drilling Activities", OTC Offshore Technology Conference, One Petro, May 2022.
PCT/US2024/049111, "International Search Report and Written Opinion", Jan. 15, 2025, 14 pages.

* cited by examiner

SYSTEMS AND METHODS FOR DRILLING OPERATIONS

BACKGROUND

Field of the Disclosure

The present disclosure relates generally to drilling of wells for oil and gas production and, more particularly, to systems and methods useful for managing drilling operations for multiple wells during drilling.

Description of the Related Art

In the fast paced, complex, and ever-changing world of drilling, completions and production in the oil and gas industry, multiple teams (technicians, superintendents (field and actual), remote operating center (ROC) employees and managers, operators, engineers, managers, vice presidents, and executives, from multiple companies (e.g., one or more vendors, the owner/operator of the well, investors in the well, etc.) all need to get timely updates and reports in order to understand the current status of the drilling operations for a well. Often, the stakeholders in a given well are also stakeholders in other wells, and so each of the stakeholders often need to get timely information for a number of wells each day, and sometimes a number of updates each day.

A modern drilling rig includes a number of systems that work with one another and generate a great deal of information during drilling. For example, a typical drilling rig may generate gamma ray logs, resistivity logs, mud logs, and other logs during drilling operations, as well as measurement while drilling information. Such logs can be plotted in various ways, including against measured depth, true vertical depth, and other scales.

In many situations, a stakeholder interested in drilling operations will want to obtain updated information at the beginning of a workday. The update of interest often includes information from the previous night's drilling operations. Currently, gathering this information requires obtaining reports from multiple sources, and talking to multiple individuals at various companies (e.g., multiple vendors) to get a full understanding of the current status of drilling operations and what happened during the previous evening (or other time period of interest). Typically, a stakeholder will receive morning reports from multiple vendors on the drilling operations that occurred during the previous night. The stakeholder often will need to make follow up calls or otherwise communicate with others to address any questions or obtain additional information about the drilling operations that are the subject of such reports.

In addition to an update on and an understanding of the night's (or days, weeks, or other time period) immediately preceding drilling operations and the current status of drilling operations, a stakeholder will often also want to know about the planned drilling operations. A well plan for drilling the well should exist, but drilling often does not go according to plan. Hence, a stakeholder will want to know how the current status of the well and the drilling operations compare to the well plan, and when things are not according to plan, how and in what ways the upcoming drilling operations will return the well to plan and/or what changes to the well plan are anticipated and/or are to be made, as well as when and what drilling operations will be undertaken to accomplish the return to plan and/or drilling in accordance with an update to the well plan.

Trying to collect and distill the desired information and data from various sources, some of which may be in different formats, from different sources, and which may require additional communications, can take time and effort. This time and effort delays the stakeholders from obtaining a quick update on a well and further takes time away from the stakeholder's other activities.

BRIEF SUMMARY

Certain embodiments of the present disclosure can provide methods, systems, and apparatuses for drilling wells and improving the systems and techniques used to drill wells.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a drilling system may include a computing device that includes one or more processors. The computing device may include a memory for storing instructions that when executed by the one or more processors perform various operations. The operations may include receiving and accessing a drill plan for drilling a well. The drilling operations included in the well plan may include receiving a plurality of drilling data and/or drilling parameters for the drilling operations. The operations may include receiving information from one or more sensors and generating a report including: a graphical depiction of the drilling operations based on the plurality of drilling parameters for the drilling operations and/or the information received from the drilling rig sensors. The graphic depiction may include an animated or video illustration of the drilling operations within a past predetermined time period, a plurality of metrics associated with the drilling operations as determined by the sensors and as provided by the drill plan, and a summary of a planned activity for a drilling operation for a future predetermined time period. The graphic depiction may include an animated or video illustration including one or more drilling logs from the time period, a profile of the wellbore as drilled and/or as planned, a profile of the wellbore and one or more geological formations, and a projected path of the wellbore to be drilled and/or a comparison of the projected path with the planned path according to the well plan. In addition to the graphic depiction, the report may include an audio report, such as a narration that describes what is being graphically depicted in the display. A user of the system of the present disclosure may be able to select a voice from one of several options for the narrator's voice, as well as able to select a particular language for the narration. The operations may include saving the report in a database on a sever connected to a network. The operations may include providing the report to at least one user. Other embodiments of this aspect include corresponding computer systems, apparatus, and computer programs recorded on one or more computer storage devices, each configured to perform the actions of the methods.

Implementations may include one or more of the following features. In various embodiments, the graphical depiction may include a three-dimensional rendering of the drilling operation. In various embodiments, the planned activity further may include a summary of geological changes anticipated to occur for the future predetermined time period. In various embodiments, the report can be generated via a plurality of application programming interfaces that connect a report generating engine to one or more drilling systems that perform the drilling operations. In such an arrangement, the drilling systems can provide the data to the report generating engine during drilling operations, and the report generating operation can then access the data when generating a report. In various embodiments, the plurality of metrics includes a number times that a forward plan achieved a desired target time over N number of previous drilling wells. In various embodiments, the operations further may include assigning a probability that the forward plan will achieve the desired target time during a current drilling operation. In various embodiments, the report further may include projected challenges for a defined time period for the drilling operation based on the plurality of drilling parameters. In various embodiments, the report may include custom narration. In various embodiments, the providing the report to at least one user may include: emailing or texting the report or a portion thereof to a user, generating a link to the report and transmitting the link to the report to the at least one user, or simply alerting the user via text, email, phone message or otherwise that a new report is available for the user.

In some embodiments, the report generating engine may send the same report to multiple stakeholders, and the report may be sent in the same form or in a different form to such stakeholders. For example, one stakeholder may set a preference to receive reports that exclude certain types of information (e.g., mud logs or gamma logs), while another stakeholder may prefer to include all available information in the report received. The systems of the present disclosure allow each user to set preferences for the report contents. In addition, the systems of the present disclosure allow a user to set preferences for the timing and manner in which the user receives the report. For example, some users might prefer to receive the report on a cell phone via text message, and on a computer at the office (or at home) via an emailed link. Each user can thus select multiple delivery modes for a number of devices.

In various embodiments, the operations may include transmitting a copy of the report and/or a hyperlink to the report to one or more stakeholders at one or more preset times, which may be set by the stakeholders. In various embodiments, the operations may include transmitting a link to the report within a preset time following certain drilling operations or milestones (e.g., kick off of the transition from vertical to horizontal, a return to a planned well path, upon reaching the target formation, a kick, a cave-in, completion of drilling, etc.). In various embodiments, the report further may include links to drilling data. In various embodiments, the report or a link to the report is transmitted via at least one of an email message, a text message, and a chat message. In various embodiments, the operations further may include storing a link to the report on a website for viewing after user login. In various embodiments, the report is automatically generated. In various embodiments, the report includes one or more tags identifying information in the report. In various embodiments, the length of the video report is less than 30 seconds in duration. In various embodiments, the length of the video report is between 30 and 60 seconds in duration. In various embodiments, the length of the video report is greater than 60 seconds in duration. In various embodiments, the report is stored in a searchable database of prior reports. In various embodiments, the operations may include receiving artificial intelligence generated inputs based on user searches. In some embodiments, the report generating engine generates multiple formats for the report, such as mp4 files, mov files, quicktime files, avi files, and/or wmv files and the like, and a user may specify one or more file formats for receipt by that user, such as by having a report in one format sent to a cell phone or tablet and another copy of the report sent in a different format to a computer. Implementations of the described techniques may include hardware, a method or process, or a computer tangible medium.

In one general aspect, a method may include accessing a drill plan for drilling a well and/or for portions of the well. The method may include receiving a plurality of drilling parameters for the drilling operations. The method may include generating a report including: a graphical depiction of the drilling operation based on the plurality of drilling parameters for the drilling operation. In various embodiments, the graphic depiction may include an animated or video illustration of the drilling operation within a past predetermined time period, a plurality of metrics associated with the drilling operation as provided by the drill plan; and a summary of a planned activity for a drilling operation for a future predetermined time period. In various embodiments, the operations may include saving the report on a sever connected to a network. In various embodiments, the operations may include providing the report to at least one user. Other embodiments of this aspect include corresponding computer systems, apparatus, and computer programs recorded on one or more computer storage devices, each configured to perform the actions of the methods.

Implementations may include one or more of the following features. In various embodiments, the graphical depiction may include a three-dimensional rendering of the drilling operation. In various embodiments, the planned activity includes a summary of geological changes for the future predetermined time period. In various embodiments, the report is generated via a plurality of application programming interfaces that connect to one or more drilling systems that perform the drilling operation. In various embodiments, the plurality of metrics includes a number times that a forward plan achieved a desired target time over N number of previous drilling wells. In various embodiments, the method may include assigning a probability that the planned activity will achieve the desired target time during a current drilling operation. In various embodiments, the report may include projected challenges for a defined time period for the drilling operation based on the plurality of drilling parameters. In various embodiments, the report may include custom narration. In various embodiments, the providing the report to at least one user may include: generating a link to the report; and transmitting the link to the report to the at least one user. In various embodiments, the operations may include transmitting a link to the report at a preset time. In various embodiments, the operations may include transmitting a link to the report at a preset time. In various embodiments, the operations further may include transmitting a link to the report within a preset time following the end of operations. In various embodiments, the report further may include links to drilling data. In various embodiments, a link to the report is transmitted via at least one of an email message, a text message, and a chat message. In various embodiments, the operations may include storing a link to the report on a website for viewing after user login. In various embodiments, the report is automatically generated. In various embodiments, the report includes one or more tags identifying information in the report. In various embodiments, the length of the video report is less than 30 seconds in duration. In various embodiments, the length of the video report is between 30 and 60 seconds in duration. In various embodiments, the length of the video report is greater than 60 seconds in duration. In various embodiments, the report is stored in a searchable database of prior reports. In various embodiments, the operations may include receiving artificial intelligence generated inputs based on user searches. Implementations of the described techniques may include hardware, a method or process, or a computer tangible medium.

In one general aspect, a non-transitory, computer readable medium may store instructions that when execute by a processor may perform various operations. The operations may include accessing a drill plan for a drilling operation. The operations may include receiving a plurality of drilling parameters for the drilling operation. The operations may include generating a report. The report can include a graphical depiction of the drilling operation based on the plurality of drilling parameters for the drilling operation, the graphic depiction including an animated or video illustration of the drilling operation within a past, predetermined time period, a plurality of metrics associated with the drilling operation as provided by the drill plan, and a summary of a planned activity for a drilling operation for a future predetermined time period. The operations may include saving the report on a sever connected to a network. The operations may include providing the report to at least one user. Other embodiments of this aspect include corresponding computer systems, apparatus, and computer programs recorded on one or more computer storage devices, each configured to perform the actions of the methods.

Implementations may include one or more of the following features. In various embodiments, the graphical depiction may include a three-dimensional rendering of the drilling operation. In various embodiments, the planned activity further may include a summary of geological changes for the future predetermined time period. In various embodiments, the report is generated via a plurality of application programming interfaces that connect to one or more drilling systems that perform the drilling operation. In various embodiments, the plurality of metrics includes a number times that a forward plan achieved a desired target time over N number of previous drilling wells. In various embodiments, the operations include assigning a probability that the forward plan will achieve the desired target time during a current drilling operation. In various embodiments, the report further may include projected challenges for a defined time period for the drilling operation based on the plurality of drilling parameters. In various embodiments, the report may include custom narration. In various embodiments, the providing the report to at least one user may include: generating a link to the report; and transmitting the link to the report to the at least one user. In various embodiments, the operations may include transmitting a link to the report at a preset time. In various embodiments, the operations further may include transmitting a link to the report at a preset time. In various embodiments, the operations further may include transmitting a link to the report within a preset time following the end of operations. In various embodiments, the report further may include links to drilling data. In various embodiments, a link to the report is transmitted via at least one of an email message, a text message, and a chat message. In various embodiments, the operations further may include storing a link to the report on a website for viewing after user login. In various embodiments, the report is automatically generated. In various embodiments, the report includes one or more tags identifying information in the report. In various embodiments, the length of the video report is less than 30 seconds in duration. In various embodiments, the length of the video report is between 30 and 60 seconds in duration. In various embodiments, the length of the video report is greater than 60 seconds in duration. In various embodiments, the report is stored in a searchable database of prior reports. In various embodiments, the operations may include receiving artificial intelligence generated inputs based on user searches. Implementations of the described techniques may include hardware, a method or process, or a computer tangible medium.

As explained below, the present disclosure focuses on the creation and distribution of video reports for drilling operations, but the systems and methods explained and described herein may be used to generate and distribute similar reports for completion and/or production activities and operations.

With reference to the remaining portions of the specification, including the drawings and claims, the reader will realize other features and advantages of embodiments of the present disclosure. Further features and advantages, as well as the structure and operation of various embodiments of the present disclosure, are described in detail below with respect to the accompanying drawings. In the drawings, like reference numbers can indicate identical or functionally similar elements.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENTS

Figure 1:
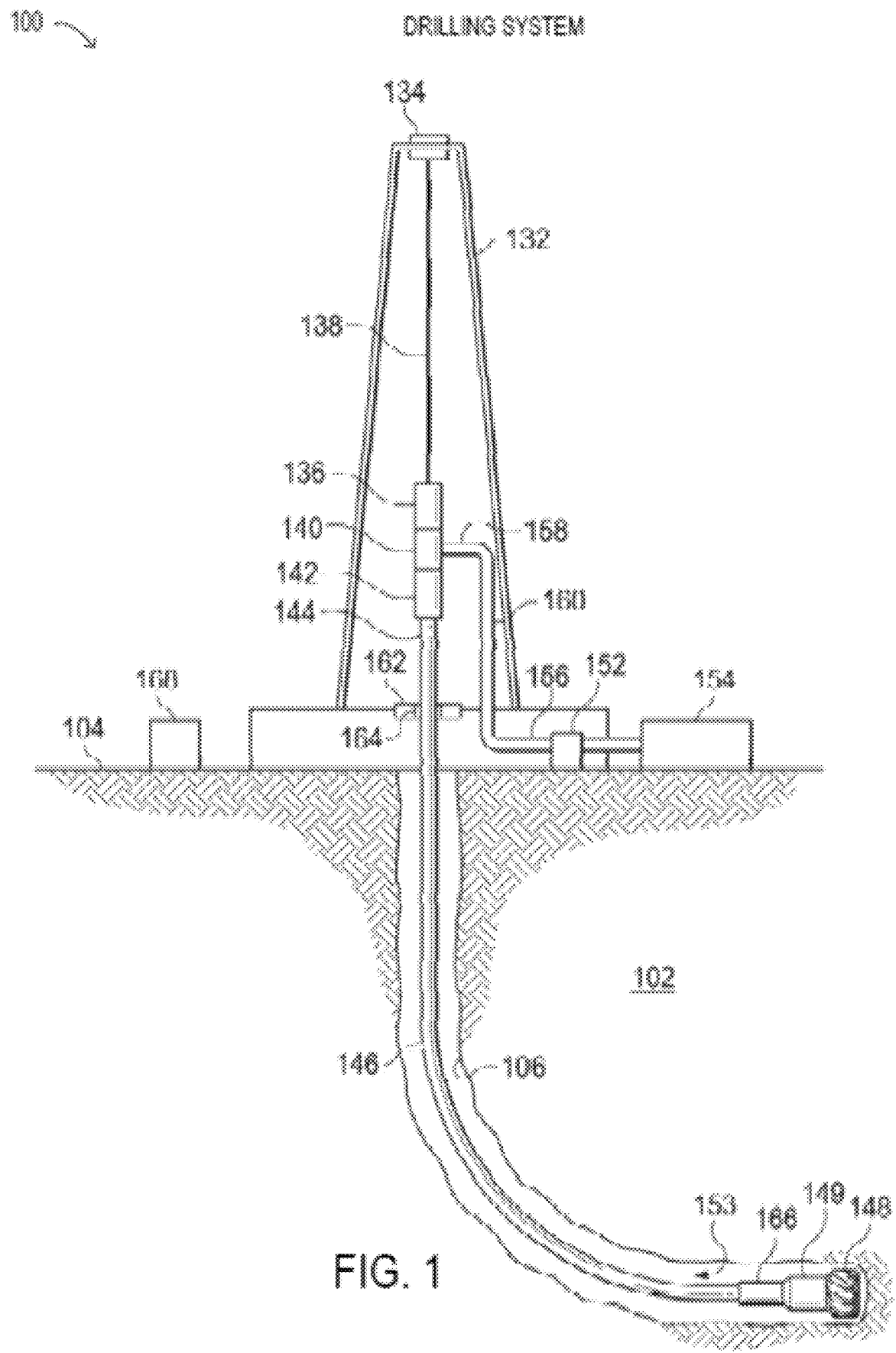
FIG. 1 is a depiction of a drilling system for drilling a borehole.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Drilling a well typically involves a substantial amount of human decision-making during the drilling process. For example, geologists and drilling engineers use their knowledge, experience, and the available information to make decisions on how to plan the drilling operation, how to accomplish the drill plan, and how to handle issues that arise during drilling. However, even the best geologists and drilling engineers perform some guesswork due to the unique nature of each borehole. Furthermore, a directional human driller performing the drilling may have drilled other boreholes in the same region and so may have some similar experience. However, during drilling operations, a multitude of input information and other factors may affect a drilling decision being made by a human operator or specialist, such that the amount of information may overwhelm the cognitive ability of the human to properly consider and factor into the drilling decision. Furthermore, the quality or the error involved with the drilling decision may improve with larger amounts of input data being considered, for example, such as formation data from a large number of offset wells. For these reasons, human specialists may be unable to achieve optimal drilling decisions, particularly when such drilling decisions are made under time constraints, such as during drilling operations when continuation of drilling is dependent on the drilling decision and, thus, the entire drilling rig waits idly for the next drilling decision. Furthermore, human decision-making for drilling decisions can result in expensive mistakes because drilling errors can add significant cost to drilling operations. In some cases, drilling errors may permanently lower the output of a well, resulting in substantial long term economic losses due to the lost output of the well.

The systems and methods used to drill oil and gas wells are complex and sophisticated. Methods and systems developed for oil and gas wells can be adapted for use in planning, drilling, and creating wells for geothermal energy. The following discussion provides a description of systems and techniques for drilling wells that can be useful for drilling geothermal wells, as well as generating electricity therefrom.

Referring now to the drawings, Referring to FIG. 1, a drilling system 100 is illustrated in one embodiment as a top drive system. As shown, the drilling system 100 includes a derrick 132 on the surface 104 of the earth and is used to drill a borehole 106 into the earth. Typically, drilling system 100 is used at a location corresponding to a geographic formation 102 in the earth that is known.

In FIG. 1, derrick 132 includes a crown block 134 to which a traveling block 136 is coupled via a drilling line 138. In drilling system 100, a top drive 140 is coupled to traveling block 136 and may provide rotational force for drilling. A saver sub 142 may sit between the top drive 140 and a drill pipe 144 that is part of a drill string 146. Top drive 140 may rotate drill string 146 via the saver sub 142, which in turn may rotate a drill bit 148 of a bottom hole assembly (BHA) 149 in borehole 106 passing through formation 102. Also visible in drilling system 100 is a rotary table 162 that may be fitted with a master bushing 164 to hold drill string 146 when not rotating.

A mud pump 152 may direct a fluid mixture (e.g., drilling mud 153) from a mud pit 154 into drill string 146. Mud pit 154 is shown schematically as a container, but it is noted that various receptacles, tanks, pits, or other containers may be used. Drilling mud 153 may flow from mud pump 152 into a discharge line 156 that is coupled to a rotary hose 158 by a standpipe 160. Rotary hose 158 may then be coupled to top drive 140, which includes a passage for drilling mud 153 to flow into borehole 106 via drill string 146 from where drilling mud 153 may emerge at drill bit 148. Drilling mud 153 may lubricate drill bit 148 during drilling and, due to the pressure supplied by mud pump 152, drilling mud 153 may return via borehole 106 to surface 104.

In drilling system 100, drilling equipment (see also FIG. 5) is used to perform the drilling of borehole 106, such as top drive 140 (or rotary drive equipment) that couples to drill string 146 and BHA 149 and is configured to rotate drill string 146 and apply pressure to drill bit 148. Drilling system 100 may include control systems such as a WOB/differential pressure control system 522, a positional/rotary control system 524, a fluid circulation control system 526, and a sensor system 528, as further described below with respect to FIG. 5. The control systems may be used to monitor and change drilling rig settings, such as the WOB or differential pressure to alter the ROP or the radial orientation of the toolface, change the flow rate of drilling mud, and perform other operations. Sensor system 528 may be for obtaining sensor data about the drilling operation and drilling system 100, including the downhole equipment. For example, sensor system 528 may include MWD or logging while drilling (LWD) tools for acquiring information, such as toolface and formation logging information, which may be saved for later retrieval, transmitted with or without a delay using any of various communication means (e.g., wireless, wireline, or mud pulse telemetry), or otherwise transferred to steering control system 168. As used herein, an MWD tool is enabled to communicate downhole measurements without substantial delay to the surface 104, such as using mud pulse telemetry, while a LWD tool is equipped with an internal memory that stores measurements when downhole and can be used to download a stored log of measurements when the LWD tool is at the surface 104. The internal memory in the LWD tool may be a removable memory, such as a universal serial bus (USB) memory device or another removable memory device. It is noted that certain downhole tools may have both MWD and LWD capabilities. Such information acquired by sensor system 528 may include information related to hole depth, bit depth, inclination angle, azimuth angle, true vertical depth, gamma count, standpipe pressure, mud flow rate, rotary rotations per minute (RPM), bit speed, ROP, WOB, among other information. It is noted that all or part of sensor system 528 may be incorporated into a control system, or in another component of the drilling equipment.

As drilling system 100 can be configured in many different implementations, it is noted that different control systems and subsystems may be used.

Sensing, detection, measurement, evaluation, storage, alarm, and other functionality may be incorporated into a downhole tool 166 or BHA 149 or elsewhere along drill string 146 to provide downhole surveys of borehole 106. Accordingly, downhole tool 166 may be an MWD tool or a LWD tool or both, and may accordingly utilize connectivity to the surface 104, local storage, or both. In different implementations, gamma radiation sensors, magnetometers, accelerometers, and other types of sensors may be used for the downhole surveys. Although downhole tool 166 is shown in singular in drilling system 100, it is noted that multiple instances (not shown) of downhole tool 166 may be located at one or more locations along drill string 146.

In some embodiments, formation detection and evaluation functionality may be provided via a steering control system 168 on the surface 104. Steering control system 168 may be located in proximity to derrick 132 or may be included with drilling system 100. In other embodiments, steering control system 168 may be remote from the actual location of borehole 106 (see also FIG. 4). For example, steering control system 168 may be a stand-alone system or may be incorporated into other systems included with drilling system 100.

In operation, steering control system 168 may be accessible via a communication network (see also FIG. 10) and may accordingly receive formation information via the communication network. In some embodiments, steering control system 168 may use the evaluation functionality to provide corrective measures, such as a convergence plan to overcome an error in the well trajectory of borehole 106 with respect to a reference, or a planned well trajectory. The convergence plans or other corrective measures may depend on a determination of the well trajectory, and therefore, may be improved in accuracy using certain methods and systems for improved drilling performance.

In particular embodiments, at least a portion of steering control system 168 may be located in downhole tool 166 (not shown). In some embodiments, steering control system 168 may communicate with a separate controller (not shown) located in downhole tool 166. In particular, steering control system 168 may receive and process measurements received from downhole surveys and may perform the calculations described herein using the downhole surveys and other information referenced herein.

In drilling system 100, to aid in the drilling process, data is collected from borehole 106, such as from sensors in BHA 149, downhole tool 166, or both. The collected data may include the geological characteristics of formation 102 in which borehole 106 was formed, the attributes of drilling system 100, including BHA 149, and drilling information such as weight-on-bit (WOB), drilling speed, and other information pertinent to the formation of borehole 106. The drilling information may be associated with a particular depth or another identifiable marker to index collected data. For example, the collected data for borehole 106 may capture drilling information indicating that drilling of the well from 1,000 feet to 1,200 feet occurred at a first rate of penetration (ROP) through a first rock layer with a first WOB, while drilling from 1,200 feet to 1,500 feet occurred at a second ROP through a second rock layer with a second WOB (see also FIG. 2). In some applications, the collected data may be used to virtually recreate the drilling process that created borehole 106 in formation 102, such as by displaying a computer simulation of the drilling process. The accuracy with which the drilling process can be recreated depends on a level of detail and accuracy of the collected data, including collected data from a downhole survey of the well trajectory.

The collected data may be stored in a database that is accessible via a communication network for example. In some embodiments, the database storing the collected data for borehole 106 may be located locally at drilling system 100, at a drilling hub that supports a plurality of drilling systems 100 in a region, or at a database server accessible over the communication network that provides access to the database (see also FIG. 4). At drilling system 100, the collected data may be stored at the surface 104 or downhole in drill string 146, such as in a memory device included with BHA 149 (see also FIG. 10). Alternatively, at least a portion of the collected data may be stored on a removable storage medium, such as using steering control system 168 or BHA 149, which is later coupled to the database in order to transfer the collected data to the database, which may be manually performed at certain intervals, for example.

In FIG. 1, steering control system 168 is located at or near the surface 104 where borehole 106 is being drilled. Steering control system 168 may be coupled to equipment used in drilling system 100 and may also be coupled to the database, whether the database is physically located locally, regionally, or centrally (see also FIGS. 4 and 5). Accordingly, steering control system 168 may collect and record various inputs, such as measurement data from a magnetometer and an accelerometer that may also be included with BHA 149.

Steering control system 168 may further be used as a surface steerable system, along with the database, as described above. The surface steerable system may enable an operator to plan and control drilling operations while drilling is being performed. The surface steerable system may itself also be used to perform certain drilling operations, such as controlling certain control systems that, in turn, control the actual equipment in drilling system 100 (see also FIG. 5). The control of drilling equipment and drilling operations by steering control system 168 may be manual, manual-assisted, semi-automatic, or automatic, in different embodiments.

Manual control may involve direct control of the drilling rig equipment, albeit with certain safety limits to prevent unsafe or undesired actions or collisions of different equipment. To enable manual-assisted control, steering control system 168 may present various information, such as using a graphical user interface (GUI) displayed on a display device (see FIG. 8), to a human operator, and may provide controls that enable the human operator to perform a control operation. The information presented to the user may include live measurements and feedback from the drilling rig and steering control system 168, or the drilling rig itself, and may further include limits and safety-related elements to prevent unwanted actions or equipment states, in response to a manual control command entered by the user using the GUI.

To implement semi-automatic control, steering control system 168 may itself propose or indicate to the user, such as via the GUI, that a certain control operation, or a sequence of control operations, should be performed at a given time. Then, steering control system 168 may enable the user to imitate the indicated control operation or sequence of control operations, such that once manually started, the indicated control operation or sequence of control operations is automatically completed. The limits and safety features mentioned above for manual control would still apply for semi-automatic control. It is noted that steering control system 168 may execute semi-automatic control using a secondary processor, such as an embedded controller that executes under a real-time operating system (RTOS), that is under the control and command of steering control system 168. To implement automatic control, the step of manual starting the indicated control operation or sequence of operations is eliminated, and steering control system 168 may proceed with only a passive notification to the user of the actions taken.

In order to implement various control operations, steering control system 168 may perform (or may cause to be performed) various input operations, processing operations, and output operations. The input operations performed by steering control system 168 may result in measurements or other input information being made available for use in any subsequent operations, such as processing or output operations. The input operations may accordingly provide the input information, including feedback from the drilling process itself, to steering control system 168. The processing operations performed by steering control system 168 may be any processing operation, as disclosed herein. The output operations performed by steering control system 168 may involve generating output information for use by external entities, or for output to a user, such as in the form of updated elements in the GUI, for example. The output information may include at least some of the input information, enabling steering control system 168 to distribute information among various entities and processors.

In particular, the operations performed by steering control system 168 may include operations such as receiving drilling data representing a drill path, receiving other drilling parameters, calculating a drilling solution for the drill path based on the received data and other available data (e.g., rig characteristics), implementing the drilling solution at the drilling rig, monitoring the drilling process to gauge whether the drilling process is within a defined margin of error of the drill path, and calculating corrections for the drilling process if the drilling process is outside of the margin of error.

Accordingly, steering control system 168 may receive input information either before drilling, during drilling, or after drilling of borehole 106. The input information may comprise measurements from one or more sensors, as well as survey information collected while drilling borehole 106. The input information may also include a drill plan, a regional formation history, drilling engineer parameters, downhole toolface/inclination information, downhole tool gamma/resistivity information, economic parameters, and reliability parameters, among various other parameters. Some of the input information, such as the regional formation history, may be available from a drilling hub 410, which may have respective access to a regional drilling database (DB) 412 (see FIG. 4). Other input information may be accessed or uploaded from other sources to steering control system 168. For example, a web interface may be used to interact directly with steering control system 168 to upload the drill plan or drilling parameters.

As noted, the input information may be provided to steering control system 168. After processing by steering control system 168, steering control system 168 may generate control information that may be output to drilling rig 210 (e.g., to rig controls 520 that control drilling equipment 530, see also FIGS. 2 and 5). Drilling rig 210 may provide feedback information using rig controls 520 to steering control system 168. The feedback information may then serve as input information to steering control system 168, thereby enabling steering control system 168 to perform feedback loop control and validation. Accordingly, steering control system 168 may be configured to modify its output information to the drilling rig, in order to achieve the desired results, which are indicated in the feedback information. The output information generated by steering control system 168 may include indications to modify one or more drilling parameters, the direction of drilling, and the drilling mode, among others. In certain operational modes, such as semi-automatic or automatic, steering control system 168 may generate output information indicative of instructions to rig controls 520 to enable automatic drilling using the latest location of BHA 149. Therefore, an improved accuracy in the determination of the location of BHA 149 may be provided using steering control system 168.

Figure 2:
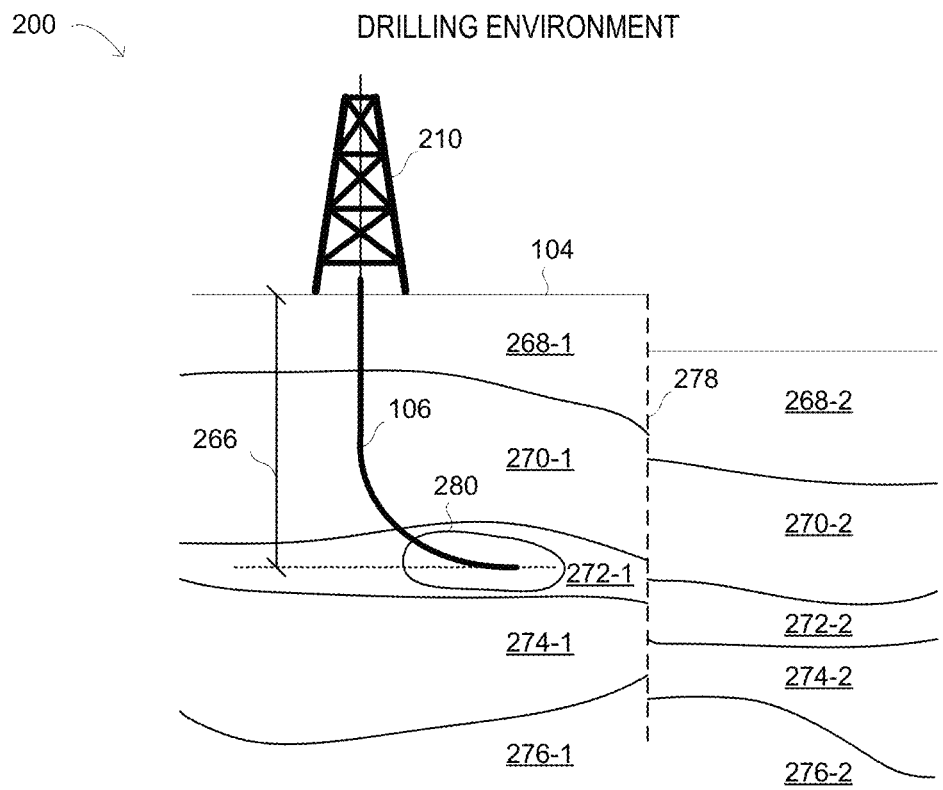
FIG. 2 is a depiction of a drilling environment including the drilling system for drilling a borehole.

Referring now to FIG. 2, a drilling environment 200 is depicted schematically and is not drawn to scale or perspective. In particular, drilling environment 200 may illustrate additional details with respect to formation 102 below the surface 104 in drilling system 100 shown in FIG. 1. In FIG. 2, drilling rig 210 may represent various equipment discussed above with respect to drilling system 100 in FIG. 1 that is located at the surface 104.

In drilling environment 200, it may be assumed that a drill plan (also referred to as a well plan) has been formulated to drill borehole 106 extending into the ground to a true vertical depth (TVD) 266 and penetrating several subterranean strata layers. Borehole 106 is shown in FIG. 2 extending through strata layers 268-1 and 270-1, while terminating in strata layer 272-1. Accordingly, as shown, borehole 106 does not extend or reach underlying strata layers 274-1 and 276-1. A target area 280 specified in the drill plan may be located in strata layer 272-1 as shown in FIG. 2. Target area 280 may represent a desired endpoint of borehole 106, such as a hydrocarbon producing area indicated by strata layer 272-1. It is noted that target area 280 may be of any shape and size and may be defined using various different methods and information in different embodiments. In some instances, target area 280 may be specified in the drill plan using subsurface coordinates, or references to certain markers, which indicate where borehole 106 is to be terminated. In other instances, target area may be specified in the drill plan using a depth range within which borehole 106 is to remain. For example, the depth range may correspond to strata layer 272-1. In other examples, target area 280 may extend as far as can be realistically drilled. For example, when borehole 106 is specified to have a horizontal section with a goal to extend into strata layer 172 as far as possible, target area 280 may be defined as strata layer 272-1 itself and drilling may continue until some other physical limit is reached, such as a property boundary or a physical limitation to the length of the drill string.

Also visible in FIG. 2 is a fault line 278 that has resulted in a subterranean discontinuity in the fault structure. Specifically, strata layers 268, 270, 272, 274, and 276 have portions on either side of fault line 278. On one side of fault line 278, where borehole 106 is located, strata layers 268-1, 270-1, 272-1, 274-1, and 276-1 are unshifted by fault line 278. On the other side of fault line 278, strata layers 268-2, 270-3, 272-3, 274-3, and 276-3 are shifted downwards by fault line 278.

Current drilling operations frequently include directional drilling to reach a target, such as target area 280. The use of directional drilling has been found to generally increase an overall amount of production volume per well, but also may lead to significantly higher production rates per well, which are both economically desirable. As shown in FIG. 2, directional drilling may be used to drill the horizontal portion of borehole 106, which increases an exposed length of borehole 106 within strata layer 272-1, and which may accordingly be beneficial for hydrocarbon extraction from strata layer 272-1. Directional drilling may also be used alter an angle of borehole 106 to accommodate subterranean faults, such as indicated by fault line 278 in FIG. 2. Other benefits that may be achieved using directional drilling include sidetracking off of an existing well to reach a different target area or a missed target area, drilling around abandoned drilling equipment, drilling into otherwise inaccessible or difficult to reach locations (e.g., under populated areas or bodies of water), providing a relief well for an existing well, and increasing the capacity of a well by branching off and having multiple boreholes extending in different directions or at different vertical positions for the same well. Directional drilling is often not limited to a straight horizontal borehole 106 but may involve staying within a strata layer that varies in depth and thickness as illustrated by strata layer 172. As such, directional drilling may involve multiple vertical adjustments that complicate the trajectory of borehole 106.

Figure 3:
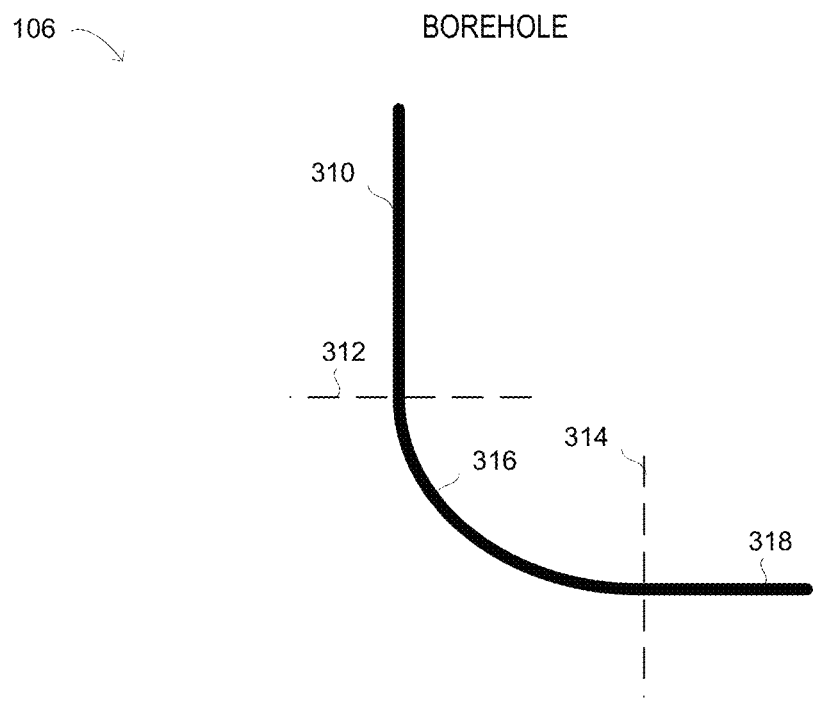
FIG. 3 is a depiction of a borehole generated in the drilling environment.

Referring now to FIG. 3, one embodiment of a portion of borehole 106 is shown in further detail. Using directional drilling for horizontal drilling may introduce certain challenges or difficulties that may not be observed during vertical drilling of borehole 106. For example, a horizontal portion 318 of borehole 106 may be started from a vertical portion 310. In order to make the transition from vertical to horizontal, a curve may be defined that specifies a so-called "build up" section 316. Build up section 316 may begin at a kickoff point 312 in vertical portion 310 and may end at a begin point 314 of horizontal portion 318. The change in inclination in buildup section 316 per measured length drilled is referred to herein as a "build rate" and may be defined in degrees per one hundred feet drilled. For example, the build rate may have a value of 6°/100 ft., indicating that there is a six degree change in inclination for every one hundred feet drilled. The build rate for a particular build up section may remain relatively constant or may vary.

The build rate used for any given build up section may depend on various factors, such as properties of the formation (i.e., strata layers) through which borehole 106 is to be drilled, the trajectory of borehole 106, the particular pipe and drill collars/BHA components used (e.g., length, diameter, flexibility, strength, mud motor bend setting, and drill bit), the mud type and flow rate, the specified horizontal displacement, stabilization, and inclination, among other factors. An overly aggressive built rate can cause problems such as severe doglegs (e.g., sharp changes in direction in the borehole) that may make it difficult or impossible to run casing or perform other operations in borehole 106. Depending on the severity of any mistakes made during directional drilling, borehole 106 may be enlarged or drill bit 146 may be backed out of a portion of borehole 106 and redrilled along a different path. Such mistakes may be undesirable due to the additional time and expense involved. However, if the built rate is too cautious, additional overall time may be added to the drilling process because directional drilling generally involves a lower ROP than straight drilling. Furthermore, directional drilling for a curve is more complicated than vertical drilling and the possibility of drilling errors increases with directional drilling (e.g., overshoot and undershoot that may occur while trying to keep drill bit 148 on the planned trajectory).

Two modes of drilling, referred to herein as "rotating" and "sliding," are commonly used to form a borehole 106. Rotating, also called "rotary drilling," uses top drive 140 or rotary table 162 to rotate drill string 146. Rotating may be used when drilling occurs along a straight trajectory, such as for vertical portion 310 of borehole 106. Sliding, also called "steering" or "directional drilling" as noted above, typically uses a mud motor located downhole at BHA 149. The mud motor may have an adjustable bent housing and is not powered by rotation of the drill string. Instead, the mud motor uses hydraulic power derived from the pressurized drilling mud that circulates along borehole 106 to and from the surface 104 to directionally drill borehole 106 in buildup section 316.

Thus, sliding is used in order to control the direction of the well trajectory during directional drilling. A method to perform a slide may include the following operations. First, during vertical or straight drilling, the rotation of drill string 146 is stopped. Based on feedback from measuring equipment, such as from downhole tool 166, adjustments may be made to drill string 146, such as using top drive 140 to apply various combinations of torque, WOB, and vibration, among other adjustments. The adjustments may continue until a toolface is confirmed that indicates a direction of the bend of the mud motor is oriented to a direction of a desired deviation (i.e., build rate) of borehole 106. Once the desired orientation of the mud motor is attained, WOB to the drill bit is increased, which causes the drill bit to move in the direction of deviation. Once sufficient distance and angle have been built up in the curved trajectory, a transition back to rotating mode can be accomplished by rotating the drill string again. The rotation of the drill string after sliding may neutralize the directional deviation caused by the bend in the mud motor due to the continuous rotation around a centerline of borehole 106.

Figure 4:
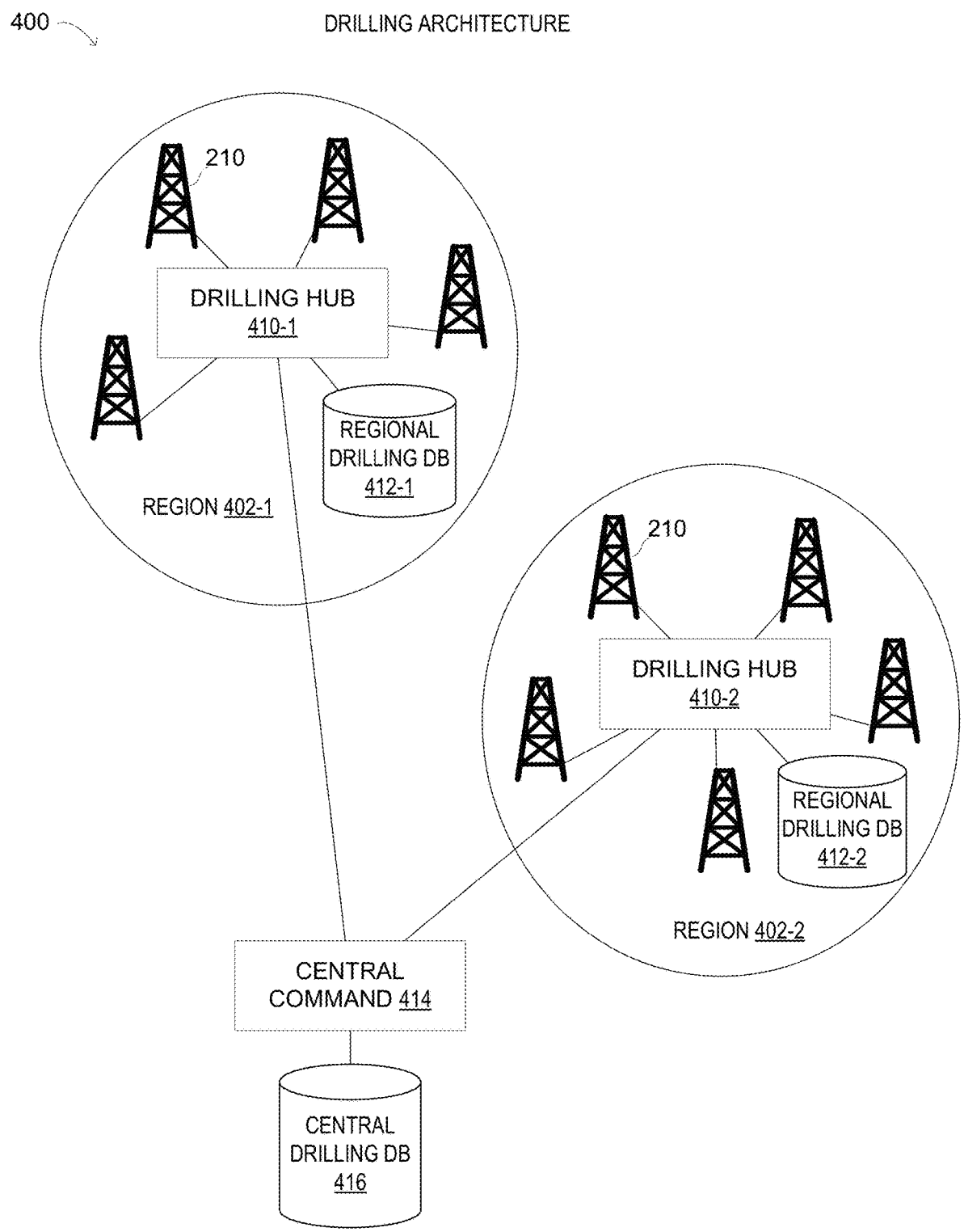
FIG. 4 is a depiction of a drilling architecture including the drilling environment.

Referring now to FIG. 4, a drilling architecture 400 is illustrated in diagram form. As shown, drilling architecture 400 depicts a hierarchical arrangement of drilling hubs 410 and a central command 414, to support the operation of a plurality of drilling rigs 210 in different regions 402. Specifically, as described above with respect to FIGS. 1 and 2, drilling rig 210 includes steering control system 168 that is enabled to perform various drilling control operations locally to drilling rig 210. When steering control system 168 is enabled with network connectivity, certain control operations or processing may be requested or queried by steering control system 168 from a remote processing resource. As shown in FIG. 4, drilling hubs 410 represent a remote processing resource for steering control system 168 located at respective regions 402, while central command 414 may represent a remote processing resource for both drilling hub 410 and steering control system 168.

Specifically, in a region 401-1, a drilling hub 410-1 may serve as a remote processing resource for drilling rigs 210 located in region 401-1, which may vary in number and are not limited to the exemplary schematic illustration of FIG. 4. Additionally, drilling hub 410-1 may have access to a regional drilling DB 412-1, which may be local to drilling hub 410-1. Additionally, in a region 401-2, a drilling hub 410-2 may serve as a remote processing resource for drilling rigs 210 located in region 401-2, which may vary in number and are not limited to the exemplary schematic illustration of FIG. 4. Additionally, drilling hub 410-2 may have access to a regional drilling DB 412-2, which may be local to drilling hub 410-2.

In FIG. 4, respective regions 402 may exhibit the same or similar geological formations. Thus, reference wells, or offset wells, may exist in a vicinity of a given drilling rig 210 in region 402, or where a new well is planned in region 402. Furthermore, multiple drilling rigs 210 may be actively drilling concurrently in region 402 and may be in different stages of drilling through the depths of formation strata layers at region 402. Thus, for any given well being drilled by drilling rig 210 in a region 402, survey data from the reference wells or offset wells may be used to create the drill plan and may be used for improved drilling performance. In some implementations, survey data or reference data from a plurality of reference wells may be used to improve drilling performance, such as by reducing an error in estimating TVD or a position of BHA 149 relative to one or more strata layers, as will be described in further detail herein. Additionally, survey data from recently drilled wells, or wells still currently being drilled, including the same well, may be used for reducing an error in estimating TVD or a position of BHA 149 relative to one or more strata layers.

Also shown in FIG. 4 is central command 414, which has access to central drilling DB 416, and may be located at a centralized command center that is in communication with drilling hubs 410 and drilling rigs 210 in various regions 402. The centralized command center may have the ability to monitor drilling and equipment activity at any one or more drilling rigs 210. In some embodiments, central command 414 and drilling hubs 412 may be operated by a commercial operator of drilling rigs 210 as a service to customers who have hired the commercial operator to drill wells and provide other drilling-related services.

In FIG. 4, it is particularly noted that central drilling DB 416 may be a central repository that is accessible to drilling hubs 410 and drilling rigs 210. Accordingly, central drilling DB 416 may store information for various drilling rigs 210 in different regions 402. In some embodiments, central drilling DB 416 may serve as a backup for at least one regional drilling DB 412 or may otherwise redundantly store information that is also stored on at least one regional drilling DB 412. In turn, regional drilling DB 412 may serve as a backup or redundant storage for at least one drilling rig 210 in region 402. For example, regional drilling DB 412 may store information collected by steering control system 168 from drilling rig 210.

In some embodiments, the formulation of a drill plan for drilling rig 210 may include processing and analyzing the collected data in regional drilling DB 412 to create a more effective drill plan. Furthermore, once the drilling has begun, the collected data may be used in conjunction with current data from drilling rig 210 to improve drilling decisions. As noted, the functionality of steering control system 168 may be provided at drilling rig 210, or may be provided, at least in part, at a remote processing resource, such as drilling hub 410 or central command 414.

As noted, steering control system 168 may provide functionality as a surface steerable system for controlling drilling rig 210. Steering control system 168 may have access to regional drilling DB 412 and central drilling DB 416 to provide the surface steerable system functionality. As will be described in greater detail below, steering control system 168 may be used to plan and control drilling operations based on input information, including feedback from the drilling process itself. Steering control system 168 may be used to perform operations such as receiving drilling data representing a drill trajectory and other drilling parameters, calculating a drilling solution for the drill trajectory based on the received data and other available data (e.g., rig characteristics), implementing the drilling solution at drilling rig 210, monitoring the drilling process to gauge whether the drilling process is within a margin of error that is defined for the drill trajectory, or calculating corrections for the drilling process if the drilling process is outside of the margin of error.

Figure 5:
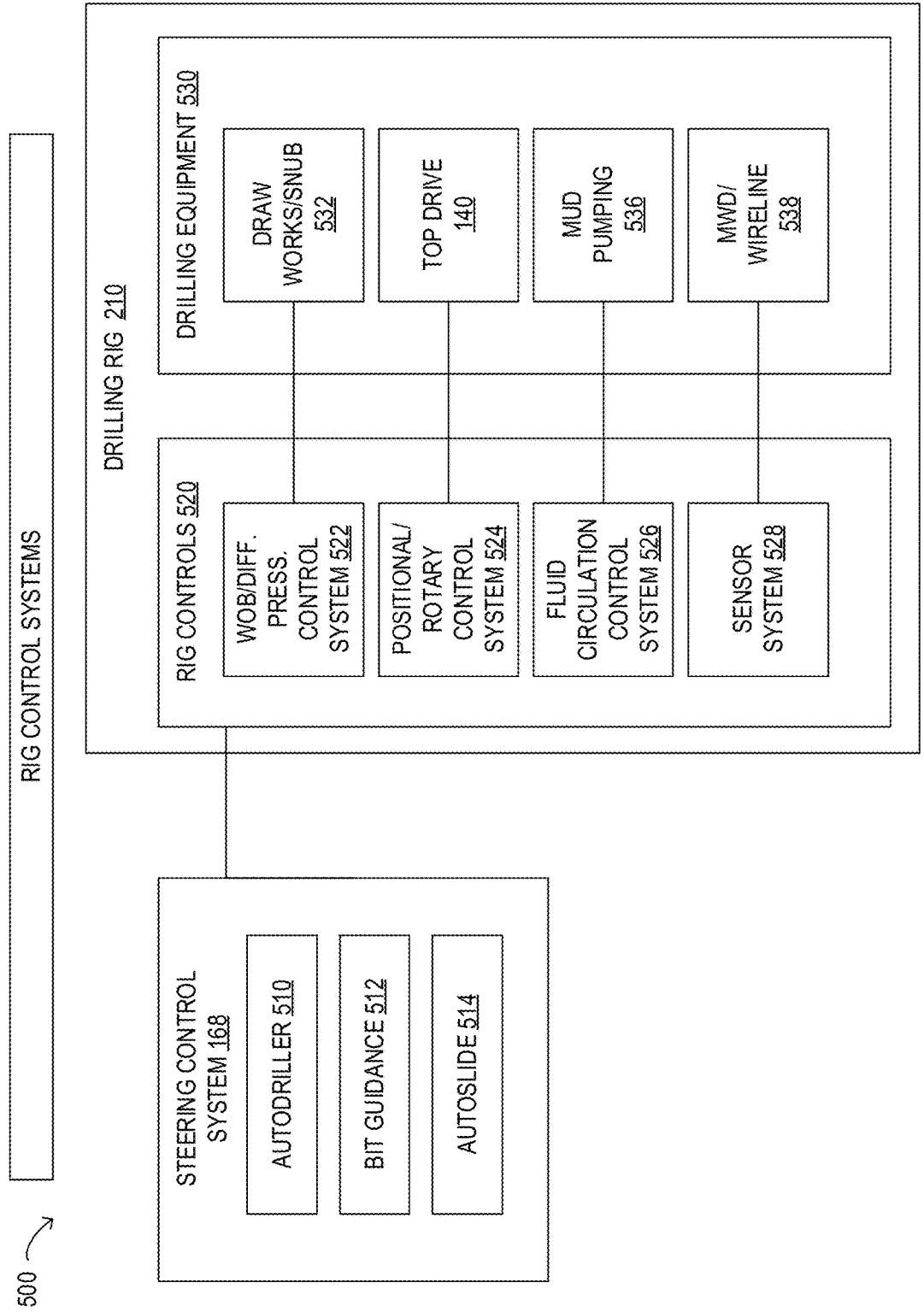
FIG. 5 is a first depiction of rig control systems included in the drilling system.

Referring now to FIG. 5, an example of rig control systems 500 is illustrated in schematic form. It is noted that rig control systems 500 may include fewer or more elements than shown in FIG. 5 in different embodiments. As shown, rig control systems 500 includes steering control system 168 and drilling rig 210. Specifically, steering control system 168 is shown with logical functionality including an autodriller 510, a bit guidance 512, and an autoslide 514. Drilling rig 210 is hierarchically shown including rig controls 520, which provide secure control logic and processing capability, along with drilling equipment 530, which represents the physical equipment used for drilling at drilling rig 210. As shown, rig controls 520 include WOB/differential pressure control system 522, positional/rotary control system 524, fluid circulation control system 526, and sensor system 528, while drilling equipment 530 includes a draw works/snub 532, top drive 140, mud pumping equipment 536, and MWD/wireline equipment 538.

Figure 10:
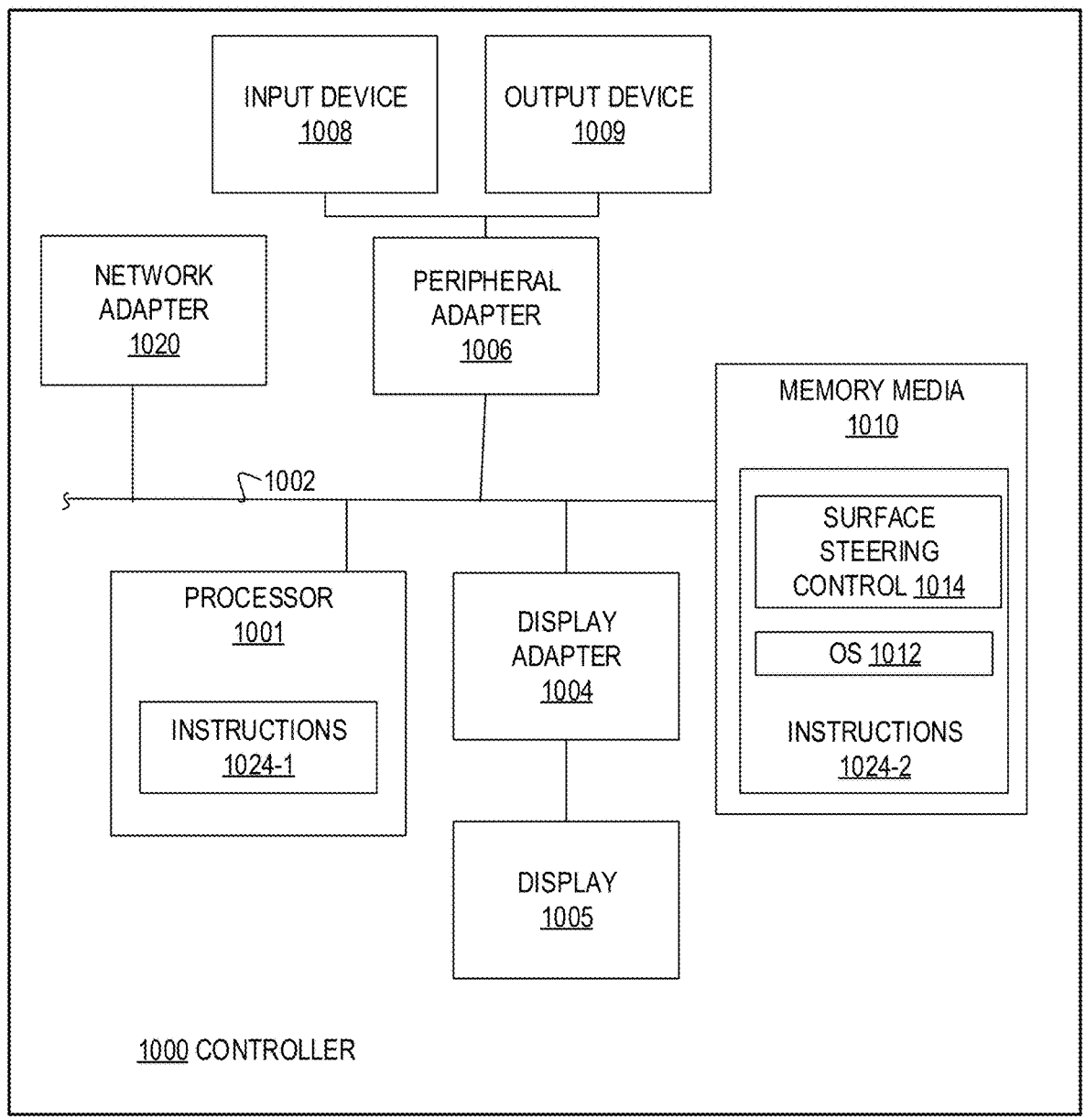
FIG. 10 is a depiction of a controller usable by the rig control systems.

Steering control system 168 represent an instance of a processor having an accessible memory storing instructions executable by the processor, such as an instance of controller 1000 shown in FIG. 10. Also, WOB/differential pressure control system 522, positional/rotary control system 524, and fluid circulation control system 526 may each represent an instance of a processor having an accessible memory storing instructions executable by the processor, such as an instance of controller 1000 shown in FIG. 10, but for example, in a configuration as a programmable logic controller (PLC) that may not include a user interface but may be used as an embedded controller. Accordingly, it is noted that each of the systems included in rig controls 520 may be a separate controller, such as a PLC, and may autonomously operate, at least to a degree. Steering control system 168 may represent hardware that executes instructions to implement a surface steerable system that provides feedback and automation capability to an operator, such as a driller. For example, steering control system 168 may cause autodriller 510, bit guidance 512 (also referred to as a bit guidance system (BGS)), and autoslide 514 (among others, not shown) to be activated and executed at an appropriate time during drilling. In particular implementations, steering control system 168 may be enabled to provide a user interface during drilling, such as the user interface 850 depicted and described below with respect to FIG. 8. Accordingly, steering control system 168 may interface with rig controls 520 to facilitate manual, assisted manual, semi-automatic, and automatic operation of drilling equipment 530 included in drilling rig 210. It is noted that rig controls 520 may also accordingly be enabled for manual or user-controlled operation of drilling and may include certain levels of automation with respect to drilling equipment 530.

In rig control systems 500 of FIG. 5, WOB/differential pressure control system 522 may be interfaced with draw works/snubbing unit 532 to control WOB of drill string 146. Positional/rotary control system 524 may be interfaced with top drive 140 to control rotation of drill string 146. Fluid circulation control system 526 may be interfaced with mud pumping equipment 536 to control mud flow and may also receive and decode mud telemetry signals. Sensor system 528 may be interfaced with MWD/wireline equipment 538, which may represent various BHA sensors and instrumentation equipment, among other sensors that may be downhole or at the surface.

In rig control systems 500, autodriller 510 may represent an automated rotary drilling system and may be used for controlling rotary drilling. Accordingly, autodriller 510 may enable automate operation of rig controls 520 during rotary drilling, as indicated in the drill plan. Bit guidance 512 may represent an automated control system to monitor and control performance and operation drilling bit 148.

In rig control systems 500, autoslide 514 may represent an automated slide drilling system and may be used for controlling slide drilling. Accordingly, autoslide 514 may enable automate operation of rig controls 520 during a slide and may return control to steering control system 168 for rotary drilling at an appropriate time, as indicated in the drill plan. In particular implementations, autoslide 514 may be enabled to provide a user interface during slide drilling to specifically monitor and control the slide. For example, autoslide 514 may rely on bit guidance 512 for orienting a toolface and on autodriller 510 to set WOB or control rotation or vibration of drill string 146.

Figure 6:
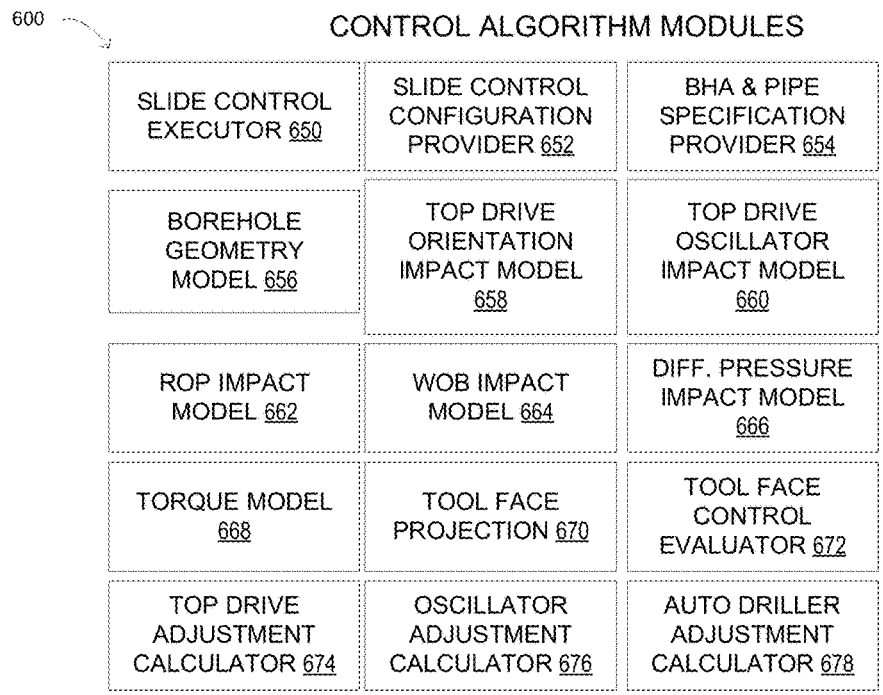
FIG. 6 is a depiction of algorithm modules used by the rig control systems.

FIG. 6 illustrates one embodiment of control algorithm modules 600 used with steering control system 168. The control algorithm modules 600 of FIG. 6 include: a slide control executor 650 that is responsible for managing the execution of the slide control algorithms; a slide control configuration provider 652 that is responsible for validating, maintaining, and providing configuration parameters for the other software modules; a BHA & pipe specification provider 654 that is responsible for managing and providing details of BHA 149 and drill string 146 characteristics; a borehole geometry model 656 that is responsible for keeping track of the borehole geometry and providing a representation to other software modules; a top drive orientation impact model 658 that is responsible for modeling the impact that changes to the angular orientation of top drive 140 have had on the toolface control; a top drive oscillator impact model 660 that is responsible for modeling the impact that oscillations of top drive 140 has had on the toolface control; an ROP impact model 662 that is responsible for modeling the effect on the toolface control of a change in ROP or a corresponding ROP set point; a WOB impact model 664 that is responsible for modeling the effect on the toolface control of a change in WOB or a corresponding WOB set point; a differential pressure impact model 666 that is responsible for modeling the effect on the toolface control of a change in differential pressure (DP) or a corresponding DP set point; a torque model 668 that is responsible for modeling the comprehensive representation of torque for surface, downhole, break over, and reactive torque, modeling impact of those torque values on toolface control, and determining torque operational thresholds; a toolface control evaluator 672 that is responsible for evaluating all factors impacting toolface control and whether adjustments need to be projected, determining whether re-alignment off-bottom is indicated, and determining off-bottom toolface operational threshold windows; a toolface projection 670 that is responsible for projecting toolface behavior for top drive 140, the top drive oscillator, and auto driller adjustments; a top drive adjustment calculator 674 that is responsible for calculating top drive adjustments resultant to toolface projections; an oscillator adjustment calculator 676 that is responsible for calculating oscillator adjustments resultant to toolface projections; and an autodriller adjustment calculator 678 that is responsible for calculating adjustments to autodriller 510 resultant to toolface projections.

Figure 7:
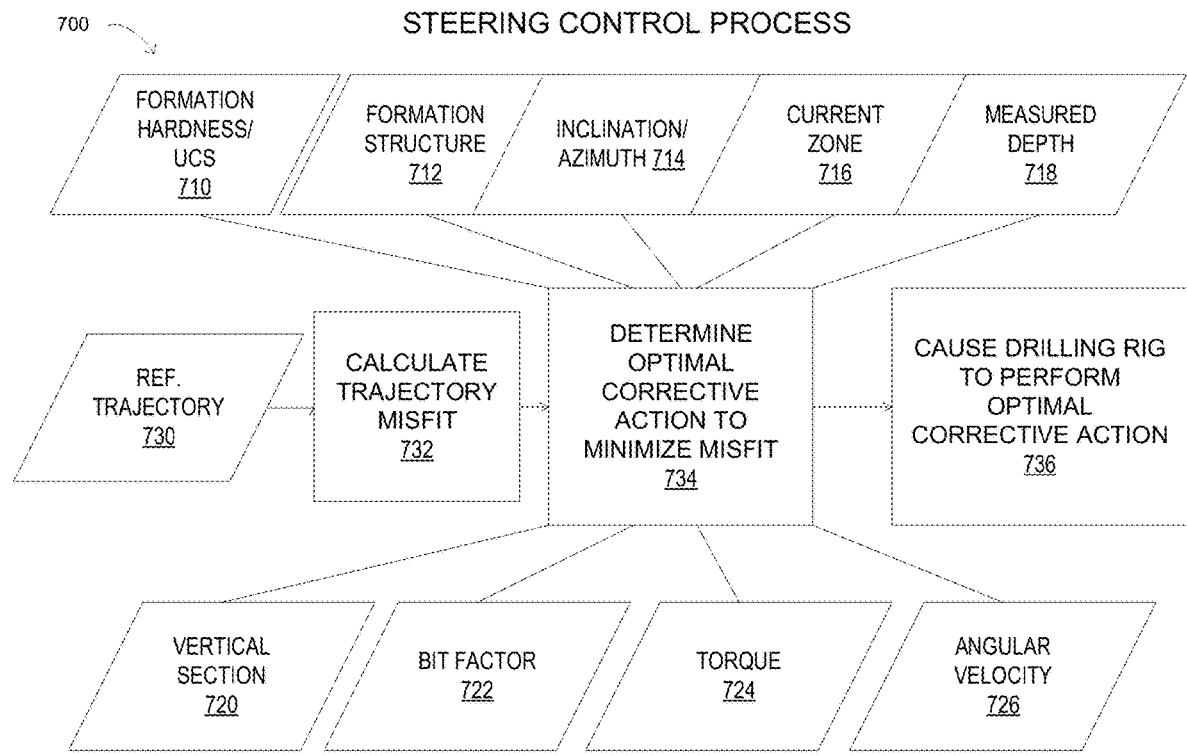
FIG. 7 is a depiction of a steering control process used by the rig control systems.

FIG. 7 illustrates one embodiment of a steering control process 700 for determining an optimal corrective action for drilling. Steering control process 700 may be used for rotary drilling or slide drilling in different embodiments.

Steering control process 700 in FIG. 7 illustrates a variety of inputs that can be used to determine an optimum corrective action. As shown in FIG. 7, the inputs include formation hardness/unconfined compressive strength (UCS) 710, formation structure 712, inclination/azimuth 714, current zone 716, measured depth 718, desired toolface 730, vertical section 720, bit factor 722, mud motor torque 724, reference trajectory 730, and angular velocity 726. In FIG. 7, reference trajectory 730 of borehole 106 is determined to calculate a trajectory misfit in a step 732. Step 732 may output the trajectory misfit to determine an optimal corrective action to minimize the misfit at step 734, which may be performed using the other inputs described above. Then, at step 736, the drilling rig is caused to perform the optimal corrective action.

It is noted that in some implementations, at least certain portions of steering control process 700 may be automated or performed without user intervention, such as using rig control systems 700 (see FIG. 7). In other implementations, the optimal corrective action in step 736 may be provided or communicated (by display, SMS message, email, or otherwise) to one or more human operators, who may then take appropriate action. The human operators may be members of a rig crew, which may be located at or near drilling rig 210 or may be located remotely from drilling rig 210.

Figure 8:
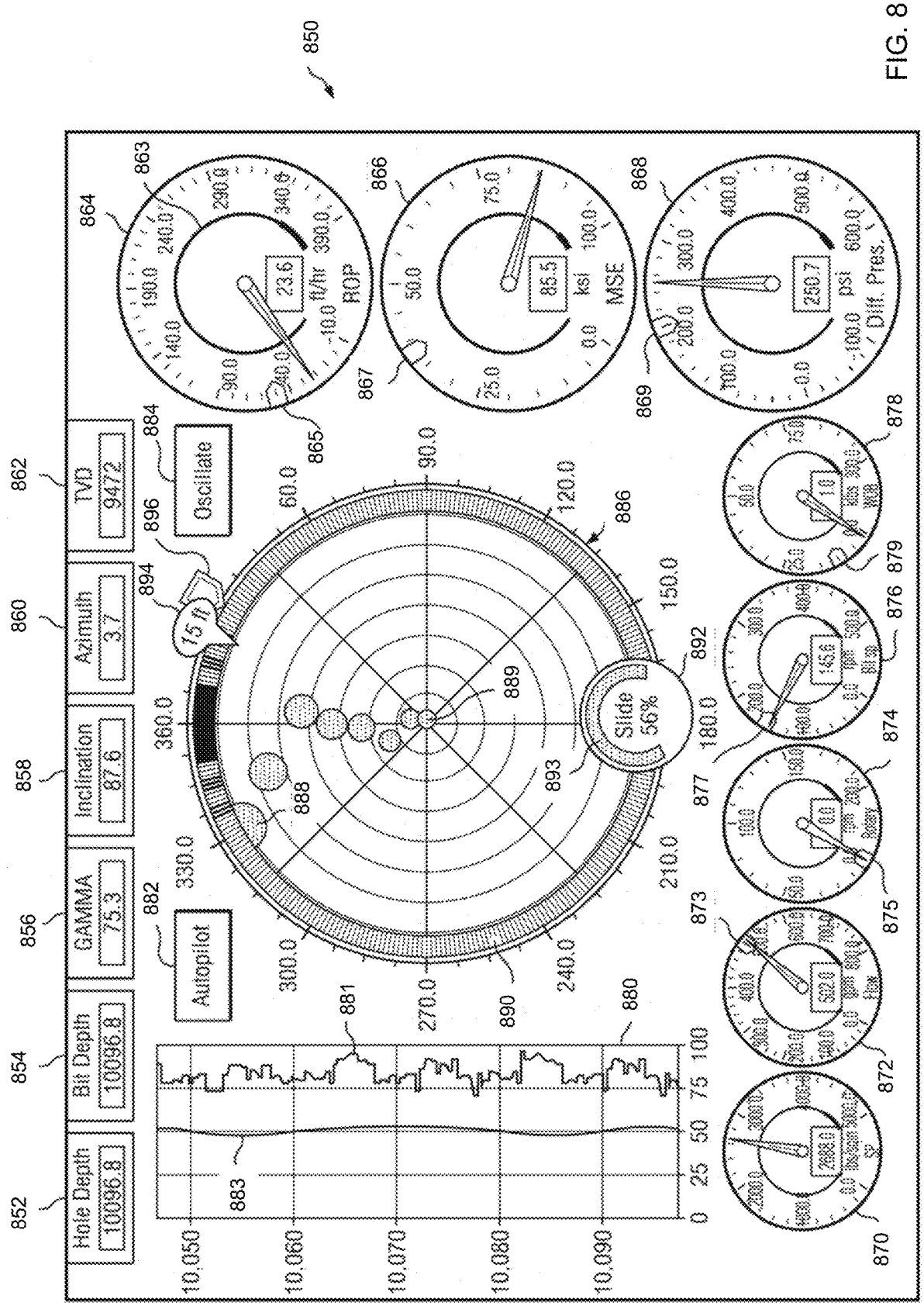
FIG. 8 is a depiction of a graphical user interface provided by the rig control systems.

Referring to FIG. 8, one embodiment of a user interface 850 that may be generated by steering control system 168 for monitoring and operation by a human operator is illustrated. User interface 850 may provide many different types of information in an easily accessible format. For example, user interface 850 may be shown on a computer monitor, a television, a viewing screen (e.g., a display device) associated with steering control system 168. In some embodiments, at least certain portions of user interface 850 may be displayed to and operated by a user of steering control system 168 on a mobile device, such as a tablet or a smartphone (see also FIG. 10). For example, steering control system 168 may support mobile applications that enable user interface 850, or other user interfaces, to be used on the mobile device, for example, within a vicinity of drilling rig 210.

As shown in FIG. 8, a user interface 850 provides visual indicators such as a hole depth indicator 852, a bit depth indicator 854, a GAMMA indicator 856, an inclination indicator 858, an azimuth indicator 860, and a TVD indicator 862. Other indicators may also be provided, including a ROP indicator 864, a mechanical specific energy (MSE) indicator 866, a differential pressure indicator 868, a standpipe pressure indicator 870, a flow rate indicator 872, a rotary RPM (angular velocity) indicator 874, a bit speed indicator 876, and a WOB indicator 878.

In FIG. 8, at least some of indicators 864, 866, 868, 870, 872, 874, 876, and 878 may include a marker representing a target value. For example, markers may be set as certain given values, but it is noted that any desired target value may be used. Although not shown, in some embodiments, multiple markers may be present on a single indicator. The markers may vary in color or size. For example, ROP indicator 864 may include a marker 865 indicating that the target value is 50 feet/hour (or 15 meters per hour). MSE indicator 866 may include a marker 867 indicating that the target value is 37 kilo pounds per square inch (ksi) (or 255 MegaPascals (MPa)). Differential pressure indicator 868 may include a marker 869 indicating that the target value is 200 psi (or 1,380 kPa). ROP indicator 864 may include a marker 865 indicating that the target value is 50 feet/hour (or 15 m/h). Standpipe pressure indicator 870 may have no marker in the present example. Flow rate indicator 872 may include a marker 873 indicating that the target value is 500 gallons per minute (gpm) (or 31.5 liters per second). Rotary RPM indicator 874 may include a marker 875 indicating that the target value is 0 RPM (e.g., due to sliding). Bit speed indicator 876 may include a marker 877 indicating that the target value is 150 RPM. WOB indicator 878 may include a marker 879 indicating that the target value is 10 klbs (or 4,500 kg). Each indicator may also include a colored band, or another marking, to indicate, for example, whether the respective gauge value is within a safe range (e.g., indicated by a green color), within a caution range (e.g., indicated by a yellow color), or within a danger range (e.g., indicated by a red color).

In FIG. 8, a log chart 880 may visually indicate depth versus one or more measurements (e.g., may represent log inputs relative to a progressing depth chart). For example, log chart 880 may have a Y-axis representing depth and an X-axis representing a measurement such as GAMMA count 881 (as shown), ROP 883 (e.g., empirical ROP and normalized ROP), or resistivity. An autopilot button 882 and an oscillate button 884 may be used to control activity. For example, autopilot button 882 may be used to engage or disengage autodriller 510, while oscillate button 884 may be used to directly control oscillation of drill string 146 or to engage/disengage an external hardware device or controller.

In FIG. 8, a circular chart 886 may provide current and historical toolface orientation information (e.g., which way the bend is pointed). For purposes of illustration, circular chart 886 represents three hundred and sixty degrees. A series of circles within circular chart 886 may represent a timeline of toolface orientations, with the sizes of the circles indicating the temporal position of each circle. For example, larger circles may be more recent than smaller circles, so a largest circle 888 may be the newest reading and a smallest circle 889 may be the oldest reading. In other embodiments, circles 889, 888 may represent the energy or progress made via size, color, shape, a number within a circle, etc. For example, a size of a particular circle may represent an accumulation of orientation and progress for the period of time represented by the circle. In other embodiments, concentric circles representing time (e.g., with the outside of circular chart 886 being the most recent time and the center point being the oldest time) may be used to indicate the energy or progress (e.g., via color or patterning such as dashes or dots rather than a solid line).

In user interface 850, circular chart 886 may also be color coded, with the color coding existing in a band 890 around circular chart 886 or positioned or represented in other ways. The color coding may use colors to indicate activity in a certain direction. For example, the color red may indicate the highest level of activity, while the color blue may indicate the lowest level of activity. Furthermore, the arc range in degrees of a color may indicate the amount of deviation. Accordingly, a relatively narrow (e.g., thirty degrees) arc of red with a relatively broad (e.g., three hundred degrees) arc of blue may indicate that most activity is occurring in a particular toolface orientation with little deviation. As shown in user interface 850, the color blue may extend from approximately 22-337 degrees, the color green may extend from approximately 15-22 degrees and 337-345 degrees, the color yellow may extend a few degrees around the 13 and 345 degree marks, while the color red may extend from approximately 347-10 degrees. Transition colors or shades may be used with, for example, the color orange marking the transition between red and yellow or a light blue marking the transition between blue and green. This color coding may enable user interface 850 to provide an intuitive summary of how narrow the standard deviation is and how much of the energy intensity is being expended in the proper direction. Furthermore, the center of energy may be viewed relative to the target. For example, user interface 850 may clearly show that the target is at 90 degrees, but the center of energy is at 45 degrees.

In user interface 850, other indicators, such as a slide indicator 892, may indicate how much time remains until a slide occurs or how much time remains for a current slide. For example, slide indicator 892 may represent a time, a percentage (e.g., as shown, a current slide may be 56% complete), a distance completed, or a distance remaining. Slide indicator 892 may graphically display information using, for example, a colored bar 893 that increases or decreases with slide progress. In some embodiments, slide indicator 892 may be built into circular chart 886 (e.g., around the outer edge with an increasing/decreasing band), while in other embodiments slide indicator 892 may be a separate indicator such as a meter, a bar, a gauge, or another indicator type. In various implementations, slide indicator 892 may be refreshed by autoslide 514.

In user interface 850, an error indicator 894 may indicate a magnitude and a direction of error. For example, error indicator 894 may indicate that an estimated drill bit position is a certain distance from the planned trajectory, with a location of error indicator 894 around the circular chart 886 representing the heading. For example, FIG. 8 illustrates an error magnitude of 15 feet and an error direction of 15 degrees. Error indicator 894 may be any color but may be red for purposes of example. It is noted that error indicator 894 may present a zero if there is no error. Error indicator may represent that drill bit 148 is on the planned trajectory using other means, such as being a green color. Transition colors, such as yellow, may be used to indicate varying amounts of error. In some embodiments, error indicator 894 may not appear unless there is an error in magnitude or direction. A marker 896 may indicate an ideal slide direction. Although not shown, other indicators may be present, such as a bit life indicator to indicate an estimated lifetime for the current bit based on a value such as time or distance.

It is noted that user interface 850 may be arranged in many different ways. For example, colors may be used to indicate normal operation, warnings, and problems. In such cases, the numerical indicators may display numbers in one color (e.g., green) for normal operation, may use another color (e.g., yellow) for warnings, and may use yet another color (e.g., red) when a serious problem occurs. The indicators may also flash or otherwise indicate an alert. The gauge indicators may include colors (e.g., green, yellow, and red) to indicate operational conditions and may also indicate the target value (e.g., an ROP of 100 feet/hour). For example, ROP indicator 864 may have a green bar to indicate a normal level of operation (e.g., from 10-300 feet/hour), a yellow bar to indicate a warning level of operation (e.g., from 300-360 feet/hour), and a red bar to indicate a dangerous or otherwise out of parameter level of operation (e.g., from 360-390 feet/hour). ROP indicator 864 may also display a marker at 100 feet/hour to indicate the desired target ROP.

Furthermore, the use of numeric indicators, gauges, and similar visual display indicators may be varied based on factors such as the information to be conveyed and the personal preference of the viewer. Accordingly, user interface 850 may provide a customizable view of various drilling processes and information for a particular individual involved in the drilling process. For example, steering control system 168 may enable a user to customize the user interface 850 as desired, although certain features (e.g., standpipe pressure) may be locked to prevent a user from intentionally or accidentally removing important drilling information from user interface 850. Other features and attributes of user interface 850 may be set by user preference. Accordingly, the level of customization and the information shown by the user interface 850 may be controlled based on who is viewing user interface 850 and their role in the drilling process.

Figure 9:
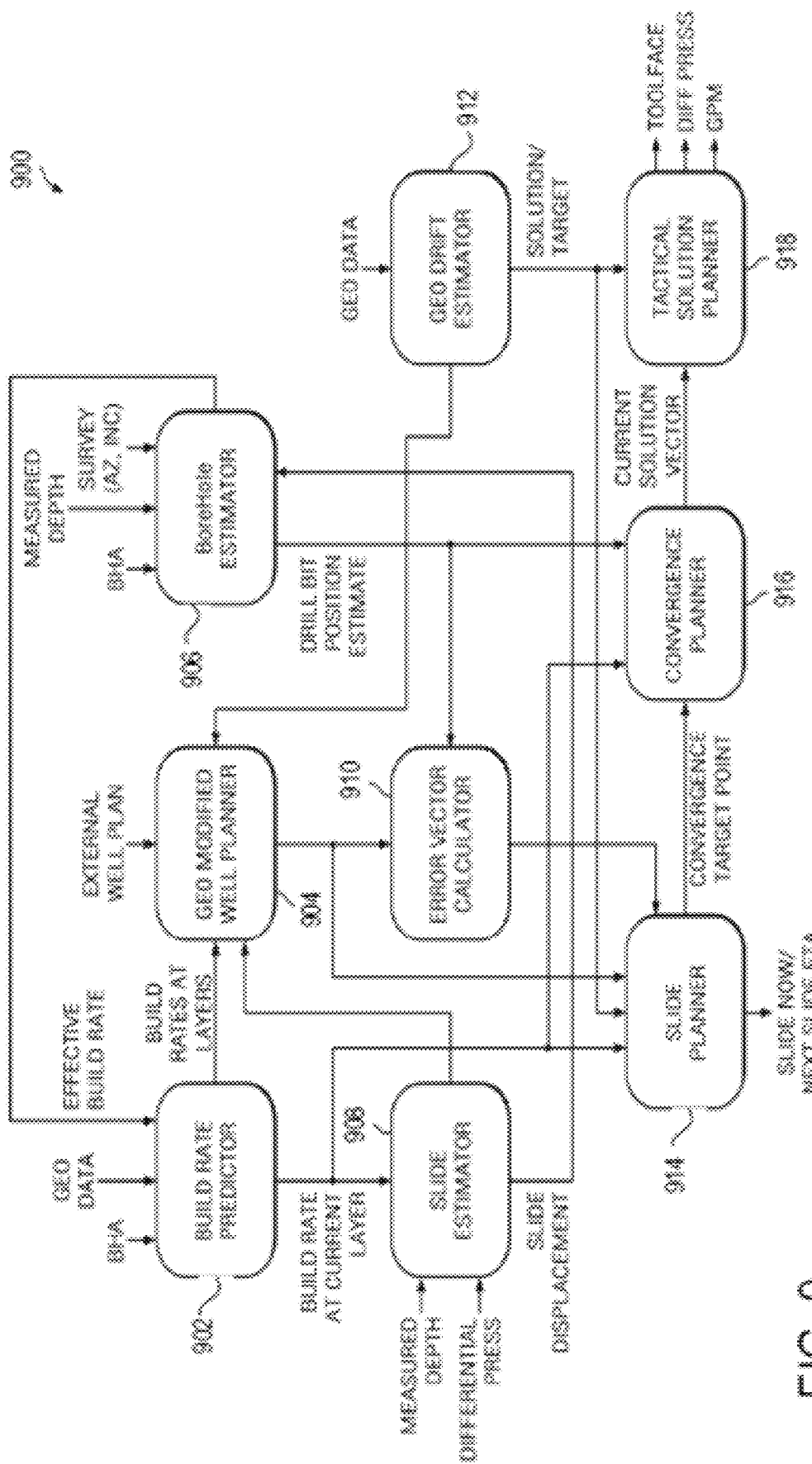
FIG. 9 is a depiction of a guidance control loop performed by the rig control systems.

Referring to FIG. 9, one embodiment of a guidance control loop (GCL) 900 is shown in further detail GCL 900 may represent one example of a control loop or control algorithm executed under the control of steering control system 168. GCL 900 may include various functional modules, including a build rate predictor 902, a geo modified well planner 904, a borehole estimator 906, a slide estimator 908, an error vector calculator 910, a geological drift estimator 912, a slide planner 914, a convergence planner 916, and a tactical solution planner 918. In the following description of GCL 900, the term "external input" refers to input received from outside GCL 900, while "internal input" refers to input exchanged between functional modules of GCL 900.

In FIG. 9, build rate predictor 902 receives external input representing BHA information and geological information, receives internal input from the borehole estimator 906, and provides output to geo modified well planner 904, slide estimator 908, slide planner 914, and convergence planner 916. Build rate predictor 902 is configured to use the BHA information and geological information to predict drilling build rates of current and future sections of borehole 106. For example, build rate predictor 902 may determine how aggressively a curve will be built for a given formation with BHA 149 and other equipment parameters.

In FIG. 9, build rate predictor 902 may use the orientation of BHA 149 to the formation to determine an angle of attack for formation transitions and build rates within a single layer of a formation. For example, if a strata layer of rock is below a strata layer of sand, a formation transition exists between the strata layer of sand and the strata layer of rock. Approaching the strata layer of rock at a 90 degree angle may provide a good toolface and a clean drill entry, while approaching the rock layer at a 45 degree angle may build a curve relatively quickly. An angle of approach that is near parallel may cause drill bit 148 to skip off the upper surface of the strata layer of rock. Accordingly, build rate predictor 902 may calculate BHA orientation to account for formation transitions. Within a single strata layer, build rate predictor 902 may use the BHA orientation to account for internal layer characteristics (e.g., grain) to determine build rates for different parts of a strata layer. The BHA information may include bit characteristics, mud motor bend setting, stabilization, and mud motor bit to bend distance. The geological information may include formation data such as compressive strength, thicknesses, and depths for formations encountered in the specific drilling location. Such information may enable a calculation-based prediction of the build rates and ROP that may be compared to both results obtained while drilling borehole 106 and regional historical results (e.g., from the regional drilling DB 412) to improve the accuracy of predictions as drilling progresses. Build rate predictor 902 may also be used to plan convergence adjustments and confirm in advance of drilling that targets can be achieved with current parameters.

In FIG. 9, geo modified well planner 904 receives external input representing a drill plan, internal input from build rate predictor 902 and geo drift estimator 912 and provides output to slide planner 914 and error vector calculator 910. Geo modified well planner 904 uses the input to determine whether there is a more optimal trajectory than that provided by the drill plan, while staying within specified error limits. More specifically, geo modified well planner 904 takes geological information (e.g., drift) and calculates whether another trajectory solution to the target may be more efficient in terms of cost or reliability. The outputs of geo modified well planner 904 to slide planner 914 and error vector calculator 910 may be used to calculate an error vector based on the current vector to the newly calculated trajectory and to modify slide predictions. In some embodiments, geo modified well planner 904 (or another module) may provide functionality needed to track a formation trend. For example, in horizontal wells, a geologist may provide steering control system 168 with a target inclination as a set point for steering control system 168 to control. For example, the geologist may enter a target to steering control system 168 of 90.5-91.0 degrees of inclination for a section of borehole 106. Geo modified well planner 904 may then treat the target as a vector target, while remaining within the error limits of the original drill plan. In some embodiments, geo modified well planner 904 may be an optional module that is not used unless the drill plan is to be modified. For example, if the drill plan is marked in steering control system 168 as non-modifiable, geo modified well planner 904 may be bypassed altogether or geo modified well planner 904 may be configured to pass the drill plan through without any changes.

In FIG. 9, borehole estimator 906 may receive external inputs representing BHA information, measured depth information, survey information (e.g., azimuth and inclination), and may provide outputs to build rate predictor 902, error vector calculator 910, and convergence planner 916. Borehole estimator 906 may be configured to provide an estimate of the actual borehole and drill bit position and trajectory angle without delay, based on either straight line projections or projections that incorporate sliding. Borehole estimator 906 may be used to compensate for a sensor being physically located some distance behind drill bit 148 (e.g., 50 feet) in drill string 146, which makes sensor readings lag the actual bit location by 50 feet. Borehole estimator 906 may also be used to compensate for sensor measurements that may not be continuous (e.g., a sensor measurement may occur every 100 feet). Borehole estimator 906 may provide the most accurate estimate from the surface to the last survey location based on the collection of survey measurements. Also, borehole estimator 906 may take the slide estimate from slide estimator 908 (described below) and extend the slide estimate from the last survey point to a current location of drill bit 148. Using the combination of these two estimates, borehole estimator 906 may provide steering control system 168 with an estimate of the drill bit's location and trajectory angle from which guidance and steering solutions can be derived. An additional metric that can be derived from the borehole estimate is the effective build rate that is achieved throughout the drilling process.

In FIG. 9, slide estimator 908 receives external inputs representing measured depth and differential pressure information, receives internal input from build rate predictor 902, and provides output to borehole estimator 906 and geo modified well planner 904. Slide estimator 908 may be configured to sample toolface orientation, differential pressure, measured depth (MD) incremental movement, MSE, and other sensor feedback to quantify/estimate a deviation vector and progress while sliding.

Traditionally, deviation from the slide would be predicted by a human operator based on experience. The operator would, for example, use a long slide cycle to assess what likely was accomplished during the last slide. However, the results are generally not confirmed until the downhole survey sensor point passes the slide portion of the borehole, often resulting in a response lag defined by a distance of the sensor point from the drill bit tip (e.g., approximately 50 feet). Such a response lag may introduce inefficiencies in the slide cycles due to over/under correction of the actual trajectory relative to the planned trajectory.

In GCL 900, using slide estimator 908, each toolface update may be algorithmically merged with the average differential pressure of the period between the previous and current toolface readings, as well as the MD change during this period to predict the direction, angular deviation, and MD progress during the period. As an example, the periodic rate may be between 10 and 60 seconds per cycle depending on the toolface update rate of downhole tool 166. With a more accurate estimation of the slide effectiveness, the sliding efficiency can be improved. The output of slide estimator 908 may accordingly be periodically provided to borehole estimator 906 for accumulation of well deviation information, as well to geo modified well planner 904. Some or all of the output of the slide estimator 908 may be output to an operator, such as shown in the user interface 850 of FIG. 8.

In FIG. 9, error vector calculator 910 may receive internal input from geo modified well planner 904 and borehole estimator 906. Error vector calculator 910 may be configured to compare the planned well trajectory to an actual borehole trajectory and drill bit position estimate. Error vector calculator 910 may provide the metrics used to determine the error (e.g., how far off) the current drill bit position and trajectory are from the drill plan. For example, error vector calculator 910 may calculate the error between the current bit position and trajectory to the planned trajectory and the desired bit position. Error vector calculator 910 may also calculate a projected bit position/projected trajectory representing the future result of a current error.

In FIG. 9, geological drift estimator 912 receives external input representing geological information and provides outputs to geo modified well planner 904, slide planner 914, and tactical solution planner 918. During drilling, drift may occur as the particular characteristics of the formation affect the drilling direction. More specifically, there may be a trajectory bias that is contributed by the formation as a function of ROP and BHA 149. Geological drift estimator 912 is configured to provide a drift estimate as a vector that can then be used to calculate drift compensation parameters that can be used to offset the drift in a control solution.

In FIG. 9, slide planner 914 receives internal input from build rate predictor 902, geo modified well planner 904, error vector calculator 910, and geological drift estimator 912, and provides output to convergence planner 916 as well as an estimated time to the next slide. Slide planner 914 may be configured to evaluate a slide/drill ahead cost equation and plan for sliding activity, which may include factoring in BHA wear, expected build rates of current and expected formations, and the drill plan trajectory. During drill ahead, slide planner 914 may attempt to forecast an estimated time of the next slide to aid with planning. For example, if additional lubricants (e.g., fluorinated beads) are indicated for the next slide, and pumping the lubricants into drill string 146 has a lead time of 30 minutes before the slide, the estimated time of the next slide may be calculated and then used to schedule when to start pumping the lubricants. Functionality for a loss circulation material (LCM) planner may be provided as part of slide planner 914 or elsewhere (e.g., as a stand-alone module or as part of another module described herein). The LCM planner functionality may be configured to determine whether additives should be pumped into the borehole based on indications such as flow-in versus flow-back measurements. For example, if drilling through a porous rock formation, fluid being pumped into the borehole may get lost in the rock formation. To address this issue, the LCM planner may control pumping LCM into the borehole to clog up the holes in the porous rock surrounding the borehole to establish a more closed-loop control system for the fluid.

In FIG. 9, slide planner 914 may also look at the current position relative to the next connection. A passageway may happen every 90 to 100 feet (or some other distance or distance range based on the particulars of the drilling operation) and slide planner 914 may avoid planning a slide when close to a passageway or when the slide would carry through the connection. For example, if the slide planner 914 is planning a 50 foot slide but only 20 feet remain until the next connection, slide planner 914 may calculate the slide starting after the next passageway and make any changes to the slide parameters to accommodate waiting to slide until after the next connection. Such flexible implementation avoids inefficiencies that may be caused by starting the slide, stopping for the connection, and then having to reorient the toolface before finishing the slide. During slides, slide planner 914 may provide some feedback as to the progress of achieving the desired goal of the current slide. In some embodiments, slide planner 914 may account for reactive torque in the drill string. More specifically, when rotating is occurring, there is a reactional torque wind up in drill string 146. When the rotating is stopped, drill string 146 unwinds, which changes toolface orientation and other parameters. When rotating is started again, drill string 146 starts to wind back up. Slide planner 914 may account for the reactional torque so that toolface references are maintained, rather than stopping rotation and then trying to adjust to an optimal toolface orientation. While not all downhole tools may provide toolface orientation when rotating, using one that does supply such information for GCL 900 may significantly reduce the transition time from rotating to sliding.

In FIG. 9, convergence planner 916 receives internal inputs from build rate predictor 902, borehole estimator 906, and slide planner 914, and provides output to tactical solution planner 918. Convergence planner 916 is configured to provide a convergence plan when the current drill bit position is not within a defined margin of error of the planned well trajectory. The convergence plan represents a path from the current drill bit position to an achievable and optimal convergence target point along the planned trajectory. The convergence plan may take account the amount of sliding/drilling ahead that has been planned to take place by slide planner 914. Convergence planner 916 may also use BHA orientation information for angle of attack calculations when determining convergence plans as described above with respect to build rate predictor 902. The solution provided by convergence planner 916 defines a new trajectory solution for the current position of drill bit 148. The solution may be immediate without delay, or planned for implementation at a future time that is specified in advance.

In FIG. 9, tactical solution planner 918 receives internal inputs from geological drift estimator 912 and convergence planner 916 and provides external outputs representing information such as toolface orientation, differential pressure, and mud flow rate. Tactical solution planner 918 is configured to take the trajectory solution provided by convergence planner 916 and translate the solution into control parameters that can be used to control drilling rig 210. For example, tactical solution planner 918 may convert the solution into settings for control systems 522, 524, and 526 to accomplish the actual drilling based on the solution. Tactical solution planner 918 may also perform performance optimization to optimizing the overall drilling operation as well as optimizing the drilling itself (e.g., how to drill faster).

Other functionality may be provided by GCL 900 in additional modules or added to an existing module. For example, there is a relationship between the rotational position of the drill pipe on the surface and the orientation of the downhole toolface. Accordingly, GCL 900 may receive information corresponding to the rotational position of the drill pipe on the surface. GCL 900 may use this surface positional information to calculate current and desired toolface orientations. These calculations may then be used to define control parameters for adjusting the top drive 140 to accomplish adjustments to the downhole toolface in order to steer the trajectory of borehole 106.

For purposes of example, an object-oriented software approach may be utilized to provide a class-based structure that may be used with GCL 900, or other functionality provided by steering control system 168. In GCL 900, a drilling model class may be defined to capture and define the drilling state throughout the drilling process. The drilling model class may include information obtained without delay. The drilling model class may be based on the following components and sub-models: a drill bit model, a borehole model, a rig surface gear model, a mud pump model, a/differential pressure model, a positional/rotary model, an MSE model, an active drill plan, and control limits. The drilling model class may produce a control output solution and may be executed via a main processing loop that rotates through the various modules of GCL 900. The drill bit model may represent the current position and state of drill bit 148. The drill bit model may include a three dimensional (3D) position, a drill bit trajectory, BHA information, bit speed, and toolface (e.g., orientation information). The 3D position may be specified in north-south (NS), east-west (EW), and true vertical depth (TVD). The drill bit trajectory may be specified as an inclination angle and an azimuth angle. The BHA information may be a set of dimensions defining the active BHA. The borehole model may represent the current path and size of the active borehole. The borehole model may include hole depth information, an array of survey points collected along the borehole path, a gamma log, and borehole diameters. The hole depth information is for current drilling of borehole 106. The borehole diameters may represent the diameters of borehole 106 as drilled over current drilling. The rig surface gear model may represent pipe length, block height, and other models, such as the mud pump model, WOB/differential pressure model, positional/rotary model, and MSE model. The mud pump model represents mud pump equipment and includes flow rate, standpipe pressure, and differential pressure. The WOB/differential pressure model represents draw works or other WOB/differential pressure controls and parameters, including WOB. The positional/rotary model represents top drive or other positional/rotary controls and parameters including rotary RPM and spindle position. The active drill plan represents the target borehole path and may include an external drill plan and a modified drill plan. The control limits represent defined parameters that may be set as maximums and/or minimums. For example, control limits may be set for the rotary RPM in the top drive model to limit the maximum rotations per minute (RPMs) to the defined level. The control output solution may represent the control parameters for drilling rig 210.

Each functional module of GCL 900 may have behavior encapsulated within a respective class definition. During a processing window, the individual functional modules may have an exclusive portion in time to execute and update the drilling model. For purposes of example, the processing order for the functional modules may be in the sequence of geo modified well planner 904, build rate predictor 902, slide estimator 908, borehole estimator 906, error vector calculator 910, slide planner 914, convergence planner 916, geological drift estimator 912, and tactical solution planner 918. It is noted that other sequences may be used in different implementations.

In FIG. 9, GCL 900 may rely on a programmable timer module that provides a timing mechanism to provide timer event signals to drive the main processing loop. While steering control system 168 may rely on timer and date calls driven by the programming environment, timing may be obtained from other sources than system time. In situations where it may be advantageous to manipulate the clock (e.g., for evaluation and testing), a programmable timer module may be used to alter the system time. For example, the programmable timer module may enable a default time set to the system time and a time scale of 1.0, may enable the system time of steering control system 168 to be manually set, may enable the time scale relative to the system time to be modified, or may enable periodic event time requests scaled to a requested time scale.

Referring now to FIG. 10, a block diagram illustrating selected elements of an embodiment of a controller 1000 for performing steering methods and systems for improved drilling performance according to the present disclosure. In various embodiments, controller 1000 may represent an implementation of steering control system 168. In other embodiments, at least certain portions of controller 1000 may be used for control systems 510, 512, 514, 522, 524, and 526 (see FIG. 5).

In the embodiment depicted in FIG. 10, controller 1000 includes processor 1001 coupled via shared bus 1002 to storage media collectively identified as memory media 1010.

Controller 1000, as depicted in FIG. 10, further includes network adapter 1020 that interfaces controller 1000 to a network (not shown in FIG. 10). In embodiments suitable for use with user interfaces, controller 1000, as depicted in FIG. 10, may include peripheral adapter 1006, which provides connectivity for the use of input device 1008 and output device 1009. Input device 1008 may represent a device for user input, such as a keyboard or a mouse, or even a video camera. Output device 1009 may represent a device for providing signals or indications to a user, such as loudspeakers for generating audio signals.

Controller 1000 is shown in FIG. 10 including display adapter 1004 and further includes a display device 1005. Display adapter 1004 may interface shared bus 1002, or another bus, with an output port for one or more display devices, such as display device 1005. Display device 1005 may be implemented as a liquid crystal display screen, a computer monitor, a television, or the like. Display device 1005 may comply with a display standard for the corresponding type of display. Standards for computer monitors include analog standards such as video graphics array (VGA), extended graphics array (XGA), etc., or digital standards such as digital visual interface (DVI), definition multimedia interface (HDMI), among others. A television display may comply with standards such as NTSC (National Television System Committee), PAL (Phase Alternating Line), or another suitable standard. Display device 1005 may include an output device 1009, such as one or more integrated speakers to play audio content, or may include an input device 1008, such as a microphone or video camera.

In FIG. 10, memory media 1010 encompasses persistent and volatile media, fixed and removable media, and magnetic and semiconductor media. Memory media 1010 is operable to store instructions, data, or both. Memory media 1010 as shown includes sets or sequences of instructions 1024-2, namely, an operating system 1012 and steering control 1014. Operating system 1012 may be a UNIX or UNIX-like operating system, a Windows® family operating system, or another suitable operating system. Instructions 1024 may also reside, completely or at least partially, within processor 1001 during execution thereof. It is further noted that processor 1001 may be configured to receive instructions 1024-1 from instructions 1024-2 via shared bus 1002. In some embodiments, memory media 1010 is configured to store and provide executable instructions for executing GCL 900, as mentioned previously, among other methods and operations disclosed herein.

As noted previously, steering control system 168 may support the display and operation of various user interfaces, such as in a client/server architecture. For example, steering control 1014 may be enabled to support a web server for providing the user interface to a web browser client, such as on a mobile device or on a personal computer device. In another example, steering control 1014 may be enabled to support an app server for providing the user interface to a client app, such as on a mobile device or on a personal computer device. It is noted that in the web server or the app server architecture, surface steering control 1014 may handle various communications to rig controls 520 while simultaneously supporting the web browser client or the client app with the user interface.

Drilling Reports

During drilling a well, a great deal of information is generated and collected. Stakeholders interested in the drilling operations usually want updates reporting on drilling progress, often daily or sometimes more frequently. Daily drilling reports (DDR) are typically generated by drilling operators and teams during the drilling process of oil and gas wells. These reports can serve as a critical record of all activities, events, and data associated with the drilling operation on a day-to-day basis and serve as progress reports to persons interested in the drilling of a well and its progress. Such reports can provide valuable insights, as well as a chronological overview of the drilling progress, technical details, safety measures, unexpected conditions, corrections, how progress compares to the well plan, and other relevant information. Drilling reports can provide well information, date and time of drilling activities, weather conditions, crew and personnel, drilling progress, days versus depth curves to show if the operation is ahead or behind schedule and or cost Authorization For Expenditures, and by how much, drilling parameters, mud and drilling fluid information (mud weight, viscosity, plastic viscosity, yield point, temperature), safety measures and times since last incident, equipment used (drill pipe, downhole tools including BHA, MWD, LWD, bit make and type, records of samples and cores, drilling cuttings, geological conditions and formations, comments and driller observations, areas where hole has had issues or complications, mud loss zones, areas where influx was encountered, proximity to lease lines, boundaries, or trouble zones, and future plans for the drilling of the well.

The report can begin with essential well details such as well name and/or number, location (latitude and longitude), operator's name, drilling rig details, other unique identifiers for the well and/or the rig and equipment, as well as any other information of interest. Each daily drilling report is dated, indicating the specific day's activities and developments. Each report can also be provided with a time stamp, such as the time created or the time through which it covers. It is to be understood that, although the discussion herein refers to a daily report, the reports described herein can be provided at other time intervals, which may be more than once a day or may be less than once a day (e.g., every other day).

The report can document weather conditions at the wellsite, including temperature, wind speed, atmospheric pressure, and any adverse weather events that might impact drilling operations, such as rainstorms, snowstorms, blizzards, ice storms, sandstorms, excessive heat, tornadoes, and the like.

The report can provide a list of personnel involved in the drilling operations for that day, including their roles and responsibilities. This can range from drilling engineers, on site oil and gas company representatives, to rig hands, safety personnel, and third-party contractors.

A core of the report can be a detailed description of the drilling progress made during that day (i.e., the time period covered by the report). This includes data about the drilled depth, wellbore diameter, drilling rate (rate of penetration), and details about the formations encountered. Any challenges faced during drilling, such as equipment issues, geological anomalies, or drilling fluid problems, are noted.

The report can include information about the drilling parameters used during the day. This can include details about the bit that was used, the BHA used, weight on bit (WOB), rotary speed, depth of cut on the drill bit cutters (actual versus planned), drilling fluid properties (mud weight, viscosity), differential pressure, rate of penetration, mechanical specific energy, slide drilling operations, rotary drilling operations, curvature, and any adjustments made to optimize drilling efficiency and wellbore stability.

The report typically includes information about the type of drilling fluid (mud) used, its properties, volume circulated, additives added, and any changes made to the mud system.

Safety is of paramount importance in drilling operations. Daily drilling reports include a section detailing safety measures taken, safety meetings conducted, incidents (if any), and any near-miss situations. This section may also include discussions about compliance with safety regulations and protocols.

The report can provide a summary of equipment used and any maintenance or repairs carried out during the day is often included. This could cover the drilling rig, bottom hole assembly, drill bits, drill string components, and auxiliary equipment.

If any special drilling operations were conducted during the day, such as running casing, cementing, coring, or well logging, this information can be included.

If rock samples or cores were extracted from the wellbore for geological analysis, information about their depths and descriptions can be noted.

The team's observations and comments about the day's progress, challenges, successes, and any noteworthy occurrences may be included. Such information can provide helpful context to the raw data presented in the report.

The report might conclude with a section outlining the plans for the next day's drilling activities, including the anticipated drilling objectives, goals, and potential challenges.

Information from the well plan can be included in the report. For all of the information about the prior day's drilling operations described above, a comparison of such information to the corresponding information in the well plan can be included, as well as information from other offset wells that have similar characteristics, or even synthetic wells created as an amalgam of as drilled information from other wells to create a best composite well or technical limit well. For example, the prior day's rate of penetration might be compared against the well plan's, offset wells, or synthetic wells, ROP for that day's drilling. As another example, the curvature to be added to the well according to the well plan, offset wells, or synthetic wells, may be compared against the curvature actually drilled.

Daily drilling reports are important not only for real-time decision-making but also for creating a historical record that can be used for analysis, regulatory compliance, audits, and future reference in case of any issues that may arise with the well.

In the fast paced, complex, and ever-changing world of drilling, completions, & production in the oil and gas industry, the teams (techs, superintendents (field and actual), remote operations center (ROC) employees and managers, operators, engineers, managers, VP's, SVP's, CEO's, other executives, and any other stakeholders, all need to get updates and reports to understand what is happening in the drilling operations for a well.

Currently, gathering this information often requires obtaining and reading reports from multiple sources, and talking to multiple vendors/groups to get full context on the current state of the well and drilling operations and what has happened over some preceding time interval. This often happens multiple times a day (for at least some stakeholders), typically starting with a report first thing in the morning about drilling operations during the preceding 8-12 hours (e.g., during the prior evening and night shift and into the early morning hours).

Multiple vendors send in their reports to be read first thing in the morning (and other specified times during the day and night) by the different leaderships of the companies involved in drilling the wells, but in order to understand the context of the reports, those involved generally need to call vendors or onsite drilling representatives (company men, drilling site managers, etc) or others to get contextual data on why things have happened the way they did. Often, the drilling site representatives or other staff in the office consolidate the information to create a single report from the multiple reports, but still require conversations about context to create the picture of the events that have unfolded. Additionally, stakeholders often ask what the plan is going forward for drilling operations for the rest of the day, including any significant upcoming events and how they will be handled, if logistical calls have been made to ensure equipment is at the site, teams are on standby, material is on the way or delivered, regulatory authorities have been alerted, landowners have been notified, etc.

This requires a great deal of time, conversations, and each stakeholder involved typically has to seek out information to gather the data necessary to complete understand the current state of the well and drilling operations, and what the future drilling operations and events will be.

In one aspect of the disclosure, a computer system can receive various pieces of information regarding drilling operations and events during a given time interval, combine and synthesize it and provide the information to a computer system that includes a report generating engine. The report generator uses the information and data from the drilling operations and information from the well plan, offset wells, or synthetic wells, and creates a short, concise video (e.g., less than 30 seconds in length) that provides a video report of the drilling operations during the predetermined time interval. The computer system can be programmed to also compare the drilling operations with the well plan or relevant portions of the well plan offset wells, or synthetic wells, or relevant portions of these offset or synthetic wells. The system can then deliver the video report to each intended recipient by one or more communication channels, including by email, text, WhatsApp (or equivalent), TikTok, Instagram, Facebook, Snapchat, or on a mobile application with a notification system to deliver that video report at the specified time each day (or multiple times per day). The report generator may generate multiple versions of the report, such as by generating copies in different video formats. The report generator can also generate links and can deliver links to the recipients in addition to or in lieu of copies of the video reports.

The system can be customized to report on the last predetermined number of hours, predetermined number of days, or for the entire well, completion operation, or well production over a period time.

The system can be able to produce a video that would also be able to report out the end of well (reviewing the entire well) or a video report of the entire pad (multiple wells or completions). These videos can be short, but it will be appreciated that if a given video report is to cover more information, the video report is likely to be longer than a video report that provides less information (e.g., a video report on the entire well drilled in ten days will likely be longer than a video report on a time interval from 6 p.m. to 6 a.m.)

The system can be configurable to compare two separate wells, more than two wells, two or more pads and produce the video output to explain how the two or more wells, two pads, etc. were similar and where there were differences.

The application can be customizable to be able to deliver the pertinent information through the video to the appropriate internal and external customer levels and personas.

In one embodiment, the drilling engineer may want to get four video reports day, two at 6 am, with one showing the last twelve hours of drilling operations and the second covering the planned next 12 hours of drilling operations, and two at 5 pm, with one showing the last 12 hours and the second showing the projected 12 hours of drilling.

The drilling manager and or Vice President can receive one video report each day with a high level overview of their entire fleet of wells and completions operations. This would give a highlight of all the rigs/fracking spreads and progress for each well. They can also get a video report each Monday showing the last week's total amount of work completed (footage, costs, incidents, etc.) They could also specify to only get one aspect of the operation one time or cadence, while receiving other reports on other aspects at multiple times per day or week. They could specify to only see drilling in one area at a certain cadence per day/week/month, completions in another area at a certain cadence per day/week/month, and production volumes, temperatures, and the like for another area at still different intervals.

The report can include a roll up of work completed, oil/water produced, wells completed, proppant, water, and chemicals pumped, etc.

The field superintendent or ROC employee can receive a short video to show more granular activities on a predetermined hourly basis to gain insights into multiple rigs/frac spreads work as they oversee the operations. They would leverage this for handover activities to be able to synthesize a report with context to explain what has transpired over a period of time 14, 21, 28, 30+ days per hitch) as well. This will help keep everyone informed about different events even if people are on days off.

The drillers on each crew can leverage these videos to help with their handover activities each tour to give quick context to their counterpart relieving them and taking on their duties for the next x period of time. This will facilitate better understanding of the operations that have happened to give more continuity and information for a more complete handover to the next driller.

The report generator can be programmed to allow the video reports to be customizable to be able to deliver varying information through the varying video reports to the appropriate internal and external customer personas. It will be appreciated that some stakeholders may want much more detailed information in a video report than that of other stakeholders.

The system can utilize the forward plan for the well, leveraging the well plan itself as well as the planner function, and output in a short video clip the plan ahead over the next predetermined number of hours, days or until the completion of the well, frac job, etc.

The system can report out how many times over the last predetermined number of wells the forward plan achieved the desired target time and assign a probability that will happen again in the upcoming drilling period. This will help inform the probability of the estimated time to target time being correct.

The system can be used in the pre-tour meetings in the rigs/frac spreads to review what happened the night before as well as the operations that are going to happen that day. The system can describe the geological changes, potential loss zones, comparisons of the same depth range from previous wells, and lessons learned from them, any pertinent Standard Operating Proceduress that are coming up in the forward plan and potential issues to prompt the operations to look out for in the day ahead. There can be links to the safety related information about the upcoming jobs to facilitate a more interactive pre-tour meeting The system can include and use a three-dimensional (3D) rendering and visualization program (e.g., 3DViz) to provide to the end user a video showing the work done in 3D, with a summary of the pertinent information embedded in the video report. Three-dimensional (3D) rendering and visualization displays can be a powerful tool for depicting drilling data in a visually informative and engaging way. In some embodiments, the report generator engine may include a 3D rendering and visualization engine, which can receive the relevant data from the well plan, offsetting wells, or synthetic wells and the preceding drilling operations to be covered by the video report, then generate a 3D video display showing, for example, the progress of the wellbore and its trajectory during the drilling operations during the covered time interval. The video display can also show the wellbore trajectory's progress as compared to that of the well plan, offsetting wells, or synthetic wells for that time period and can also display one or more geological formations or conditions relative to the wellbore's trajectory. If the well plan does not include geological information, the 3D rendering and visualization engine can be provided with such information and then use it to generate the 3D display for the report.

The three-dimensional (3D) rendering and visualization routine can receive and gather relevant drilling data, including parameters like drill bit position, depth, speed, torque, pressure, weight on bit, rate of penetrations, geological formations, bit type and characteristics, BHA type and characteristics, location of drill pipe and heavyweight drill pipe and collars, depth of cut planned versus actual on the bits run, and more. In addition, the 3D engine can receive logging information, such as gamma ray logs, resistivity logs, mud logs, and other logs, which may be included in the video display as desired. In addition, one or more of the logs displayed may be modified, such as by converting a log from a measured depth format to a true vertical depth format. Moreover, portions of one or more of the logs may be displayed against portions of one or more logs from one or more reference wells previously drilled that are included in the well plan. In addition, portions of one or more logs may be displayed and may be manipulated to show the correlation of a well log obtained during drilling with a corresponding portion of one or more reference or offset well logs or a synthetic well log. The 3D rendering and visualization routine can ensure the data is accurate, complete, and properly formatted for visualization to be able to visualize all the different pieces at once.

The three-dimensional (3D) rendering and visualization routine can import the drilling data into the report generator 1102. The report generator 1102 can be a computing device that includes one or more processors, a memory, one or more displays, and various network interfaces. This may involve importing data from spreadsheets, databases, or other sources.

The three-dimensional (3D) rendering and visualization routine can set up the 3D environment where the drilling data will be visualized. This could be a virtual representation of the drilling site or a cross-section of the geological formations.

The three-dimensional (3D) rendering and visualization computer system can use the drilling data to generate and display a virtual representation of the drill string, the bottom hole assembly and/or drill bit in the 3D environment. The three-dimensional (3D) rendering and visualization software can depict the drilling path based on the recorded positions of the bottom hole assembly during drilling of the wellbore (e.g., by using the MWD data). The three-dimensional (3D) rendering and visualization routine can animate the display of the drilling process to show the progression of the drill string, BHA, and/or drill bit through various depths and formations as the wellbore is being drilled. The three-dimensional (3D) rendering and visualization software can generate visual displays of drilling parameters such as depth (measured and/or TVD), speed, torque, WOB, depth of cut, ROP, and differential pressure, and the other types of information described above, using animations, graphs, or color-coded indicators.

The three-dimensional (3D) rendering and visualization software can incorporate 3D models or representations of geological formations to give context to the drilling process. The three-dimensional (3D) rendering and visualization software can highlight different layers and formations as the drilling progresses. The three-dimensional (3D) rendering and visualization software can provide various interactive elements that allow users to pause, rewind, or fast-forward the drilling animation. The three-dimensional (3D) rendering and visualization routine can provide tooltips or pop-ups with additional information about specific points in the drilling process.

The three-dimensional (3D) rendering and visualization routine can allow a user to add annotations, labels, or callouts to highlight important events, changes in parameters, or challenges faced during drilling. This can be done by having a set of pre-populated challenges/events (such as may be provided in a drop-down menu or pop-up window) and the user only has to touch or click on the associated icon or item to annotate that part or section of the well to document the event. The three dimensional (3D) rendering and visualization routine can then call on these annotations and alert the users of upcoming potential issues either while tripping in our out, or on the next well geographically close enough that the new well is deemed to potentially have similar issues or events.

The three-dimensional (3D) rendering and visualization software can use data visualization techniques like color mapping, heatmaps, and graphs to represent quantitative data such as pressure, temperature, and depth.

The three-dimensional (3D) rendering and visualization software can set up a live visualization that updates as new data is received.

Once the 3D visualization for the video report has been generated, the software can export it in one or more suitable file formats for delivery and sharing with colleagues, clients, or other stakeholders.

The video report files can be sent directly or can be delivered by sending a link to the video file, such as a link to the file as available on an online video hosting service (e.g., YouTube, TikTok, Instagram, Facebook, Twitter, or other mobile application and the like). In addition, or alternatively, the video file(s) can be uploaded to a server which is accessible by a user via an application running on a cell phone, tablet, smart watch, laptop orother device. It should be appreciated that the video reports may be available in multiple file formats that may be viewed by multiple stakeholders in multiple locations via viewing on multiple devices and platforms.

The system can connect via application programming interface (API) to other client applications to gather the necessary data to create the video report, like an electronic drilling recorder (EDR), geosteering software (e.g., Starsteer), customer well data recording (e.g. WellView), well planning software (e.g. Compass), enterprise resource planning (ERP), optical character recognition (OCR) to text applications, etc. Additionally, or alternatively, the report generating software, the 3D rendering software, and the software used for delivering the video report files or links thereto, may be incorporated into a surface steerable system like that described above, one or more drilling rig control systems like those described above, or may be a stand-alone system and connected to any one or more of the foregoing.

The video reports system disclosed herein may use Large Language Models (like ChatGPT) or other artificial intelligence and/or machine learning systems. For example, the video reports system may include one or more AI systems designed to receive the drilling operations information, the well plan, and existing information from systems and reports, and consolidate that information and use it to generate a new report. The AI system may be used to accept additional requests or feedback from stakeholders and use that information to generate future video reports that include information like that requested for that stakeholder. It is expected that an AI system may be used to refine the content and display of information in video reports for a particular well or group of wells or owner/operator by receiving requests from the stakeholders regarding such reports over time. For example, the AI system may decide to add certain information (e.g., gamma ray logs) and delete other information (e.g., mud logs) from the reports based on the feedback received from the relevant stakeholders. Similarly, feedback from stakeholders regarding the types of displays that are preferred or less desired (e.g., MD versus TVD, or the length of the segments of the log displays provided) may be used by the AI system to modify and adapt the displays and/or information included in the video reports provided to one or more stakeholders. The system may use the AI component to provide particularized video reports for each stakeholder based on that stakeholder's feedback, save their preferences and deliver those on a go forward basis or it may be that the system provides a standard video report for all users associated with a particular well or particular company but modifies the content of the reports based on feedback received from one or more users associated with that well or company.

The system would be able to use large language models (like ChatGPT) or other AI/ML tools to be interactive, such as by accepting users' input questions and then outputting the short video clips with answers to the questions, such as by providing additional information, showing backup information, or providing a more detailed explanation. An example would be the drilling engineer could ask "how does this current H2-MB14 well intermediate section and curve compared to the last three MB14 wells we drilled, include trajectories, bit and BHA's, hours on each of those during that time, geological formations and faults, mud type and mud additives added at this stage, mud properties?" The large language models can take that input, output the correct language response, and then the video reporting tool would generate a video report including the audio narration of the answer, together with the 3D representation of the well, with the display of the current well provided with displays of the earlier three reference wells so that the video report visually shows the similarities and differences of the current well and the three earlier reference wells that were the subject of the question. The engineer could then refine the request after reviewing the generated video report and say "now take wells MB14 and X well and also compare the dip angles on each well as well as direction the wells were drilled". The large language model would then provide a response, which the video reporting engine can use to provide an updated report with updated text and/or audio narration including the response to the second input query.

Figure 11:
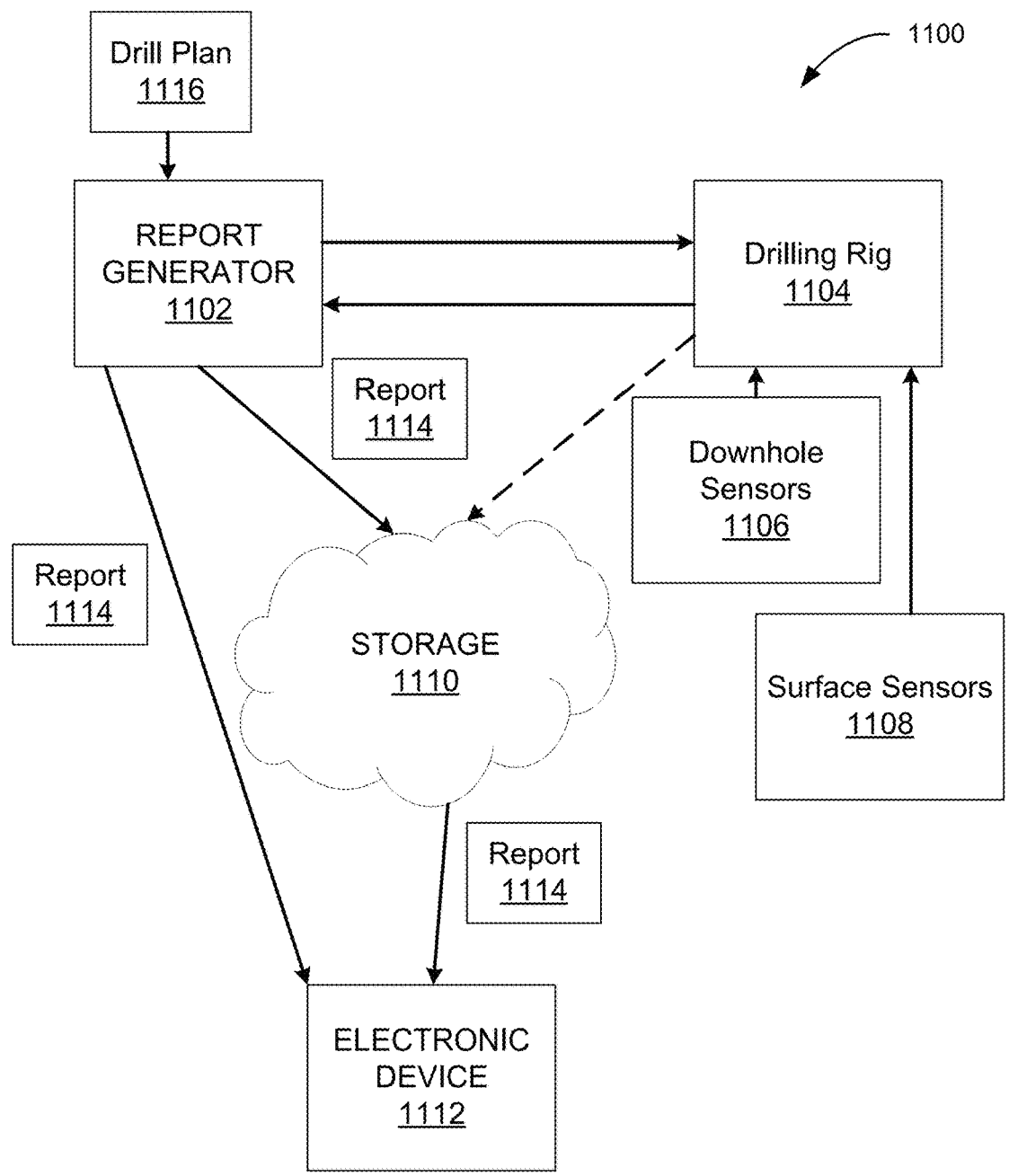
FIG. 11 illustrates an exemplary system for generating drilling reports.

FIG. 11 illustrates a system 1100 for generating drilling reports according to embodiments of the disclosure. The system 1100 can be executed on a computing device (e.g., a controller), or can be implemented on a systems such as steering control system 168 as described above. The report generator 1102 can receive information from the drilling rig 1104, including any one or more of the drilling rig 100 control systems described above and/or the steering control system 168 described above. One or more downhole sensors 1106 can measure various information regarding the drilling operation. The downhole sensors 1106 can be located in the BHA, and may include MWD sensors, LWD sensors, among other things.

The system 1100 can include a report generator 1102 including one or more processors. The computing device can include a memory for storing instructions that when executed by the one or more processors perform operations. The operations can include receiving accessing a drill plan for drilling a well as well as disparate databases with offsetting well data or synthetic well data (best composite well, tech limit well, etc). Well plans typically include a substantial amount of information for a well to be drilling, including logs for reference wells, geological information, the planned trajectory of the well, drilling, and operational parameters, and equipment information for drilling the well. The operations can include receiving a plurality of drilling parameters for the drilling operation. The operations can include generating a report 1114 and saving the report 1114 on a sever connected to a network. The operations can include providing the report to at least one user.

Downhole sensors 1106 at a drilling rig can provide various types of real-time data and information about the drilling process, the formation being drilled, and the condition of the wellbore. These downhole sensors 1106 can help drilling operators make informed decisions to optimize drilling performance, ensure safety, and maximize well productivity.

Downhole sensors 1106 can monitor and transmit information about drilling parameters such as toolface, weight on bit (WOB), rate of penetration (ROP), rotary speed, torque, mud flow rate, vibration, accelerations, other drilling dysfuctions, and differential pressure. This data helps operators optimize drilling efficiency and prevent issues like bit wear or hole instability.

Downhole sensors 1106 can provide information about the properties of the formation being drilled, including resistivity, porosity, permeability, and fluid saturation. This data aids in understanding the potential for hydrocarbon reservoirs and in determining the best drilling strategy.

Downhole sensors 1106 equipped with inclinometers and magnetometers can provide data about the wellbore's inclination, azimuth, and overall trajectory. This information can be used for directional drilling and well placement.

Some downhole sensors 1106 can capture images or video of the wellbore as the drilling progresses. This information can help operators visualize the condition of the well and identify any issues such as borehole collapse or stuck pipe.

Downhole sensors 1106 can monitor temperature and pressure conditions in the wellbore. Temperature and pressure data can be used for assessing well integrity, evaluating fluid properties, and detecting any anomalies that might indicate wellbore stability problems.

Downhole sensors 1106 can detect vibrations and acoustic signals produced during drilling. Analysis of these signals can help identify issues like bit bouncing, poor drilling mechanics, or potential formation instability.

Downhole sensors 1106 can also provide data on the quality of casing placement and cementing operations, ensuring wellbore integrity, and preventing fluid migration between different formations.

Downhole sensors 1106 can measure formation pressure while drilling, helping operators understand reservoir characteristics and evaluate drilling fluid properties.

Downhole sensors 1106 can detect the presence of gases, including hydrocarbons, while drilling. These sensors can detect potential well kicks or gas influxes that could lead to well control issues.

Some downhole sensors 1106 include monitoring sensors that can provide information about wellbore stability and identify signs of borehole collapse or other stability issues.

Some downhole sensors 1106 can assess the condition of the drilling bit in real-time, helping operators make decisions about when to change the bit to optimize drilling efficiency.

Some downhole sensors 1106 can provide data about drilling mud properties such as density, viscosity, and rheology. This information can be used for maintaining proper wellbore conditions and preventing fluid-related issues.

The drilling rig 1104 can include surface sensors 1108. Surface sensors 1108 in drilling operations can measure various parameters and conditions at the drilling rig itself. The surface sensors 1108 can provide real-time data to drilling operators, engineers, and other personnel on the surface, allowing them to monitor and control the drilling process, optimize performance, and ensure safety.

Surface sensors 1108 can measure the hookload and the weight applied to the drill bit, often referred to as weight on bit (WOB), by monitoring the tension in the drilling rig's hoisting system. This helps operators control the drilling process and avoid excessive weight that could lead to bit wear or hole instability.

Surface sensors 1108 can monitor the rotational speed of the drillstring and the drill bit. Controlling the rotational speed can help optimize drilling efficiency and bit performance.

Torque sensors can measure the amount of rotational force applied to the drill bit. Monitoring torque can help prevent bit damage and assess the drilling efficiency.

Surface sensors 1108 can measure the flow rate and pressure of drilling mud being pumped downhole. This information can be used for maintaining proper wellbore conditions, carrying cuttings to the surface, and preventing well control issues.

Surface sensors 1108 can monitor the pressure of the drilling mud as it is pumped into the wellbore. Abnormal pressure changes could indicate wellbore instability or other issues.

Surface sensors 1108 can measure various properties of the drilling mud, such as density, viscosity, and rheology. Maintaining appropriate mud properties can be used for effective drilling and wellbore stability.

Surface sensors 1108 can include standpipe pressure sensors that measure the pressure in the pipe that carries drilling mud from the pumps to the wellhead. Changes in standpipe pressure can indicate changes in downhole conditions.

Surface sensors 1108 can monitor the flow rates of drilling mud and solids entering and exiting the wellbore. Discrepancies between the two rates can help detect potential well control problems, hole cleaning efficiency (or lack thereof), loss of drilling mud, and the like.

Surface sensors 1108 can monitor the rate at which drilling mud is circulated down the drillstring and back up the annulus. Proper circulation can be used to removing cuttings and maintaining wellbore integrity.

Surface sensors 1108 can detect the presence of gases, including hydrocarbons, in the drilling mud. Gas detection can provide early warning of potential well kicks or gas influxes.

Surface sensors 1108 can include vibration sensors detect vibrations in the drillstring and can help identify issues such as bit bouncing or poor drilling mechanics.

Surface sensors 1108 can measure the temperature of various components in the drilling system, including the drilling mud. Temperature changes can indicate downhole conditions or equipment problems.

Surface sensors 1108 can track the position and depth of the drill bit in the wellbore. This information is critical for well placement and trajectory control.

Surface sensors 1108 can monitor the movement and tilt of the drilling rig itself, helping ensure rig stability and safety.

Some surface sensors 1108 can measure the power consumption of different rig components, providing insights into equipment performance and efficiency.

Surface sensors 1108 play a pivotal role in providing real-time data to drilling personnel, helping them make informed decisions to optimize drilling operations, ensure safety, and respond to changing downhole conditions.

In various embodiments, the report generator 1102 can be located at the site of the drilling rig 1104. In various embodiments, the report generator 1102 can be located remote from the drilling rig 1104. Both the information from the downhole sensors 1106 and the surface sensors 1108 can be collected using either the report generator 1102 remotely or a device 1102 located at the drilling rig 1104 or may be collected by the steering control system 168 and provided to the device 1102. The data from the surface sensors can be transmitted via wired or wireless means to the report generator 1102. The data from the downhole sensors may be telemetered to the surface and provided to the device 1102. In various embodiments, the data can be stored in a data storage 1110. The data storage 1110 can be a cloud storage system.

A cloud storage system 1110 is a technology infrastructure that enables users and organizations to store, manage, and access data over the internet. Instead of relying on local storage devices like hard drives or physical servers, cloud storage leverages remote servers hosted by third-party providers. Cloud storage providers operate data centers with powerful servers that are designed to store vast amounts of data. These servers are geographically distributed to ensure redundancy and minimize the risk of data loss due to hardware failures or disasters. Cloud storage systems divide user data into smaller segments and distribute these segments across multiple servers or data centers. This distribution ensures better load balancing, improves access speeds, and enhances data availability. Cloud storage providers implement redundancy mechanisms to protect against data loss. This often involves creating multiple copies of data and storing them across different physical locations. Redundancy helps ensure data availability even in the event of hardware failures or disasters.

The report generator 1102 can also receive a drilling plan 1116. A well plan 1116 is usually a comprehensive document that outlines the detailed strategy, procedures, and steps required to drill a given well. It serves as a roadmap for the drilling operation, providing guidance to drilling personnel, engineers, and other stakeholders involved in the process. The content of a drilling plan can vary depending on factors such as the type of well-being drilled (oil, gas, geothermal, etc.), the geological conditions, regulatory requirements, and the specific goals of the drilling project.

The drilling plan 1116 can start by outlining the overall objectives of the drilling project. This includes defining the purpose of the well (exploration, production, injection, geothermal, etc.) and the expected outcomes.

The drilling plan 1116 can include geological and geophysical data including information about the subsurface geology, including formation depths, types, and expected characteristics, is essential. This data helps determine the drilling strategy and equipment needed.

The drilling plan 1116 can describe the well design, including wellbore trajectory (vertical, directional, horizontal), casing sizes, cementing program, and any deviation plans. The design ensures that the well is drilled safely and efficiently while meeting the intended objectives.

The drilling plan 1116 can specify the drilling rig type, capacity, and required equipment such as drill bits, drilling mud, drill collars, bottom hole assembly (BHA), and other tools necessary for the drilling process.

The drilling plan 1116 can provide details on the drilling procedure. This section details the step-by-step procedures for drilling the well. It covers the process of setting up the drilling rig, spudding the well (starting drilling operations), drilling the wellbore, tripping operations (removing and adding drill pipe), mud circulation, drilling fluid management, and well control procedures.

The drilling plan 1116 outlines the casing program, including the number of casing strings, casing sizes, and depths at which casing will be set. It also includes details about the cementing operations to ensure proper casing integrity and zonal isolation.

The drilling plan 1116 can include safety measures and emergency response procedures. Safety protocols, best practices, and emergency response procedures can address potential hazards, risk assessments, blowout prevention measures, well control procedures, and evacuation plans.

The drilling plan 1116 can address environmental protection measures, waste management practices, and ways to minimize the impact of drilling operations on the surrounding ecosystem.

Depending on the location and jurisdiction, drilling plans need to comply with local, state, and national regulations. The drilling plan 1116 may outline the permits, licenses, and approvals required for the drilling project.

The drilling plan 1116 can describe the types of downhole sensors and surface sensors that will be used to monitor drilling parameters, formation characteristics, and wellbore conditions in real-time.

The drilling plan 1116 can include a timeline for different stages of the drilling process, outlining the estimated duration for each operation.

The drilling plan 1116 can include contingency plans detail how the team will handle unexpected challenges, equipment failures, adverse weather conditions, and other potential issues that might arise during drilling.

The drilling plan 1116 can include a section providing estimates of the costs associated with various aspects of the drilling operation is often included.

The drilling plan 1116 might outline communication protocols for various stakeholders, including drilling personnel, wellsite supervisors, management, regulatory agencies, and nearby communities.

The report generator 1102 can receive the inputs from the drilling rig 1104 and the drill plan 1116 and generate a drilling report 1114.

The drilling report 1114 can include a graphical depiction of the drilling operation based on the plurality of drilling parameters for the drilling operation. The graphic depiction can include an animated or video illustration of the drilling operation within a past predetermined time period. The drilling report 1114 can include a plurality of metrics associated with the drilling operation as provided by the drill plan. The drilling report can include a summary of a planned activity for a drilling operation for a future predetermined time period. The summary of the planned activity in a following time period may include an animation, an audio narration, or text explaining what is to happen next. The system may be programmed to allocate a certain portion of the video report to a preceding time period and a second portion of the report to the planned activities. For example, the system may be programmed to spend no more than ten seconds of a thirty second report on the planned drilling activities. The system may be programmed to allow a user to specify how much of the report should be allocated to the preceding drilling activity versus the amount of the report allocated to the planned drilling activity.

In various embodiments, the graphical depiction comprises a three-dimensional rendering of the drilling operation. In various embodiments, the planned activity further comprises a summary of geological changes for the future predetermined time period.

In various embodiments, the drilling report 1114 is generated via a plurality of application programming interfaces that connect to one or more drilling systems that perform the drilling operation.

In various embodiments, the plurality of metrics includes a number of times that a forward plan achieved a desired target time over N number of previous drilling wells.

In various embodiments, the operations further comprise assigning a probability that the forward plan will achieve the desired target time during a current drilling operation.

In various embodiments, the report further comprises projected challenges for a defined time period for the drilling operation based on the plurality of drilling parameters. In various embodiments, the report comprises custom narration.

In various embodiments, the providing the report to at least one user can include generating a link to the report and transmitting the link to the report to an electronic device 1112 to the at least one user. In various embodiments, the operations can include transmitting a link to the report at a preset time. In various embodiments, the operations further comprise transmitting a link to the report at a preset time. In various embodiments, the operations further comprise transmitting a link to the report within a preset time following the end of operations. In various embodiments, a link to the report is transmitted via at least one of an email message, a text message, and a chat message.

In various embodiments, the report further comprises links to drilling data. The links In various embodiments, the operations further comprise storing a link to the report on a website for viewing after user login.

In various embodiments, the report is automatically generated.

In various embodiments, the report includes one or more tags identifying information in the report.

In various embodiments, the length of the video report is less than 30 seconds in duration.

In various embodiments, the length of the video report is between 30 and 60 seconds in duration.

In various embodiments, the length of the video report is greater than 60 seconds in duration.

In various embodiments, the report is stored in a searchable database of prior reports.

In various embodiments, the operations further comprising receiving artificial intelligence generated inputs based on user searches.

Figure 12:
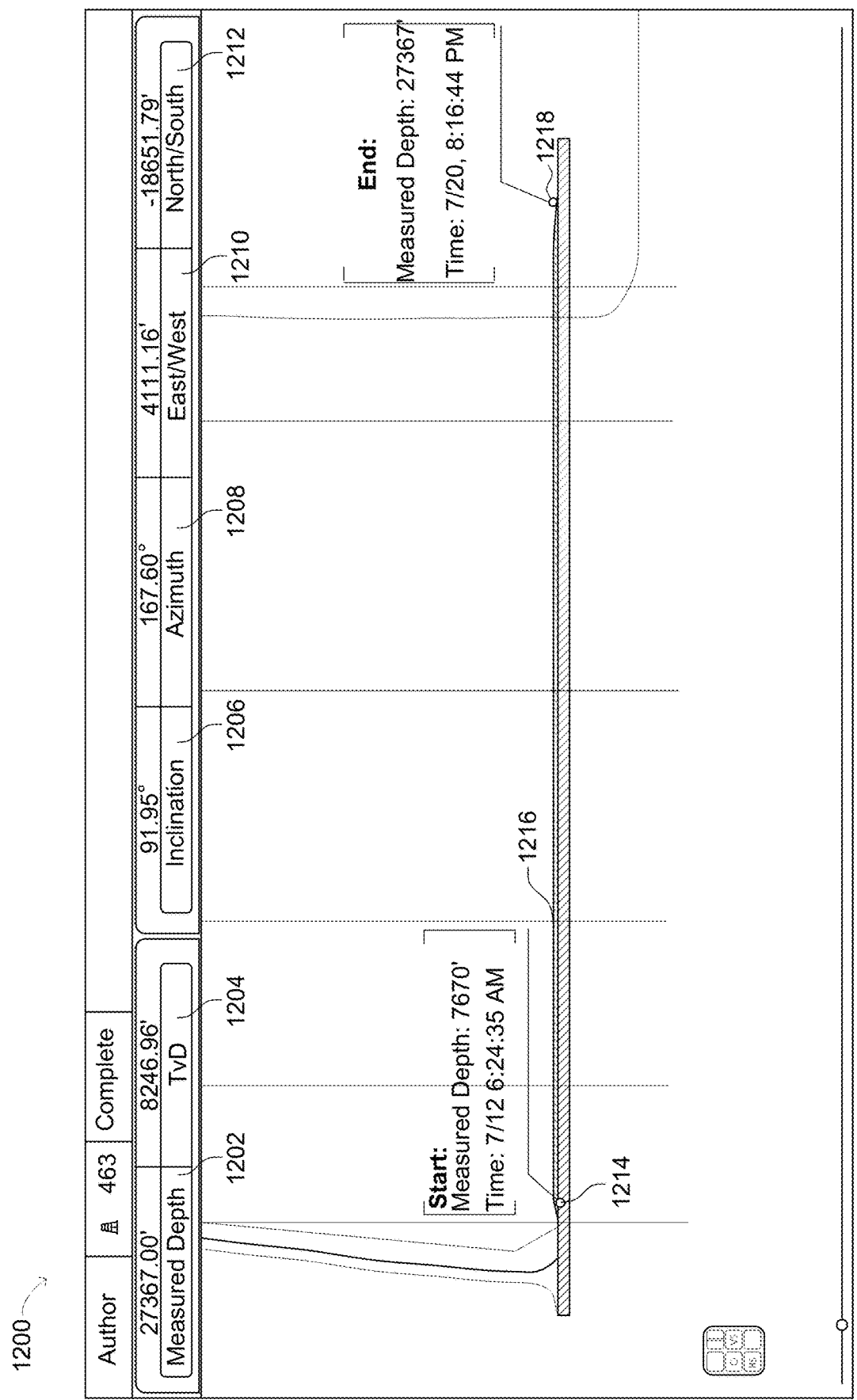
FIG. 12 illustrates a first exemplary illustration of a portion of a drilling report.

FIG. 12 illustrates a first exemplary screen capture 1200 of a drilling report.

The video can illustrate the drilling path including the current position of the bottom hole assembly. The video illustration 1200 can provide details regarding the drilling operation (e.g., a measured depth 1202, a total vertical depth 1204, an inclination 1206, an azimuth 1208, and east/west coordinate 1210 and a north south coordinate 1212. The video illustration 1200 can include a starting point 1214, a drilling path 1216 for the borehole, and an end of the borehole 1218. The video can include an audio narration that can identify the drill rig number and describe the drilling progress over the last number of preselected hours. The narration can provide, among other things, the duration of the bottom hole assembly off bottom of the borehole, slide distance as a percentage of drill depth, average slide, and rate of penetration, as well provide other information of interest to the recipients of the report. It should be noted that, as shown in FIG. 12, there is sufficient space available both above and below the display of the wellbore in the horizontal section to include additional information. Although not shown, additional text could be displayed, additional animations could be displayed, a text display of the audio narration could be displayed, logs and log correlations could be displayed, additional geological formations could be displayed, cost information (e.g., costs of drilling to date, estimated costs to completion, cost curves, etc.) could be displayed, and the like. Because the video report provides a video presentation, the additional information could be added and removed, then replaced with other information, changed, or modified (such as by showing a correlation of the well log from drilling the wellbore with a reference well log from the well plan), and so forth. In addition, the illustration display may change in the report such as by zooming in on the well and/or associated information regarding drilling operations, especially to show key events, potential problems or issues, conditions, or the like. As noted below, the display shown in FIG. 12 could also include a video clip within the display, especially if the rig is equipped with one or more computer vision systems as described below.

Figure 13:
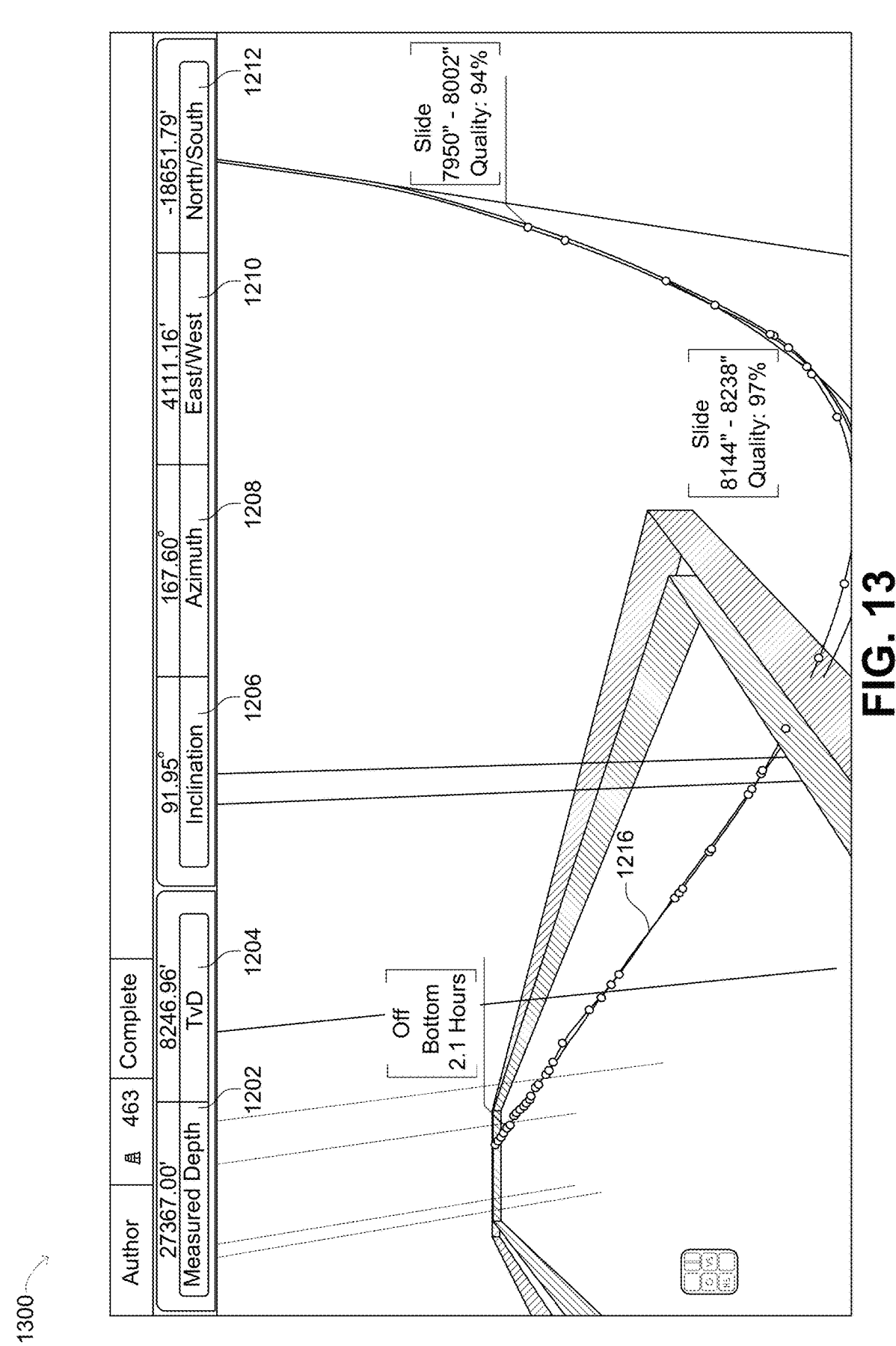
FIG. 13 illustrates a second exemplary illustration of a portion of a drilling report.

FIG. 13 illustrates a second exemplary screen capture 1300 of a drilling report. FIG. 13 illustrates a different perspective of the drilling path 1216 from the first exemplary screen capture of the drilling report shown in FIG. 12. The video portion in FIG. 13 can illustrate the drilling path 1216 including the current position of the bottom hole assembly. The video illustration 1300 can provide details regarding the drilling operation (e.g., a measured depth 1202, a total vertical depth 1204, an inclination 1206, an azimuth 1208, and east/west coordinate 1210 and a north south coordinate 1212. The video can provide information regarding the author of the report and the drill site number. The video can provide slide information and time off bottom. The video can provide information regarding the author of the report and the drill site number. The video report can provide distances for various slides including the slide quality.

In the context of a drilling operation, "slide quality" can refer to the effectiveness and efficiency of the process by which a drilling tool or bit is guided and controlled as it advances through the material being drilled. This is particularly relevant in directional drilling, where the goal is to deviate the wellbore from the vertical axis and navigate through specific underground formations or targets.

A high slide quality means that the drilling tool smoothly transitions from one direction to another without sudden jerks or instability. This is crucial to avoid excessive wear on the drill bit, as well as to avoid sharp curves. Maintaining a smooth borehole by having high quality slide drilling operations helps minimize tortuosity of the wellbore, which in turn helps avoid other problems during the drilling process.

In directional drilling, maintaining control over the angle of inclination (how much the wellbore deviates from vertical) is important. A good slide quality helps ensure that the desired angle is achieved and maintained without deviations that could lead to issues like wellbore collapse or drilling off-target.

Slide quality also refers to the ability to accurately predict and control the path of the wellbore. This involves using advanced software and measurement-while-drilling (MWD) tools to ensure that the wellbore follows the planned trajectory and reaches the intended target.

A "dogleg" refers to a sudden change in wellbore trajectory. High-quality slides help minimize the occurrence of doglegs, which can lead to equipment wear, reduced drilling efficiency, and even equipment failure.

Slide quality can also affect the rate at which the drilling tool penetrates the formation. Efficient slides contribute to a consistent ROP and overall faster drilling progress.

Poor slide quality can result in vibrations and shock loads being transmitted to the drilling equipment. These vibrations can be damaging and reduce the lifespan of drilling tools and equipment.

Improving slide quality often involves a combination of advanced drilling techniques, accurate data analysis, and the use of high-quality drilling equipment. Directional drilling engineers and operators work to optimize drilling parameters and techniques to achieve the best possible slide quality, ensuring efficient and accurate drilling operations while minimizing risks and costs.

The video presentation can provide a display which travels along the length of the borehole and drilling operations covered by the relevant time period for that report.

The video presentation can show and display the transition from the view shown in FIG. 12 to that shown in FIGS. 13, such as by rotating and zooming in to a particular portion of the wellbore. It should be appreciated that the video report generator may be programmed to generate multiple views as may be desired and to also generate a video display that smoothly transitions between such multiple views. Moreover, the video report may add additional information (e.g., text, audio, etc.) to one or more of the views included in the video report, such as shown by the combination of FIGS. 12-16.

Figure 14:
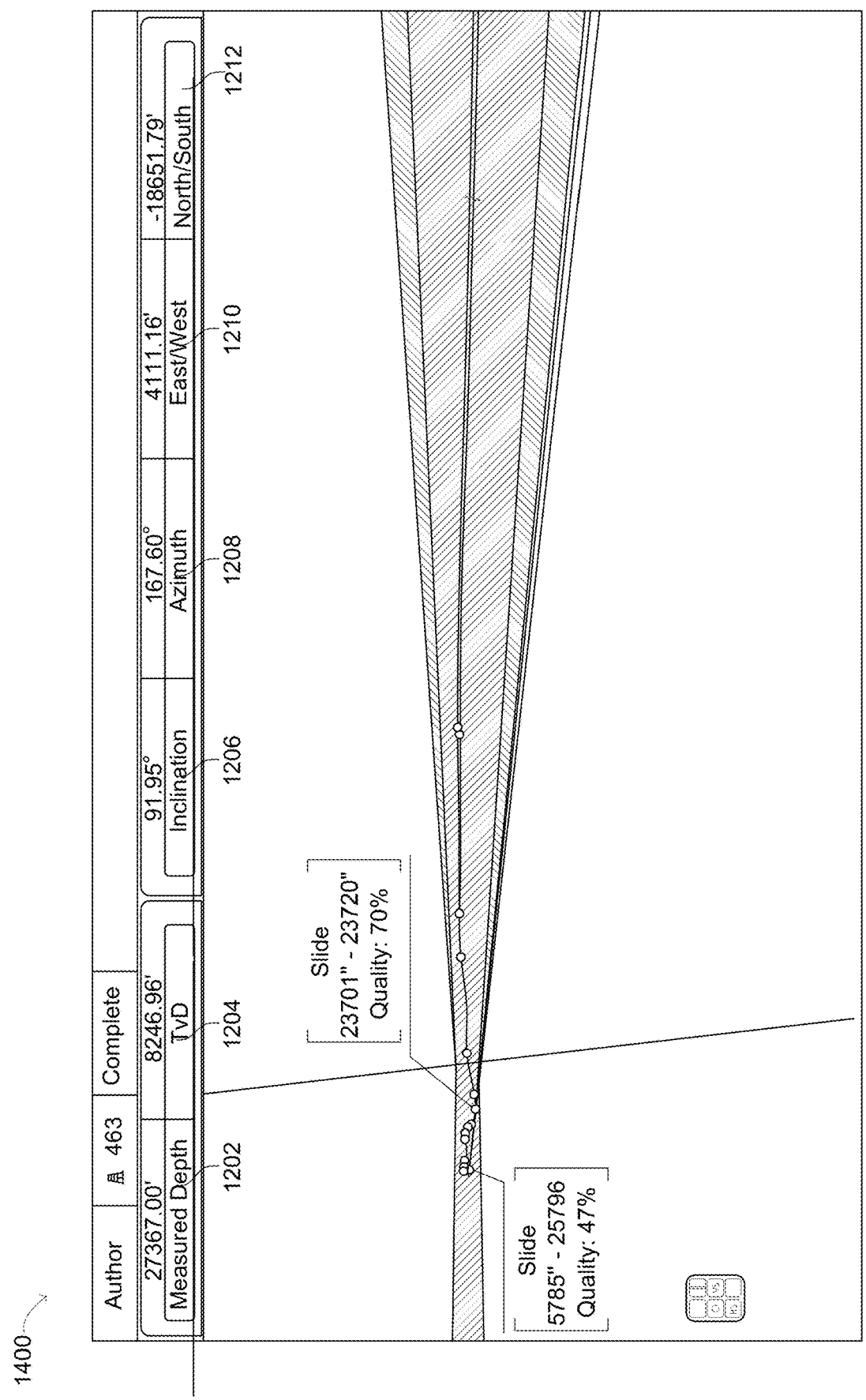
FIG. 14 illustrates a third exemplary illustration of a portion of a drilling report.
Figure 15:
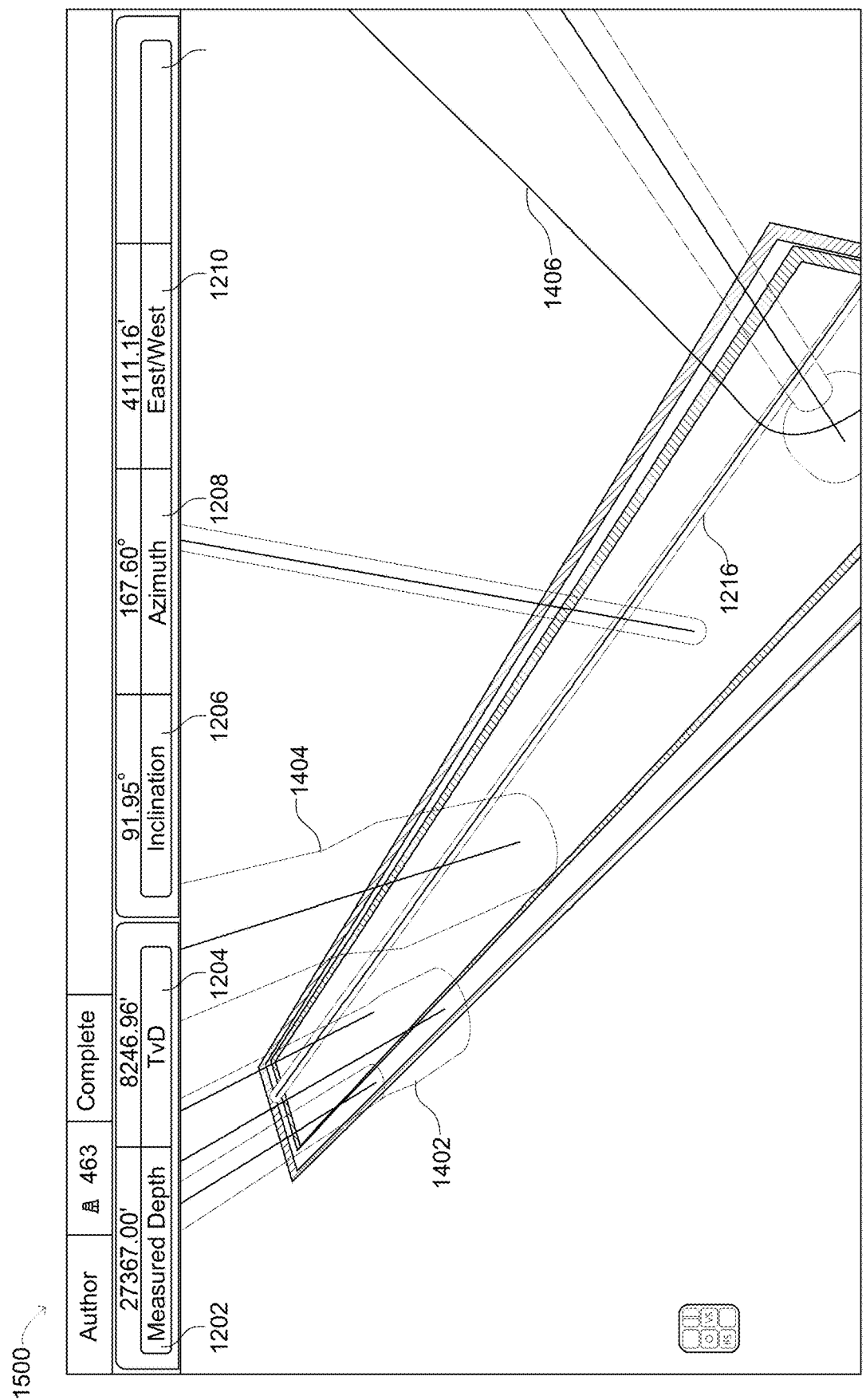
FIG. 15 illustrates a fourth exemplary illustration of a portion of a drilling report.

FIG. 14 illustrates a third exemplary screen capture 1400 of a drilling report. The video illustration 1400 can provide details regarding the drilling operation (e.g., a measured depth 1202, a total vertical depth 1204, an inclination 1206, an azimuth 1208, and east/west coordinate 1210 and a north south coordinate 1212. FIG. 15 illustrates a position of the bottom hole assembly 1402. The video can provide distances for various slides including the slide quality.

FIG. 15 illustrates another exemplary screen capture 1500 of a drilling report. FIG. 15 presents a fourth view of the drilling operation. FIG. 15 illustrates the presence of nearby wells (e.g., well one 1502, well two 1504, and well three 1506) and distance from the nearest drilling path 1216. The audio narration of the report can provide the nearest distance from the nearby wells (e.g., well one 1502, well two 1504, and well three 1506) and any change in that minimum separation factor as the drilling progresses in the time period covered by that report. The video illustration 1500 can provide details regarding the drilling operation (e.g., a measured depth 1202, a total vertical depth 1204, an inclination 1206, an azimuth 1208, and east/west coordinate 1210 and a north south coordinate 1212).

Figure 16:
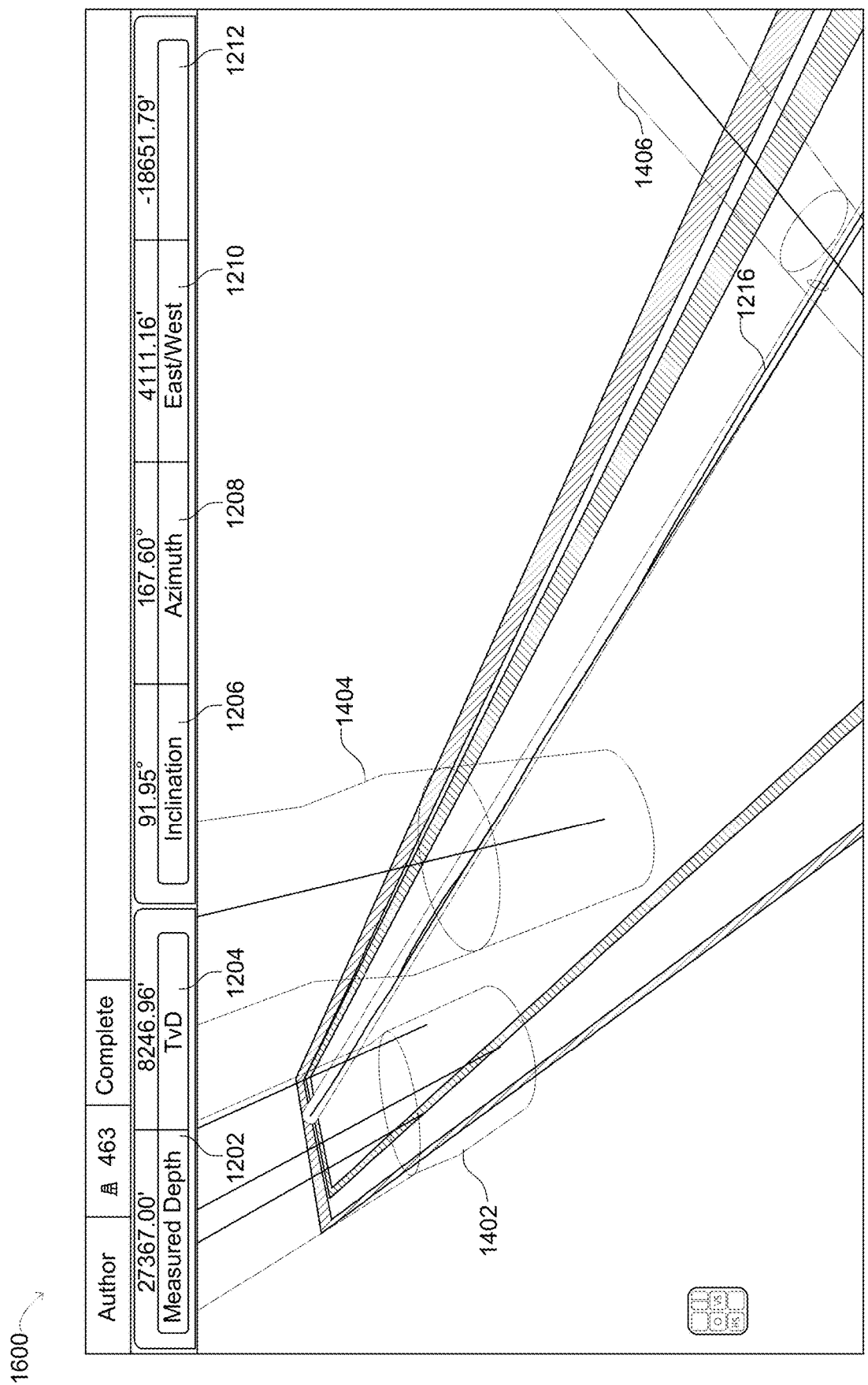
FIG. 16 illustrates a fifth exemplary illustration of a portion of a drilling report.

FIG. 16 illustrates yet another exemplary screen capture 1600 of a drilling video report. The video illustration 1600 can provide details regarding the drilling operation (e.g., a measured depth 1202, a total vertical depth 1204, an inclination 1206, an azimuth 1208, and east/west coordinate 1210 and a north south coordinate 1212. The narration can provide the nearest distance from the nearby wells (e.g., well one 1502, well two 1504, and well three 1506) and any change in that minimum separation factor. The video illustration 1500 can provide details regarding the drilling operation (e.g., a measured depth 1202, a total vertical depth 1204, an inclination 1206, an azimuth 1208, and east/west coordinate 1210 and a north south coordinate 1212).

Figure 17:
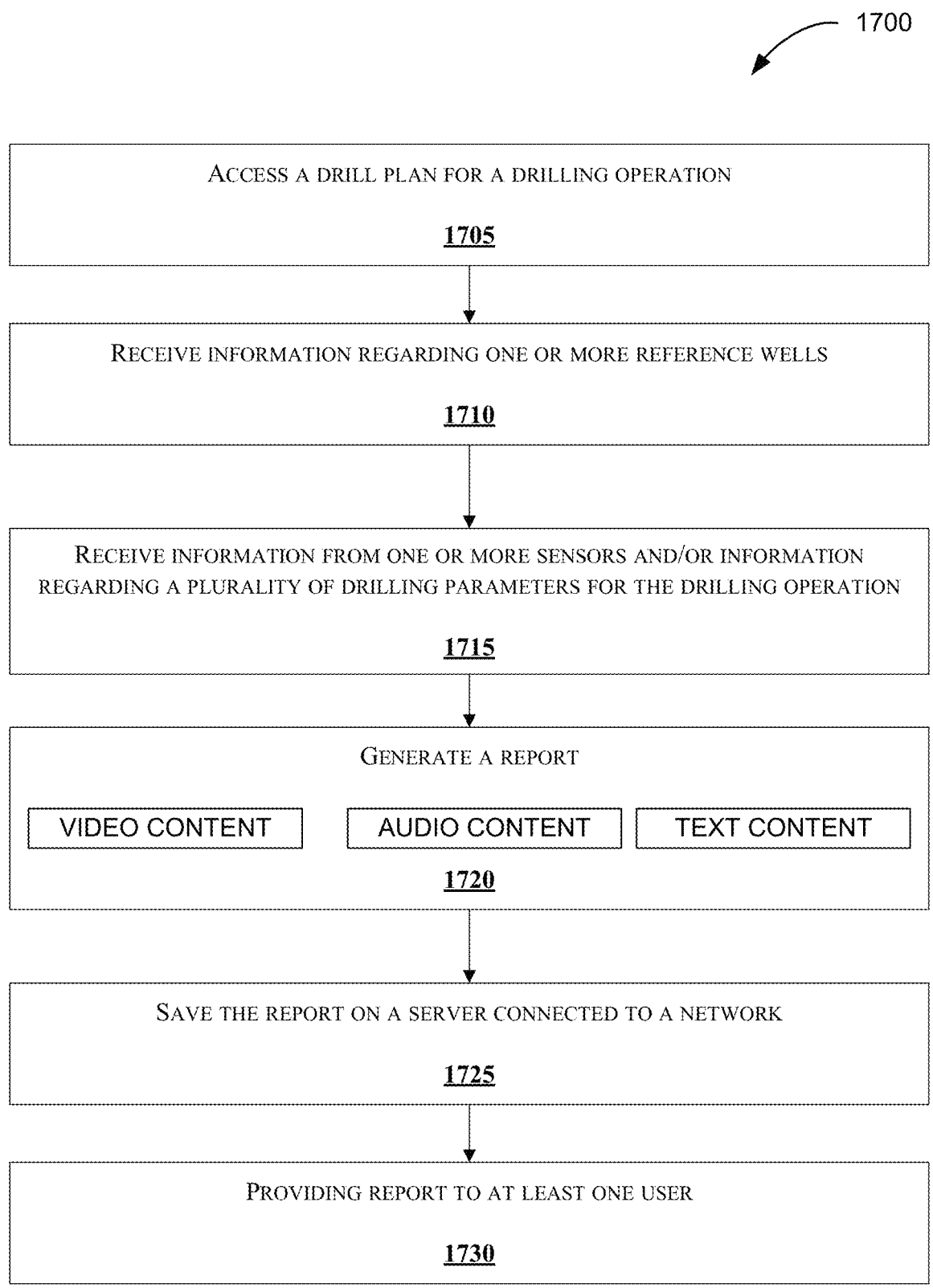
FIG. 17 illustrates an exemplary flowchart for a process for generating a drilling report.

FIG. 17 is a flow chart of a process 1700, according to an example of the present disclosure. According to an example, one or more process blocks of FIG. 17 may be performed by report generator 1102.

At block 1705, process 1700 may include accessing a drill plan for a drilling operation. For example, report generator 1102 may access a drill plan for a drilling operation, as described above. In various embodiments, the drill plan can be stored in a memory of the report generator 1102. In various embodiments, the report generator 1102 can receive the drill plan via wired or wireless communications. In most situations, the well plan, or drill plan, will include a great deal of information about the planned drilling of the well, including a planned trajectory, planned drilling parameters, expected geological formations, well logs, and expected progress, equipment to be used, such as a bottom hole assembly and drill bit, and so forth, At block 1710, process 1700 may include receiving information from one or more reference wells. The information may include information much like that in a well plan, including the well trajectory, well log information, drilling parameters (such as rate of penetration, weight on bit, differential pressure, torque, revolutions per minute, toolface, spindle position, and so forth), geological information, and/or equipment used, such as bottom hole assembly, mud motor, drill bit, etc.

At block 1715, the process 1700 may include receiving information from one or more sensors and/or a plurality of drilling parameters for the drilling operation. For example, report generator 1102 may receive information from a plurality of downhole and/or surface sensors, including MWD and LWD information, rate of penetration, weight on bit, differential pressure, torque, spindle position, and other parameters as described above, well log information, geological information, and/or a plurality of drilling parameters for the drilling operation, as described above. In various embodiments, the report generator 1102 can receive the drill plan via wired or wireless communications from a database, from a steering control system 168, or the like. The well plan may contain the drilling parameters to be used. In various embodiments, the plurality of drilling parameters can be accessed from storage 1110 (e.g., cloud storage). The report generator 1102 can receive the data from the sensors and/or other control systems of the drilling rig and its equipment, such as via application programming interfaces that cooperate and transfer data from the WITS format and/or other drilling rig control systems.

At block 1720, process 1700 may include generating a report. The report can include a graphical depiction of the drilling operation based on the plurality of drilling parameters for the drilling operation. The graphic depiction can include an animated or video illustration of the drilling operation within a past predetermined time period. The report can include a plurality of metrics associated with the drilling operation as provided by the drill plan; and a summary of a planned activity for a drilling operation for a future predetermined time period. For example, report generator 1102 may generate a report using the processor, the drilling metrics and drill plan stored in memory. The report generator 1102 can store the report in the memory. The report generator 1102 may use various software programs and/or subroutines to obtain the relevant information from the reference well(s), the drilling operation of the well being drilled, the well plan, and the like, and then automatically generate the video, audio and text portions of the report and then put them together into a video file, which can then be converted to one or more different video formats, as described below in more detail.

In various embodiments, the report may include custom narration. For example, the report can be narrated using a different native language, a local accent or dialect. There are several programs and tools available that can change the language or dialect of a narration. These tools typically use text-to-speech (TTS) technology to convert written text into spoken words in the desired language or dialect. Example tools include but are not limited to: Google Text-to-Speech, Amazon Polly: Amazon Polly, Microsoft Azure Cognitive Services, IBM Watson Text to Speech, ResponsiveVoice, iSpeech, Balabolka, Natural Reader, Loquendo, and Acapela Group. These tools generally require generating a textual input for converting into speech and then select the desired language or dialect for the output.

In various embodiments, the report is automatically generated without any actions taken by an operator. The drilling information can be collected and then a report like that described herein can be automatically generated and delivered. In various embodiments, the report generator 1102 can prompt a user to preview the automatically generated report prior to publication and/or distribution.

In various embodiments, the planned activity may include a summary of geological changes for the future predetermined time period. During a drilling operation, geological changes refer to the alterations and variations encountered in the subsurface geological formations as the drill bit penetrates deeper into the Earth. These changes can have significant implications for drilling operations, wellbore stability, drilling efficiency, and the overall success of the drilling project.

Some common geological changes that can occur during a drilling operation can include formation changes, stratigraphic changes, faults and fractures, changes in pressure and fluids, geothermal gradients, unconsolidated or depleted formations, drilling through fault zones, Karst features, pressure and stress changes, and mineralization and gas zones.

Different geological formations can have varying compositions, properties, and behaviors. As the drill bit advances through these formations, the lithology (rock type), porosity, permeability, and other properties may change. These changes can impact drilling speed, equipment wear, and wellbore stability.

Stratigraphy involves the study of rock layers or strata. Geological changes related to stratigraphy can include encountering unexpected layers of rock, changes in the thickness or composition of layers, and the presence of unconformities (gaps in the geological record). These changes can affect drilling plans and trajectory.

Faults are fractures in the Earth's crust along which movement has occurred. When drilling encounters faults or fractures, it can lead to changes in rock behavior, wellbore stability challenges, and the potential for fluid migration between formations.

As the drill bit penetrates deeper, the pressure and fluid conditions can change. Drilling through different formations can expose the wellbore to different types of fluids (water, oil, gas), and variations in pore pressure can impact wellbore stability and drilling safety.

The temperature of the Earth's crust increases with depth. Geological changes related to geothermal gradients can impact drilling equipment performance and wellbore integrity. High temperatures can lead to increased wear on equipment and affect the properties of drilling fluids.

Geological formations may be unconsolidated (loose) or depleted (already drilled or produced). These formations can pose challenges in terms of wellbore stability, equipment drag, and hole cleaning.

In some cases, drilling operations may intersect fault zones that have a different rock composition and physical properties compared to the surrounding formations. These fault zones can be mechanically weak, affecting drilling efficiency and stability.

Karst features are formed by the dissolution of soluble rocks (such as limestone) and can lead to sinkholes or cavities. Drilling through areas with karst features can result in sudden changes in the wellbore and challenges in maintaining drilling stability.

Drilling can cause changes in the stress state of the surrounding rock. Sudden pressure changes due to drilling can lead to borehole collapse or other instability issues.

Geological changes can involve encountering mineralized zones or pockets of gas. These can impact drilling operations, wellbore integrity, and even present safety hazards.

To mitigate the challenges posed by geological changes during drilling, engineers and geologists rely on real-time data from measurement-while-drilling (MWD) tools, drill cuttings analysis, and geophysical surveys. This data helps them adjust drilling parameters, wellbore design, and drilling strategies to optimize drilling efficiency and well integrity while ensuring the safety of personnel and equipment.

In various embodiments, the report is generated via a plurality of application programming interfaces that connect to one or more drilling systems that perform the drilling operation. An Application Programming Interface (API) is a set of rules, protocols, and tools that allows different software applications to communicate and interact with each other. It defines the methods and data structures that developers can use to integrate their software applications with external services, libraries, or platforms. APIs enable developers to access the functionalities of another application or service without needing to understand the internal details of how that functionality is implemented.

In various embodiments, the report further may include projected challenges for a defined time period for the drilling operation based on the plurality of drilling parameters.

In various embodiments, the report further may include links to drilling data. In various embodiments, a link to the report is transmitted via at least one of an email message, a text message, and a chat message.

In various embodiments, the report includes one or more tags identifying information in the report.

In various embodiments, the length of the video report is less than 30 seconds in duration.

In various embodiments, the report can include a plurality of metrics including a number times that a previous planned activity achieved a desired target time over N number of previous drilling wells.

In various embodiments, process 1700 may include assigning a probability that the planned activity will achieve the desired target time during a current drilling operation.

At block 1720, process 1700 may include saving the report on a sever connected to a network. For example, report generator 1102 may save the report on a sever connected to a network, as described above. The report can include one or more of video content, audio content and text/data content. In various embodiments, the report can be stored in a memory of the computing device. In various embodiments, the report can be stored in a storage 1110.

At block 1725, process 1700 may include providing the report to at least one user. For example, report generator 1102 may provide the report to at least one user, as described above. In various embodiments, providing the report to at least one user may include: generating a link to the report; and transmitting the link to the report to the at least one user.

In various embodiments, the operations further may include transmitting a link to the report at a preset time. In various embodiments, the operations further may include transmitting a link to the report within a preset time following the end of operations. In various embodiments, the operations further may include transmitting a link to the report at a preset time. In various embodiments, the operations further may include storing a link to the report on a website for viewing after user login.

In some embodiments, the system and methods provided can allow for one or more recipients of a video report to comment on the report and send the comments to one or more other recipients of the video report. For example, depending on the video file format and the application used to view it by a user, and on the rights granted to a user with respect to that report, the user may be allowed to annotate the report, such as by adding text or other symbols, diagrams, highlighting, or the like, and then send the annotated report to one or more other recipients of the report, such as by clicking on a "send" or "reply" button or link or the like. It may be desirable to limit the number of recipients who can provide such comments, such as by granting only some system users such rights. Once a recipient makes such annotations and hits a "send" or "reply" button or link, the annotator's device can transmit the annotated version of the video report back to the server where the annotated version can be stored. Once stored, the annotated version can be delivered by the server to the same or a different set of recipients by the same delivery means as the initial video report file. Alternatively, the server can send a message (e.g., email, text, phone message, etc.) to the intended recipients of the annotated version that an annotated version is available, at which point the recipients notified of the available update can either request delivery by responding to the message or can access the annotated version, such as by accessing a website from which the annotated version is accessible. In one embodiment, a recipient who annotates the video report may also restrict the other stakeholders to whom the annotated report is to be sent, such as by clicking on appropriate commands to restrict access and provide a list of recipients to whom access is to be granted. The annotated version might be in video form, or a snapshot of a specific view of the video report that then includes the annotated and "markup," such as by adding context, by asking a question, or clarifying (or requesting clarification of) some aspect of a question.

It should be noted that, for security and confidentiality reasons, it may be appropriate and desirable to require the intended recipients to authenticate themselves before they are provided access to one or more video reports. Alternatively or additionally, it may be desirable to generate different video reports that are available to different users or user categories. For example, an owner/operator of a well may choose to allow any and all employees and officers interested in a given well to have full access to any and all information provided in a video report for that well. Nonetheless, the owner/operator may not necessarily want to allow one or more vendors' personnel to have access to all of that information and may want to restrict the information provided to vendor personnel. Moreover, there may be situations where one vendor refuses to allow a video report with that vendor's confidential information from being sent to a different vendor which is also involved with that well. In such cases, contractual restrictions may prevent the second vendor from receiving the same video report as the other stakeholders, and the report generator may need to generate a second report for the second vendor by removing some or all information flagged as proprietary to the first vendor.

Returning to the issue of security, there are a wide variety of techniques for authenticating users of and providing access to apps, websites, and networks. Among other things, biometrics may be used, such as facial recognition, voice recognition, iris patterns, fingerprints, and possibly DNA. Other techniques may be used, such as requiring a user to first provide a username and a password before being provided with access to a resource (such as one or more video reports). Two-factor authentication may also be used to restrict access to one or more video reports and provide security. The server connected to the internet and containing the video report files may allow users to remain logged in or may require new logins each time or after a given time interval in order for a user to access the video report(s). In some embodiments, when a user first creates an account and provides a username and password (or other login information, such as biometric information like a fingerprint, face scan, or eye scan), the user may be prompted to provide one or more preferences, such as the type of report(s) to be received, the timing of the report(s) to be received, the manner in which the report(s) are to be delivered (e.g., text, email, website link, copy of the video versus link or both), the format of the video file to be provided, and any other preferences, such as additional text, graphic, or other information to be provided with the video report(s). Alternatively or additionally, the system may allow the user to set such preferences, or modify such preferences, after the user's account and security information has been provided.

When a recipient accesses a video report, the report may be displayed in an app, a video player, or a web browser. The report may be displayed on a user's device with additional information, such as a title of the video file being displayed, a "play" icon (such that by clicking on the play icon, the user can start the video report playing), and a video control toolbar (such that the toolbar includes icons which allow the user to initiate the playing of the video file, skip ahead or fast forward the video file, adjust the sound volume for the sound associated with the video file, reverse the video file, freeze or pause the video file, and possibly also download or share the video file on social media or other websites, such as FaceBook, Twitter, Instagram, TikTok, YouTube, and the like).

In some implementations, the video report may be configured to allow a user to adjust the view presented by the display of the report to the user. For example, the report may be configured to allow a user to zoom in and out on the illustration as it is displayed, and/or move forward or backward along the wellbore displayed as part of the illustration. The information displayed in the text boxes may change to match the location of the well that is the focus of the user's adjustment of the display of the animation. In addition, the illustration display may be configured to allow the user to modify the display presented by providing a user input to change the view. In some cases, the user may be able to modify the illustration by 360 degrees, looking at the well from below, from above, from behind, from in front, from either side, and from any other angle. In one example, the video report as presented may be configured to allow a user to use a game controller to adjust the view presented of the wellbore in a manner much like that described in U.S. Pat. No. 11,162,356, issued on Nov. 2, 2021, and titled "Downhole Display," which is hereby incorporated by reference as if fully set forth herein.

It should be noted that some or all of the video reports described above may be saved and stored in a database. A server can be programmed with software to store, index, and retrieve the video reports in response to requests from users authorized to do so. Each of the video reports may be associated with one or more tags or identifiers or other metadata. In addition, the server may obtain information from the users who access the video reports. For example, for each video file consumed (in any duration) by each user (on any device), the server in one embodiment may track and store the following information: platform used for access to server (e.g., desktop, laptop, tablet, etc., and operating system, such as iOS, Windows, Android, etc.); all video metadata tags for video clips begun; duration (e.g., total running time) of video files started; percent of video completed (total time watched and time into video TRT where exited/skipped); time of day for consumption of video file; skip click actions; bit rate at which each video file was streamed; and interaction(s) with the video's progress bar. All such user actions can be logged and stored in a database in non-volatile storage.

The foregoing descriptions have referred to a number of different tags or identifier information associated with each video file. The tags can be data files or identifiers in a variety of forms which can be associated with their corresponding video files in a variety of ways. Examples of tags that might be useful include the following: name of well, measured depth range, date of time period covered by report, owner or operator name, personnel name (e.g., company man on site), whether the report involves an incident, a type of incident or event that occurred during the time interval of the report, weather conditions encountered, and/or any of the drilling parameters noted above, such as WOB, ROP, differential pressure, torque, rotary versus slide drilling operations, RPMs, and the like, geological conditions, such as any of those described above, including geological formations encountered, hardness, porosity, stickiness, and so forth, and any equipment used, such as BHA, drill bit, cutters, and so forth.

Although not shown, it should be noted that a search function can be provided by software on a server for searching for the information and video report files stored in a database. For example, a user can be presented with a "Search" bar on the user's device or displayed on a web browser which allows the user to enter any information desired by user, such as alphanumeric information or standard characters, which is then transmitted as a search request to the server. The server receives the search request and performs a search of the database for matching tags. The server can also retrieve information from the user's profile to determine the user's preferences previously indicated, prior viewing history and log information, prior likes and dislikes, and the like as described above. The server can then sort and rank the video report files and information which best match the search received from the user to rank the matching video files and transmit a list of the matching video report files with the highest ranked matching video files listed first. It may be desirable to provide a list of ranked video reports to the user that is limited to say, no more than five or ten video reports. The matching may be performed by searching for tags that match some or all of the search string from the user. For example, it may be that there are multiple video report files associated with tags that match several of the search string inputs. In such cases, a "best" match may be determined by various algorithms, such as based on the greatest number of identical matches, or based on a points weighting approach, in which each file tag that matches or is deemed "close" to a search input string receives a set of points, with the "best" match being the video report which has the highest point total for tags matching the search input. The server can then provide the user with a list of "matching" video reports, ranked in order of matches (e.g., point totals) or can simply provide the user with the "best" matching video report. The system could also leverage large language models (like ChatGPT) or other AI/ML to speak to the application in order to search for the desired report. In an example, the system is asked to find a report of a well similar to x, or a well for a particular owner or operator, a well within the same formation, or a well (or wells) within a specified distance of a specified well. Once the user sees the results, they might specify something different to get to the desired result.

Process 1700 may include additional implementations, such as any single implementation or any combination of implementations described below and/or in connection with one or more other processes described elsewhere herein. In a first implementation, the graphical depiction may include a three-dimensional rendering of the drilling operation.

It should be noted that while FIG. 17 shows example blocks of process 1700, in some implementations, process 1700 may include additional blocks, fewer blocks, different blocks, or differently arranged blocks than those depicted in FIG. 17. Additionally, or alternatively, two or more of the blocks of process 1700 may be performed in parallel.

The following is an example of how the video reports system may be used. Suppose a well being drilled progresses 1000 feet from 6 p.m. to 4 a.m. The equipment used to drill the well (e.g., rig, pipe diameter, pipe type, number of stands added to the drill string, drill bit, BHA, etc.) is known. During that time interval, a number of surveys will be taken, and the MWD information obtained will establish the location of the BHA at the survey station locations during the drilling. In addition, the LWD information will provide logs (e.g., gamma ray logs) for that drilling interval. The drilling mud may be examined and may reveal geological information, such as the type of rock formation(s) drilled during that time interval. Much additional information will be available for the drilling operations during that time interval, such as toolface, differential pressure, mud flow rate, and the like.

Upon the completion of the time interval, which is to be the subject of the report, the system 1102 can be programmed to obtain the information for the report from the data obtained and stored during the time interval that is the subject of the report. In addition, the system 1102 can obtain the relevant portions of the well plan and or offsetting wells or synthetic wells (composite wells, or tech limit wells, etc) that correspond to the time interval. The system 1102 then generates an animation showing the progress and location of the BHA as drilling occurred during that time interval. The system 1102 generates an audio narration from the data obtained during that time interval to describe key points about the drilling operations during that time interval, such as the number of feet drilled, any significant deviations from plan, any incidents noted, any well path trajectory changes, any changes to the well plan, geological formations drilled, and the like. The system 1102 further generates text to be included, such as shown in the exemplary screen grabs in FIGS. 12-16, that shows various data from the drilling operations as the well was drilled during that time interval. The system 1102 can also use the well plan to generate an animation, audio narration, and text information to be included in the video report that describes the planned drilling operations during the next time interval, which may be of the same length or a different length than that of the 6 p.m. to 4 a.m. interval. Additionally, the log information from the time interval may be included in the video report. For example, the gamma ray log obtained during drilling operations for that interval might be included as an animation showing the log as it was obtained during the time period. The log obtained during drilling may be displayed side-by-side or overlayed with one or more corresponding gamma ray log portions from one or more reference wells that are included in the well plan. A system like the steering control system 168 may be used to automatically correlate the gamma ray log obtained with one or more portions of the logs from the one or more reference wells, and the correlation process (with or without an animation thereof) may be generated for inclusion in the video report.

In some drilling applications, computer vision systems may be used. As described in U.S. Pat. No. 10,957,177, issued on Mar. 23, 2021, titled "Systems and Methods for Oilfield Drilling Operations Using Computer Vision", which is hereby incorporated herein as if fully set forth herein, computer visions may be used to automatically determine a great deal of information during drilling. If the well being drilled is drilled using one or more computer vision systems like those described in the '177 patent noted, some of the video obtained by the computer vision system(s) may be included in the video report. For example, one potential use of a computer vision system is to automatically identify safety concerns. If a safety incident occurs during the time interval, a user can provide input to the system 1102 and a time period during which the safety incident occurred. The system 1102 can then retrieve the appropriate video from the computer vision system and include that video in the video report, together with the automatically generated audio narration of the incident. Another example of the use of the computer vision system described in the '177 patent is to maintain a pipe tally. The system 1102 can obtain the pipe tally information from the computer vision system and can include that pipe tally data in the video report. These are just a few examples of how the information and/or video obtained by the computer vision system can be incorporated in the video report generated by system 1102.

Once the system 1102 has generated the animation, the audio narration, and the text information to be included, the video file for the report is generated. As noted above, the system 1102 may be programmed to generate a plurality of video files for a given report, if it is desired for stakeholders to view the video report on different devices running different video display software. Once the video file has been generated, the video file can be saved and stored on a server that is connected to and accessible from the internet. A link to the video file can be generated and then sent by email, text message, or otherwise to stakeholders authorized to receive the same and view the video report. In some implementations, the video file can be automatically posted to one or more video hosting services, such as Snapchat, FaceBook, Instagram, TikTok, YouTube, and the like. In addition, or alternatively, the video file may be made available only to users of an application downloaded onto the user's device, such as a phone, tablet, computer, or other video display device. The user can then activate the application, which can play the video report for the user. In some implementations, the video may be delivered to users, the video may be delivered via a link delivered to users, or users may be notified of the availability of a new video report. In some situations, the video report may not be delivered and no notification may be delivered; if the stakeholders for a given well all know that a new daily report will be available at 6 a.m. each day during drilling of the well, for example, no notifications may be needed.

Figure 18:
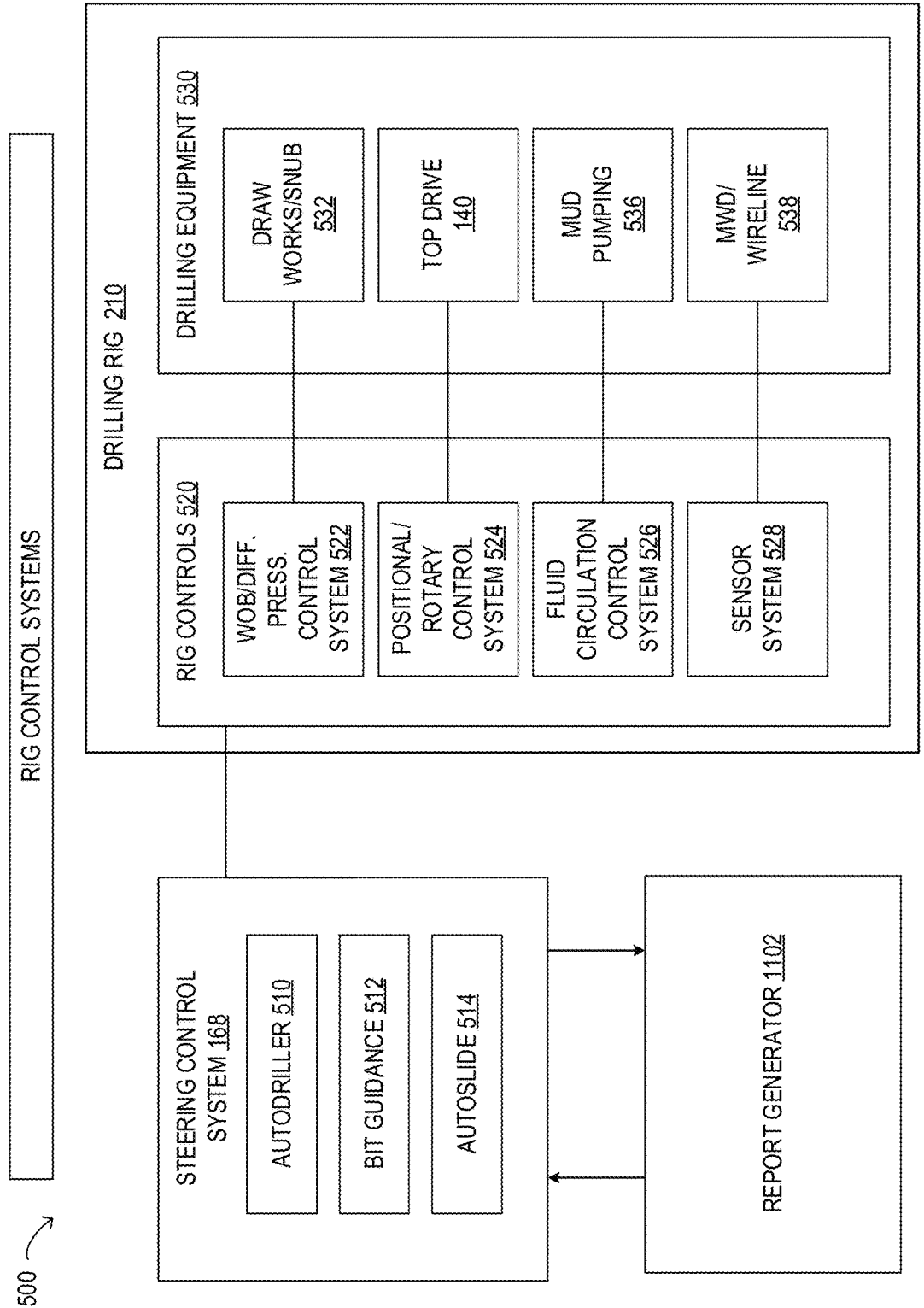
FIG. 18 illustrates a second depiction of rig control systems included in the drilling system.

Referring now to FIG. 18, a second example of rig control systems 500 is illustrated in schematic form. It is noted that rig control systems 500 may include fewer or more elements than shown in FIG. 18 in different embodiments. As shown, rig control systems 500 includes steering control system 168 and drilling rig 210. Specifically, steering control system 168 is shown with logical functionality including an autodriller 510, a bit guidance 512, and an autoslide 514. Drilling rig 210 is hierarchically shown including rig controls 520, which provide secure control logic and processing capability, along with drilling equipment 530, which represents the physical equipment used for drilling at drilling rig 210. As shown, rig controls 520 include WOB/differential pressure control system 522, positional/rotary control system 524, fluid circulation control system 526, and sensor system 528, while drilling equipment 530 includes a draw works/snub 532, top drive 140, mud pumping equipment 536, and MWD/wireline equipment 538.

Steering control system 168 represent an instance of a processor having an accessible memory storing instructions executable by the processor, such as an instance of controller 1000 shown in FIG. 10. Also, WOB/differential pressure control system 522, positional/rotary control system 524, and fluid circulation control system 526 may each represent an instance of a processor having an accessible memory storing instructions executable by the processor, such as an instance of controller 1000 shown in FIG. 10, but for example, in a configuration as a programmable logic controller (PLC) that may not include a user interface but may be used as an embedded controller. Accordingly, it is noted that each of the systems included in rig controls 520 may be a separate controller, such as a PLC, and may autonomously operate, at least to a degree. Steering control system 168 may represent hardware that executes instructions to implement a surface steerable system that provides feedback and automation capability to an operator, such as a driller. For example, steering control system 168 may cause autodriller 510, bit guidance 512 (also referred to as a bit guidance system (BGS)), and autoslide 514 (among others, not shown) to be activated and executed at an appropriate time during drilling. In particular implementations, steering control system 168 may be enabled to provide a user interface during drilling, such as the user interface 850 depicted and described below with respect to FIG. 8. Accordingly, steering control system 168 may interface with rig controls 520 to facilitate manual, assisted manual, semi-automatic, and automatic operation of drilling equipment 530 included in drilling rig 210. It is noted that rig controls 520 may also accordingly be enabled for manual or user-controlled operation of drilling and may include certain levels of automation with respect to drilling equipment 530.

In rig control systems 500 of FIG. 18, WOB/differential pressure control system 522 may be interfaced with draw works/snubbing unit 532 to control WOB of drill string 146. Positional/rotary control system 524 may be interfaced with top drive 140 to control rotation of drill string 146. Fluid circulation control system 526 may be interfaced with mud pumping equipment 536 to control mud flow and may also receive and decode mud telemetry signals. Sensor system 528 may be interfaced with MWD/wireline equipment 538, which may represent various BHA sensors and instrumentation equipment, among other sensors that may be downhole or at the surface.

In rig control systems 500, autodriller 510 may represent an automated rotary drilling system and may be used for controlling rotary drilling. Accordingly, autodriller 510 may enable automate operation of rig controls 520 during rotary drilling, as indicated in the drill plan. Bit guidance 512 may represent an automated control system to monitor and control performance and operation drilling bit 148.

In rig control systems 500, autoslide 514 may represent an automated slide drilling system and may be used for controlling slide drilling. Accordingly, autoslide 514 may enable automate operation of rig controls 520 during a slide and may return control to steering control system 168 for rotary drilling at an appropriate time, as indicated in the drill plan. In particular implementations, autoslide 514 may be enabled to provide a user interface during slide drilling to specifically monitor and control the slide. For example, autoslide 514 may rely on bit guidance 512 for orienting a toolface and on autodriller 510 to set WOB or control rotation or vibration of drill string 146.

FIG. 18 illustrates a report generator 1102 that interacts with the steering control system 168. The steering control system 168 can send information from the drilling rig 210 to the report generator 1102 as described above. In various embodiments, the report generator 1102 can provide instructions to the steering control system 168.

It should be appreciated that longer or shorter time intervals may be the subject of the video reports described herein, and that the stakeholders may prefer the availability of reports at different times during a day (e.g., early morning, early afternoon, late evening, etc.). One advantage of the system 1102 is that it offers a great deal of flexibility for the various stakeholders in a well in terms of the information to be delivered and when it is to be delivered, while still providing a concise, understandable, and easily retrieved summary of drilling operations with context quickly after they occur.

The description and figures included herein focus primarily on the creation and distribution of video reports regarding a wellbore during the drilling of the same. It should be noted, however, that the same or similar systems and methods as described herein may be used to automatically generate and distribute video reports regarding the completion of a wellbore (as opposed to its drilling). Well completion is the process of making a well ready for production (or injection) after drilling operations. There are a number of types of completion processes commonly used, including barefoot completion, open hole completion, use of a pre-drilled liner or a slotted liner, and so forth. Hydraulic fracturing may be included as part of the completion process. Completion usually involves preparing the bottom of the hole to the required specifications, running in the production tubing and its associated downhole tools as well as perforating and stimulating the well as required. Generally, running in and cementing the casing in the wellbore is part of the well completion process. The casing is provided so that the well does not close in upon itself and also protects the hydrocarbon fluids from water or sand.

From this very brief overview of the completion process, it will be appreciated that, as with the drilling of a well, a number of stakeholders at a number of companies may be interested and require reports on the progress of the completion efforts, and that while some of the stakeholders may be the same as those for the drilling operations, the stakeholders for completion may be different. A system like that described above for generating and distribution video reports for drilling activities may be used to obtain information from one or more surface and/or downhole sensors and from equipment used during the completion process to generate video reports showing the progress of the completion process and related activities during a preceding time interval, as well as the planned completion activities to follow in a successive time interval. An example of this is a customer is running a 24 hour zipper fracturing job where multiple wellbores are being completed simultaneously, the report would visualize the different frac stages that were completed, the associated volumes/pressures of water, proppant, chemicals, etc, plus the visualization of what was upcoming in a certain amount of time. The system could be programmed to generate a report that could show some or all of the following: health of the surface equipment pumps, average and peak/trough flowrates and pressures, the graphical representation of the pressure profiles from various sensors for each stage. It could highlight the overall operation as well as the challenges faced. On the upcoming operations, it could show historical completions in the similar area, lessons learned, challenges faced, and comparisons between the different wells as they completed them. In a situation with a microcosmic job where they were tracking the locations of the frac, or any other type of sensors at surface intended to track where the fractures were being created in the subsurface, the report could visualize (in 3D or 2D) what the planned fracture propagation vs the actual propagation and show effective percentage of propagation. Additional sensors at surface measuring vibration from other wellheads, measurements from offsetting fiber optic lines run along the wellbores and such could also be visualized to show the effectiveness of the frac as well as challenges of the stimulation. Such a video report for the completion process can be automatically generated and distributed to stakeholders in the completion by the same or a similar system like that described above. Video reports for completion activities can be stored, searched, tagged, and protected as described above with respect to video reports for drilling activities. Those, including the different personas illustrated above, interested in receiving the reports for the well completion activities may register or signup for the same in the same or similar manner as that described above for stakeholders interested in the drilling video reports. The wellbore would be mapped based on the drilling of the actual well, and the placement of the different plugs and perforations along the wellbore would be visualized. The relative rock hardness from the existing wellbore would be visualized to see the optimum frac placement. Each of the wells would have "layers" to overlay the drilling data over the frac data to visualize potential issues or opportunities for the completion operation. Things like loss zones, unusual situations, excess Dog Leg Severity, micro DLS, logs of hole geometry showing larger washouts in the hole, cement bond logs showing potential issues with the cement, etc. could be overlayed on the visualization to ensure that the operations were aware of the challenges. Other layers would be previous microseismic mapping showing where existing fracs have propagated overlayed in the area of concern to show where communication might exist between a parent and child well, offsetting well, well in a lower formation or upper formation from the current wellbore, and the user would be able to see these representations in 3D.

Production phase video reports can be generated and distributed as described above for drilling and completion video reports. The production stage generally is when oil and gas are produced from the well. At this stage, the drilling rig used to drill and complete the well is usually gone, and the top of the well usually has a collection of valves called a Christmas tree or production tree. These valves regulate pressures, control flows, and allow access to the wellbore in case further completion work is needed. The outlet of the production tree can be connected to a distribution network of pipelines and tanks. In some wells, an artificial lift system can be employed to bring the oil and gas from downhole to the surface. In some cases, a workover of the well may be needed to enhance production from the well, and/or enhanced recovery methods may be used to increase production of oil and gas in some wells. The enhanced recovery methods may include water flooding, steam flooding, or $CO_2$ flooding. As with drilling and completion activities, video reports for production activities and for the amount of production from one or more oil and gas wells may be generated and distributed using the same or similar systems and methods described herein for drilling and/or completion activities. One or more surface sensors and downhole sensors may be used to collect and provide information to a system to be used to generate the production reports, as well as any enhanced recovery or workover operations on a well. Stakeholders interested in the production video reports may sign up for the same using the same or similar systems and methods as described above. An example is a video report showing the trend of an existing well that has just been brought on to production. It could show flowback rates and volumes of sand/water/oil and gas, amount produced, pressures through the different choke settings. Once flowback is complete, it could show rpms on downhole pumps, cycles from production pump jacks vs total production on a daily basis. It could show the type curve and if its ahead or behind budgeted production. It could show accumulated production per well, total costs per well, total revenue per well, future planned workover work, etc.

This disclosure provides systems and methods for generating one or more reports during drilling, completion, and/or production operations for one or more wells, including systems and methods performed by a processor executing software on a computer system that may include any or all of the following steps, and wherein the computer system may be coupled to one or more control systems or equipment associated with a drilling rig, equipment for completion activities, and/or production:

accessing a well plan for one or more drilling, completion, and/or production activities for one or more wells, including a plurality of wells in a single pad, or a plurality of wells in a single field;

receiving a plurality of parameters for the drilling, completion and/or production activities for the well;

after a first time interval during which one or more drilling, completion or production activities occurred, generating one or more reports therefor, wherein the one or more reports includes:

a graphical depiction of the drilling, completion, and/or the production activities for the well during the first time interval based on the plurality of parameters for the drilling, completion or production activities, respectively, the graphic depiction including an animated or video illustration of the drilling, completion or production activities within the first time interval, wherein the animated or video illustration comprises a display showing the progress of the drilling, completion or production activities in the well during the first time interval, and a comparison of the progress of the drilling, completion or production activities with a plan for the drilling, completion or production activities for the well;

a plurality of metrics associated with the drilling, completion or production activities;

a summary of planned drilling, completion or production activity for the well for a future second time interval;

saving the report in a database on a server connected to a network; and providing the report or access to the report to at least one user.

The graphical depiction may comprise a three-dimensional rendering of the well as drilled, planned to be drilled, and/or the target well path, and the planned activity may further comprise a summary of geological changes or other events or well conditions anticipated for the future predetermined time period. The report may be generated automatically via the use of a plurality of application programming interfaces that connect the video report generating system to one or more control systems associated with the drilling rig or other equipment for drilling, completion, or production. The plurality of metrics may include a number times that a plan achieved a desired target (or failed to achieve a target, missed by a particular margin or threshold, etc.). The report may also include a probability that the plan will achieve the desired target, such as but not limited to a target during the second time interval or the overall well plan drilling time target. The report may further comprise projected challenges for a defined time period for the completion or production activity based on the plurality of parameters, an audio or text narration. Providing the report to at least one user may comprises generating a link to the report and transmitting the link to the report to the at least one user, including transmitting the link to the report at a preset time. The reports may be configured to change in response to user input to allow the user to manipulate the display presented to the user, thereby allowing the user to view a display of the illustration from any one of 360 degrees, and/or to allow a user to freeze the illustration, fast forward the illustration, and/or reverse the illustration, and/or to add tags to the report, wherein the tags are associated with the report in a searchable database for searching. The report may further comprises links to data and/or a link to the report may be transmitted via at least one of an email message, a text message, and a chat message. The report may be automatically generated, and may include one or more tags identifying information in the report. The length of the video report may be less than 30 seconds in duration, and/or may be between 30 and 60 seconds in duration, or may be greater than 60 seconds in duration. The reports may be stored in a searchable database of prior reports. The reports may be varied to provide additional information using artificial intelligence generated inputs based on user searches associated with the reports.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. A drilling rig system comprising:
   a drilling rig comprising:
      a top drive;

a drill string coupled at a first end to the top drive; and
a bottom hole assembly (BHA) coupled to a second end of the drill string, wherein the BHA comprises one or more downhole sensors configured to measure drilling information during a drilling operation;
one or more surface sensors configured to measure one or more drilling parameters;
a control system comprising one or more processors and a memory for storing instructions that when executed by the one or more processors perform operations comprising:
accessing a well plan for the drilling operation, wherein the drilling operation comprises drilling a wellbore during a first time interval;
receiving information related to a location of the BHA obtained from the one or more downhole sensors during the first time interval;
receiving information related to one or more drilling parameters for the drilling operation obtained from the one or more surface sensors during the first time interval;
automatically generating a video based on the well plan, the BHA location information, and the drilling parameter information, wherein automatically generating the video comprises generating the video with:
a graphical depiction of the drilling operation within a predetermined time period, comprising movement of the BHA during the first time interval;
a plurality of metrics associated with the drilling operation during the first time interval responsive to the drilling parameter information; and
a summary of planned drilling activity subsequent to the first time interval for drilling the wellbore;
saving the video on a server connected to a network, wherein automatically generating the video further comprises generating the video as a first file type for a first user with first identification information and as a second file type for a second user with second identification information, wherein the first file type is different from the second file type; and
providing the video to at least one user as the first file type or as the second file type depending on whether the at least one user is the first type of user or the second type of user.

2. The drilling rig system of claim 1, wherein automatically generating the video comprises generating a three-dimensional rendering of the drilling operation as the graphical depiction in the video.

3. The drilling rig system of claim 1, wherein automatically generating the video comprises generating a summary of geological changes for a future predetermined time period in the summary of planned activity in the video.

4. The drilling rig system of claim 1, wherein automatically generating the video further comprises generating the video with audio narration regarding the drilling operation.

5. The drilling rig system of claim 1, wherein providing the video to at least one user comprises:
generating a hyperlink to the video; and
transmitting the hyperlink to the video to at least one user.

6. The drilling rig system of claim 5, wherein the hyperlink to the video is transmitted via at least one of: an email message, a text message, and a chat message.

7. The drilling rig system of claim 1, wherein automatically generating the video further comprises generating the video with hyperlinks to drilling data generated during the time interval covered by the video.

8. The drilling rig system of claim 1, wherein automatically generating the video comprises:
receiving or determining identification information for the at least one user; and
further controlling at least one of a duration of the video, the predetermined time period, an amount or type of information in the video, or a reporting interval of the video based on the identification information of the at least one user.

9. The drilling rig system of claim 1, wherein the video includes one or more metatags associated with information in the video, and wherein the one or more metatags comprise at least one of the following metatags: a well identifier; a pad identifier; a field identifier; a date identifier; a bottom hole assembly identifier; a drill bit identifier; an owner or operator identifier; a depth identifier; a geological formation identifier; an incident or event identifier; a result identifier; a personnel identifier; and a rig identifier.

10. The drilling rig system of claim 1, wherein the length of the video is less than 30 seconds in duration.

11. The drilling rig system of claim 1, further comprising a database, wherein the database is searchable by key words and comprises a plurality of videos, each associated with a well.

12. The drilling rig system of claim 1, wherein the video comprises information different from that in a previous video generated by the same system, wherein the different information results from modifications by the system in response to user searches or user requests.

13. The drilling rig system of claim 1, wherein the instructions further comprise instructions for accessing information associated with one or more offset wells and incorporating information associated with the one or more offset wells in the video.

14. The drilling rig system of claim 13, wherein the one or more offset wells comprise one or more composite wells and/or one or more technical limit wells.

15. The drilling rig system of claim 1, wherein automatically generating the video further comprises generating the video with an animation or video illustration of the drilling operation for a future predetermined time period.

16. The drilling rig system of claim 1, wherein the one or more downhole sensors comprise one or more measurement while drilling sensors configured to measure one or more of: toolface orientation, inclination, azimuth, a property of a geological formation, trajectory, and depth.

17. The drilling rig system of claim 1, wherein the one or more surface sensors are configured to measure one or more of: rate of penetration (ROP), weight on bit (WOB), rotational speed, torque, mud flow rate, mud pressure, mud density, mud viscosity, rheology, standpipe pressure, mud circulation rate, differential pressure, vibrations in the drill string, and mud temperature as the one or more parameters at the drilling rig.

18. The drilling rig system of claim 1, wherein the control system is further configured to provide instructions for controlling operation of drilling equipment of the drilling rig during the drilling operation by adjusting one or more drilling parameters, a wellbore design, and/or a drilling strategy.

19. A method performed by a computer system, the method comprising,
accessing, by the computer system, a well plan for drilling a well;
receiving, by the computer system, information from one or more downhole sensors relating to a location of a bottom hole assembly (BHA) during drilling of the well during a first time interval and information from one or more surface sensors related to one or more drilling parameters for drilling the well during the first time interval;

receiving or determining identification information for at least one user as at least one of first type of user or a second type of user; and automatically generating, by the computer system, a video based on the well plan, the information relating to the BHA location received from the one or more downhole sensors, and the information related to one or more drilling parameters received from the one or more surface sensors, wherein automatically generating the video comprises generating the video with:

an animated graphical depiction of the drilling of the well within the first time interval, wherein the animated graphical depiction displays movement of the BHA during the first time interval;

a plurality of metrics associated with the drilling of the well during the first time interval; and a summary of a planned subsequent drilling activity for drilling the well;

saving, by the computer system, the video in a database on a server connected to a network; and providing, by the computer system, a copy of the video or access to the video to the at least one user, wherein providing the copy of the video or access to the video further comprises controlling at least one aspect of the video provided to the at least one user based on whether the at least one user is the first type of user or the second type of user, wherein the at least one aspect of the video comprises at least one of a duration of the video, a file type of the video, the predetermined time period, an amount or type of information in the video, or a reporting interval of the video based on the identification information of the at least one user.

20. The method of claim 19 wherein the video is generated from data received from a plurality of application programming interfaces that connect the computer systems to one or more drilling systems coupled to a drilling rig that performs the drilling.

21. The method of claim 19, wherein providing the video to at least one user comprises:
generating a hyperlink to the video; and
transmitting the hyperlink to the video to the at least one user.

22. The method of claim 19, further comprising:
receiving user input; and
modifying a view of the graphical depiction in response to the user input, wherein modifying the view comprises changing the view from any one of 360 degrees.

23. The method of claim 22, further comprising:
receiving user input; and
changing at least one characteristic of the video responsive to the user input, wherein changing the at least one characteristic of the video comprises at least one of stopping playing progress of the video, fast forwarding playing progress of the video, reversing playing progress of the video, or adding tags to the video, wherein the tags are associated with the video in a searchable database for searching.

24. The method of claim 19, wherein automatically generating the video further comprises generating the video hyperlinks to drilling data.

25. The method of claim 19, wherein providing the video to the at least one user comprises transmitting a hyperlink to the video via at least one of an email message, a text message, and a chat message.

26. The method of claim 19, wherein the generating the video further comprises generating the video with at least one of:
progress of a bottom hole assembly in the well as it is being drilled during the first time interval as the graphical depiction;
a three-dimensional rendering of a portion of a trajectory of the well as the graphical depiction;
a comparison of the trajectory of the well and a corresponding portion of a planned trajectory of the well as the graphical depiction; or
text or audio narration.

27. The method of claim 19, further comprising:
accessing, by the computer system, information associated with one or more offset wells and incorporating information associated with the one or more offset wells in the report.

28. The method of claim 27, wherein the one or more offset wells comprise one or more composite wells and/or one or more technical limit wells.

29. A non-transitory, computer readable medium storing instructions that when executed cause one or more processors to perform operations, the operations comprising:
accessing a well plan for a drilling operation;
receiving information obtained from one or more downhole sensors relating to a location of a bottom hole assembly (BHA) during the drilling operation, wherein the drilling operation comprises drilling the well during a first time interval;
receiving information obtained from one or more surface sensors related to one or more drilling parameters for the drilling operation during the first time interval;
receiving or determining identification information for at least one user as at least one of a first type of user or a second type user;
automatically generating a video based on the well plan, the information relating to the BHA location received from the one or more downhole sensors, and the information related to one or more drilling parameters received from the one or more surface sensors, wherein automatically generating the video comprises generating the video with:
an animated graphical depiction of the drilling operation within the first time interval, wherein the animated graphical depiction displays movement of the BHA during the first time interval;
a plurality of metrics associated with the drilling operation as provided by the drill plan; and
a summary of a planned subsequent activity for a drilling operation;
saving the video on a server connected to a network; and
providing the video to at least one user, wherein providing the copy of the video or access to the video further comprises controlling at least one aspect of the video provided to the at least one user based on whether the at least one user is the first type of user or the second type of user, wherein the at least one aspect of the video comprises at least one of a duration of the video, a file type of the video, the predetermined time period, an amount or type of information in the video, or a reporting interval of the video based on the identification information of the at least one user.

30. The non-transitory computer readable medium of claim 29, wherein providing the video to at least one user comprises:

generating a hyperlink to the video; and
transmitting the hyperlink to the video to the at least one user.

31. The non-transitory computer readable medium of claim 29, wherein automatically generating the video comprises:
receiving or determining identification information for the at least one user; and
controlling at least one of a duration of the video, a file type of the video, the predetermined time period, an amount or type of information in the video, or a reporting interval of the video based on the identification information of the at least one user.

32. The non-transitory computer readable medium of claim 29, wherein automatically generating the video comprises generating a text or audio narration with the summary of the planned activity.

33. The non-transitory computer readable medium of claim 28, wherein the generating the video further comprises generating the video with at least one of:
progress of a bottom hole assembly in the well as it is being drilled during the first time interval as the graphical depiction;
a three-dimensional rendering of a portion of a trajectory of the well as the graphical depiction;
a comparison of the trajectory of the well and a corresponding portion of a planned trajectory of the well as the graphical depiction; or
text or audio narration.

* * * * *